(12) United States Patent
Sheng

(10) Patent No.: US 11,341,715 B2
(45) Date of Patent: May 24, 2022

(54) VIDEO RECONSTRUCTION METHOD, SYSTEM, DEVICE, AND COMPUTER READABLE STORAGE MEDIUM

(71) Applicant: Alibaba Group Holding Limited, Grand Cayman (KY)

(72) Inventor: Xiaojie Sheng, Shanghai (CN)

(73) Assignee: Alibaba Group Holding Limited, George Town (KY)

( * ) Notice: Subject to any disclaimer, the term of this patent is extended or adjusted under 35 U.S.C. 154(b) by 112 days.

(21) Appl. No.: 16/810,634

(22) Filed: Mar. 5, 2020

(65) Prior Publication Data
US 2020/0288111 A1   Sep. 10, 2020

(30) Foreign Application Priority Data

Mar. 7, 2019   (CN) .......................... 201910172717.7
Mar. 7, 2019   (CN) .......................... 201910172720.9
(Continued)

(51) Int. Cl.
*G06T 15/20*       (2011.01)
*H04N 13/128*   (2018.01)
(Continued)

(52) U.S. Cl.
CPC ........ *G06T 15/205* (2013.01); *G06F 3/04842* (2013.01); *G06F 3/04883* (2013.01);
(Continued)

(58) Field of Classification Search
None
See application file for complete search history.

(56) References Cited

U.S. PATENT DOCUMENTS

| 5,083,287 A | 1/1992 | Obata et al. |
| 5,130,794 A | 7/1992 | Ritchey |

(Continued)

FOREIGN PATENT DOCUMENTS

| CN | 102771081 A | 11/2012 |
| CN | 103310445 A | 9/2013 |

(Continued)

OTHER PUBLICATIONS

Office Action for U.S. Appl. No. 16/810,681, dated Apr. 2, 2021, Sheng, "Method, Apparatus, Medium, and Device for Processing Multi-Angle Free-Perspective Video Data", 12 Pages.
(Continued)

*Primary Examiner* — Jennifer Mehmood
*Assistant Examiner* — Jed-Justin Imperial
(74) *Attorney, Agent, or Firm* — Lee & Hayes, P.C.

(57) ABSTRACT

A method, a system, a device, and a computer readable storage medium for video reconstruction are disclosed. The method includes: obtaining an image combination of multi-angle free-perspective video frames, parameter data corresponding to the image combinations of the video frames, and position information of a virtual viewpoint based on a user interaction; selecting texture images and depth maps of corresponding groups in the image combinations of the video frames at a time moment of the user interaction according to a preset rule and based on the position information of the virtual viewpoint and the parameter data corresponding to the image combinations of the video frames; and combining and rendering the texture images and the depth maps of the corresponding groups based on the position information of the virtual viewpoint and parameter data corresponding to the depth maps and the texture images of the corresponding groups to obtain a reconstructed image.

19 Claims, 47 Drawing Sheets

(30) Foreign Application Priority Data

| Mar. 7, 2019 | (CN) | 201910172727.0 |
| Mar. 7, 2019 | (CN) | 201910172729.X |
| Mar. 7, 2019 | (CN) | 201910172742.5 |
| Mar. 7, 2019 | (CN) | 201910172743.X |
| Mar. 7, 2019 | (CN) | 201910172761.8 |
| Mar. 7, 2019 | (CN) | 201910173413.2 |
| Mar. 7, 2019 | (CN) | 201910173414.7 |
| Mar. 7, 2019 | (CN) | 201910173415.1 |
| Mar. 7, 2019 | (CN) | 201910177941.5 |

(51) Int. Cl.

| H04N 13/167 | (2018.01) |
| H04N 13/117 | (2018.01) |
| H04N 13/139 | (2018.01) |
| H04N 13/282 | (2018.01) |
| G06T 15/04 | (2011.01) |
| H04N 13/189 | (2018.01) |
| H04N 13/268 | (2018.01) |
| H04N 13/279 | (2018.01) |
| H04N 13/296 | (2018.01) |
| H04N 13/156 | (2018.01) |
| G06F 3/04842 | (2022.01) |
| G06F 3/04883 | (2022.01) |
| G06F 3/16 | (2006.01) |
| H04N 13/293 | (2018.01) |
| G06T 3/40 | (2006.01) |
| H04N 13/349 | (2018.01) |
| H04N 13/172 | (2018.01) |
| G06V 20/40 | (2022.01) |
| H04N 13/00 | (2018.01) |

(52) U.S. Cl.
CPC ............ *G06F 3/167* (2013.01); *G06T 3/4038* (2013.01); *G06T 15/04* (2013.01); *G06T 15/20* (2013.01); *G06V 20/40* (2022.01); *H04N 13/117* (2018.05); *H04N 13/128* (2018.05); *H04N 13/139* (2018.05); *H04N 13/156* (2018.05); *H04N 13/167* (2018.05); *H04N 13/172* (2018.05); *H04N 13/189* (2018.05); *H04N 13/268* (2018.05); *H04N 13/279* (2018.05); *H04N 13/282* (2018.05); *H04N 13/293* (2018.05); *H04N 13/296* (2018.05); *H04N 13/349* (2018.05); *G06T 2200/24* (2013.01); *G06T 2210/36* (2013.01); *H04N 2013/0081* (2013.01)

(56) References Cited

U.S. PATENT DOCUMENTS

| 5,359,362 | A | 10/1994 | Lewis et al. |
| 5,729,471 | A | 3/1998 | Jain et al. |
| 6,100,862 | A | 8/2000 | Sullivan |
| 6,166,748 | A | 12/2000 | Van Hook et al. |
| 6,677,982 | B1 | 1/2004 | Chen et al. |
| 6,765,568 | B2 | 7/2004 | Swift et al. |
| RE39,342 | E | 10/2006 | Starks et al. |
| 7,116,323 | B2 | 10/2006 | Kaye et al. |
| 7,123,777 | B2 | 10/2006 | Rondinelli et al. |
| 7,340,094 | B2 | 3/2008 | Mayhew et al. |
| 7,463,280 | B2 | 12/2008 | Steuart, III |
| 7,471,292 | B2 | 12/2008 | Li |
| 7,588,190 | B2 | 9/2009 | Zhu et al. |
| 7,775,883 | B2 | 8/2010 | Smoot et al. |
| 8,135,238 | B2 | 3/2012 | Au et al. |
| 8,218,855 | B2 | 7/2012 | Kim et al. |
| 8,334,893 | B2 | 12/2012 | Hartman |
| 8,390,674 | B2 | 3/2013 | Kim et al. |
| 8,532,425 | B2 | 9/2013 | Ali et al. |
| 8,538,134 | B2 | 9/2013 | Kim et al. |
| 8,581,961 | B2 | 11/2013 | Lee |
| 8,717,405 | B2 | 5/2014 | Li et al. |
| 8,749,620 | B1 | 6/2014 | Knight et al. |
| 8,860,784 | B2 | 10/2014 | Kobayashi |
| 8,890,954 | B2 | 11/2014 | O'Donnell et al. |
| 8,896,534 | B2 | 11/2014 | Takeda et al. |
| 9,098,926 | B2 | 8/2015 | Quan et al. |
| 9,183,669 | B2 | 11/2015 | Liu et al. |
| 9,478,008 | B1 | 10/2016 | Adsumilli et al. |
| 9,684,994 | B2 | 6/2017 | Vesely et al. |
| 9,769,365 | B1 | 9/2017 | Jannard |
| 9,904,867 | B2 | 2/2018 | Fathi et al. |
| 10,313,656 | B2 | 6/2019 | Sadi et al. |
| 10,341,632 | B2 | 7/2019 | Pang et al. |
| 10,410,418 | B2 | 9/2019 | Kiuchi et al. |
| 10,419,737 | B2 | 9/2019 | Pang et al. |
| 10,419,738 | B1 | 9/2019 | Phillips et al. |
| 10,432,970 | B1 | 10/2019 | Phillips et al. |
| 10,469,873 | B2 | 11/2019 | Pang et al. |
| 10,523,914 | B1 | 12/2019 | Phillips et al. |
| 10,567,464 | B2 | 2/2020 | Pang et al. |
| 10,764,603 | B2 | 9/2020 | Sun et al. |
| 2003/0009773 | A1 | 1/2003 | Carlson |
| 2004/0125044 | A1 | 7/2004 | Suzuki |
| 2006/0028489 | A1 | 2/2006 | Uyttendaele et al. |
| 2008/0253685 | A1 | 10/2008 | Kuranov et al. |
| 2009/0153549 | A1 | 6/2009 | Lynch et al. |
| 2009/0315978 | A1 | 12/2009 | Wurmlin et al. |
| 2010/0146389 | A1 | 6/2010 | Yoo et al. |
| 2010/0238264 | A1 | 9/2010 | Liu et al. |
| 2011/0150101 | A1 | 6/2011 | Liu et al. |
| 2011/0158509 | A1 | 6/2011 | Li et al. |
| 2011/0285704 | A1 | 11/2011 | Takeda et al. |
| 2012/0141016 | A1* | 6/2012 | Wildeboer ............ H04N 13/271 382/154 |
| 2012/0195492 | A1 | 8/2012 | Ali et al. |
| 2012/0262554 | A1 | 10/2012 | Gotsman et al. |
| 2012/0314937 | A1 | 12/2012 | Kim et al. |
| 2012/0329527 | A1 | 12/2012 | Kang |
| 2013/0229487 | A1 | 9/2013 | D'Amato et al. |
| 2013/0321575 | A1 | 12/2013 | Kirk et al. |
| 2014/0085416 | A1 | 3/2014 | Chang et al. |
| 2014/0186002 | A1 | 7/2014 | Hanaya et al. |
| 2014/0198178 | A1 | 7/2014 | Ioffe et al. |
| 2014/0267243 | A1 | 9/2014 | Venkataraman et al. |
| 2014/0267610 | A1 | 9/2014 | Ahmad et al. |
| 2014/0270706 | A1 | 9/2014 | Pasko |
| 2015/0036047 | A1 | 2/2015 | Bledsoe |
| 2015/0294473 | A1 | 10/2015 | Michot et al. |
| 2015/0325039 | A1 | 11/2015 | Lynch |
| 2015/0381972 | A1 | 12/2015 | Kowdle et al. |
| 2016/0050367 | A1 | 2/2016 | Shimauchi et al. |
| 2016/0050435 | A1 | 2/2016 | Zhang et al. |
| 2016/0127728 | A1 | 5/2016 | Tanizawa et al. |
| 2016/0140397 | A1 | 5/2016 | Zhang et al. |
| 2016/0150208 | A1 | 5/2016 | Li et al. |
| 2016/0165308 | A1 | 6/2016 | Stern et al. |
| 2016/0309134 | A1 | 10/2016 | Venkataraman et al. |
| 2016/0323532 | A1 | 11/2016 | Gouda et al. |
| 2016/0381343 | A1 | 12/2016 | Leontaris et al. |
| 2017/0034501 | A1 | 2/2017 | McDevitt |
| 2017/0039765 | A1 | 2/2017 | Zhou et al. |
| 2017/0220887 | A1 | 8/2017 | Fathi et al. |
| 2017/0269685 | A1 | 9/2017 | Marks et al. |
| 2018/0035134 | A1 | 2/2018 | Pang et al. |
| 2018/0061135 | A1 | 3/2018 | Watanabe |
| 2018/0089903 | A1 | 3/2018 | Pang et al. |
| 2018/0097867 | A1 | 4/2018 | Pang et al. |
| 2018/0103243 | A1 | 4/2018 | Lee et al. |
| 2018/0240281 | A1 | 8/2018 | Vincelette |
| 2018/0278918 | A1 | 9/2018 | Peri |
| 2018/0288394 | A1 | 10/2018 | Aizawa |
| 2018/0302647 | A1 | 10/2018 | Tanaka |
| 2018/0343442 | A1 | 11/2018 | Yoshikawa et al. |
| 2018/0359489 | A1 | 12/2018 | Lakshman et al. |
| 2018/0376122 | A1 | 12/2018 | Park et al. |
| 2019/0139296 | A1 | 5/2019 | Lakshman et al. |

(56) References Cited

U.S. PATENT DOCUMENTS

| | | | |
|---|---|---|---|
| 2019/0228565 | A1 | 7/2019 | Yushiya et al. |
| 2019/0313021 | A1 | 10/2019 | Hannuksela |
| 2019/0364263 | A1 | 11/2019 | Jannard et al. |
| 2020/0068188 | A1 | 2/2020 | Maeda |
| 2020/0275083 | A1 | 8/2020 | Yoneda et al. |
| 2020/0275084 | A1 | 8/2020 | Aizawa |
| 2020/0286279 | A1 | 9/2020 | Sheng |
| 2020/0288097 | A1 | 9/2020 | Sheng |
| 2020/0288098 | A1 | 9/2020 | Sheng |
| 2020/0288099 | A1 | 9/2020 | Sheng |
| 2020/0288100 | A1 | 9/2020 | Sheng |
| 2020/0288103 | A1 | 9/2020 | Sheng |
| 2020/0288104 | A1 | 9/2020 | Sheng |
| 2020/0288108 | A1 | 9/2020 | Sheng |
| 2020/0288109 | A1 | 9/2020 | Sheng |
| 2020/0288112 | A1 | 9/2020 | Sheng |
| 2020/0312029 | A1 | 10/2020 | Heinen et al. |
| 2020/0320727 | A1* | 10/2020 | Smolic ............ G06T 7/593 |
| 2021/0191506 | A1 | 6/2021 | Wang et al. |

FOREIGN PATENT DOCUMENTS

| | | |
|---|---|---|
| CN | 103329543 A | 9/2013 |
| CN | 103329548 | 9/2013 |
| CN | 103581651 A | 2/2014 |
| CN | 104284187 A | 4/2015 |
| CN | 104574311 | 4/2015 |
| CN | 105611268 | 5/2016 |
| CN | 108234985 A | 6/2018 |
| CN | 108377374 A | 8/2018 |
| CN | 109361913 A | 2/2019 |
| EP | 2735150 B1 | 5/2014 |
| EP | 2540034 B1 | 11/2017 |
| EP | 2946274 B1 | 8/2018 |
| KR | WO201 6048014 A1 | 3/2016 |
| KR | 10-1807886 B1 | 12/2017 |
| KR | 20180045668 A | 5/2018 |
| WO | WO2015037761 A1 | 3/2015 |
| WO | WO2017080280 A1 | 5/2017 |
| WO | WO2017132636 A1 | 8/2017 |
| WO | WO2018074821 A1 | 4/2018 |

OTHER PUBLICATIONS

Office Action for U.S. Appl. No. 16/810,586, dated Apr. 14, 2021, Sheng, "Method, Apparatus, Medium, and Device for Processing Multi-Angle Free-Perspective Image Data", 17 Pages.

Office Action for U.S. Appl. No. 16/810,695, dated Apr. 19, 2021, Sheng, "Image Reconstruction Method, System, Device and Computer-Readable Storage Medium", 17 Pages.

Office Action for U.S. Appl. No. 16/810,565, dated Feb. 25, 2021, Sheng, "Method, Apparatus, Medium, and Server for Generating Multi-Angle Free-Perspective Video Data", 12 Pages.

Office Action for U.S. Appl. No. 16/810,480, dated Mar. 15, 2021, Sheng, "Method, Apparatus, Medium, Terminal, and Device for Multi-Angle Free-Perspective in Interaction", 19 pages.

Office Action for U.S. Appl. No. 16/810,614, dated Mar. 24, 2021, Sheng, "Video Generating Method, Apparatus, Medium, and Terminal", 11 Pages.

Office Action for U.S. Appl. No. 16/810,362, dated Feb. 23, 2021, Sheng, "Method, Apparatus, Terminal, Capturing System and Device for Setting Capturing Devices", 8 pages.

Office Action for U.S. Appl. No. 16/810,464, dated Mar. 8, 2021, Sheng, "Method, Apparatus, Medium, and Device for Generating Multi-Angle Free-Respective Image Data", 19 pages.

Office Action dated Jan. 8, 2021 for U.S. Appl. No. 16/810,586, "Method, Apparatus, Medium, and Device for Processing Multi-Angle Free-Perspective Image Data", Sheng, 14 pages.

Non Final Office Action dated Nov. 12, 2020 for U.S. Appl. No. 16/810,681, "Method, Apparatus, Medium, and Device for Processing Multi-Angle Free-Perspective Video Data", Sheng, 15 pages Non Final Office Action dated Nov. 27, 2020 for U.S. Appl. No. 16/810,352, "Method, Apparatus, Medium, Terminal, and Device for Multi-Angle Free-Perspective Interaction", Sheng, 17 pages.

Non Final Office Action dated Dec. 15, 2020 for U.S. Appl. No. 16/810,695, "Image Reconstruction Method, System, Device and Computer-Readable Storage Medium", Sheng, 18 pages.

PCT Search Report, and Written Opinion dated May 28, 2020 for PCT Application No. PCT/US20/21220, 9 pages.

PCT Search Report and Written Opinion dated Jun. 2, 202 for PCT Application No. PCT/US20/21231,9 pages.

PCT Search Report and Written Opinion dated Jun. 5, 2020, for PCT Application No. PCT/US20/21187, 9 pages.

PCT Search Report and Written Opinion dated May 20, 2020 for PCT Application No. PCT/US20/21241, 7 pages/.

PCT Search Report and and Written Opinion dated May 22, 2020, for PCT Application No. PC /US20/21167, 14 pages.

PCT Search Report and Written Opinion dated May 26, 2020 for PCT Application No. PCT/US20/21197, 7 pages.

PCT Search Report and Written Opinion dated May 26, 2020 for PCT Application No. PCT/US20/21252, 14 pages.

PCT Search Report and Written Opinion dated Jun. 11, 2020 for PCT Application No. PCT/US20/21164, 8 pages.

PCT Search Report and Written Opinion dated Jun. 11, 2020, for PCT Application No. PCT/US20/21141, 11 pages.

PCT Search Report and Written Opinion dated Jun. 18, 2020 for PCT Application No. PCT/US20/21247, 110 pages.

PCT Search Report and Written Opinion dated Jun. 8, 2020 for PCT Application No. PCT/US2020/021195, 10 pages.

Zhang et al., "Super-resolution reconstruction for multi-angle remote sensing images considering resolution differences", retrieved on May 3, 2020 at <<https://www.mdpi.com/2072-4292/6/1/637/pdf>>, Remote Sensing, vol. 6., No. 1, Jan. 6, 2014, 21 pages.

Moore, et al., "Synchronization of Images from Multiple Cameras to Reconstruct a Moving Human", 2010 14th IEEE/ACM Symposium on Distributed Simulation and Reai-Time Applications, Oct. 17-20, 2010, pp. 53-60.

Non Final Office Action dated Sep. 16, 2020 for U.S. Appl. No. 16/810,362, "Method, Apparatus, Terminal, Capturing System and Device For Setting Capturing Devices", Sheng, 8 pages.

Non Final Office Action dated Sep. 18, 2020 for U.S. Appl. No. 16/810,464, "Method, Apparatus, Medium, and Device for Generating Multi-Angle Free-Respective Image Data", Sheng, 20 pages.

Non Final Office Action dated Oct. 29, 2020 for U.S. Appl. No. 16/810,614, "Video Generating Method, Apparatus, Medium, and Terminal", Sheng, 11 pages.

Non Final Office Action dated Nov. 4, 2020 for U.S. Appl. No. 16/810,237, "Method, Apparatus, Medium, Terminal, and Device for Processing Multi-Angle Free-Perspective Data", Sheng, 19 apges.

Translation of CN Office Action for corresponding CN Application No. 201910173413.2 dated Sep. 1, 2021 , a counterpart foreign application for U.S. Appl. No. 16/810,586, 9 pages.

Translation of CN Office Action for corresponding CN Application No. 201910172720.9 dated Sep. 3, 2021 , a counterpart foreign application for U.S. Appl. No. 16/810,695, 13 pages.

Translation of CN Search Report for corresponding CN Application No. 201910172720.9 dated Aug. 27, 2021 , a counterpart foreign application for U.S. Appl. No. 16/810,695, 3 pages.

Office Action for U.S. Appl. No. 16/810,464, dated Oct. 4, 2021, Sheng, "Method, Apparatus, Medium, and Device for Generating Multi-Angle Free-Respective Image Data", 14 Pages.

Office Action for U.S. Appl. No. 16/810,480, dated Jul. 8, 2021, Sheng, "Method, Apparatus, Medium, Terminal, and Device for Multi-Angle Free-Perspective Interaction", 18 Pages.

Office Action for U.S. Appl. No. 16/810,695, dated Jul. 29, 2021, Sheng, "Image Reconstruction Method, System, Device and Computer-Readable Storage Medium", 18 pages.

International Report on Preliminary Patentability for PCT Application No. PCT/US20/21241, dated Sep. 16, 2021.

International Report on Preliminary Patentability for PCT App No. PCT/US20/21195, dated Sep. 16, 2021.

International Preliminary Report on Patentability for PCT App. No. PCT/US20/21197, dated Sep. 16, 2021.

(56) References Cited

OTHER PUBLICATIONS

Office Action for U.S. Appl. No. 16/810,464, dated Mar. 1, 2022, Sheng, "Method, Apparatus, Medium, and Device for Generating Multi-Angle Free-Respective Image Data ", 15 Pages.

Translation of CN Office Action for corresponding CN Application No. 201910172720.9 dated Mar. 7, 2022 , a counterpart foreign application for U.S. Appl. No. 16/810,695, 13 pages.

Office Action for U.S. Appl. No. 16/810,464, dated Mar. 1, 2022, Sheng, "Method, Apparatus, Medium, and Device for Generating Multi-Angle Free-Respective Image Data ", 13 Pages.

\* cited by examiner

FIG. 20

| Image 1 Pixel 1 | Image 1 Depth Value 1 | Image 2 Pixel 1 | Image 2 Depth Value 1 |

...

| Image 1 Pixel 2 | Image 1 Depth Value 2 | Image 2 Pixel 2 | Image 2 Depth Value 2 |

| Perspective 1 Image | Perspective 2 Image | Perspective 3 Image | Perspective 4 Image |
|---|---|---|---|
| Perspective 5 Image | Perspective 6 Image | Perspective 7 Image | Perspective 8 Image |
| Perspective 1 Depth Map | Perspective 2 Depth Map | Perspective 3 Depth Map | Perspective 4 Depth Map |
| Perspective 5 Depth Map | Perspective 6 Depth Map | Perspective 7 Depth Map | Perspective 8 Depth Map |

FIG. 27

| PERSPECTIVE 1 IMAGE | | PERSPECTIVE 2 IMAGE | |
|---|---|---|---|
| PERSPECTIVE 3 IMAGE | | PERSPECTIVE 4 IMAGE | |
| PERSPECTIVE 5 IMAGE | | PERSPECTIVE 6 IMAGE | |
| PERSPECTIVE 7 IMAGE | | PERSPECTIVE 8 IMAGE | |
| PERSPECTIVE 1 DEPTH MAP | PERSPECTIVE 2 DEPTH MAP | PERSPECTIVE 3 DEPTH MAP | PERSPECTIVE 4 DEPTH MAP |
| PERSPECTIVE 5 DEPTH MAP | PERSPECTIVE 6 DEPTH MAP | PERSPECTIVE 7 DEPTH MAP | PERSPECTIVE 8 DEPTH MAP |

FIG. 28

| Perspective 5 Depth map | Perspective 6 Depth map | Perspective 7 Depth map | Perspective 8 Depth map |
|---|---|---|---|
| Perspective 1 Image || Perspective 2 Image ||
| Perspective 3 Image || Perspective 4 Image ||
| Perspective 5 Image || Perspective 6 Image ||
| Perspective 7 Image || Perspective 8 Image ||
| Perspective 1 Depth map | Perspective 2 Depth map | Perspective 3 Depth map | Perspective 4 Depth map |

FIG. 29

| PERSPECTIVE 1 IMAGE | PERSPECTIVE 2 IMAGE |
|---|---|
| PERSPECTIVE 3 IMAGE | PERSPECTIVE 4 IMAGE |

| PERSPECTIVE 1 DEPTH MAP | PERSPECTIVE 2 DEPTH MAP | PERSPECTIVE 3 DEPTH MAP | PERSPECTIVE 4 DEPTH MAP |
|---|---|---|---|

| PERSPECTIVE 5 IMAGE | PERSPECTIVE 6 IMAGE |
|---|---|
| PERSPECTIVE 7 IMAGE | PERSPECTIVE 8 IMAGE |

| PERSPECTIVE 5 DEPTH MAP | PERSPECTIVE 6 DEPTH MAP | PERSPECTIVE 7 DEPTH MAP | PERSPECTIVE 8 DEPTH MAP |
|---|---|---|---|

FIG. 30

| Perspective 1 Image | Perspective 1 Depth Map | Perspective 2 Image | Perspective 2 Depth Map |
|---|---|---|---|
| Perspective 3 Image | Perspective 3 Depth Map | Perspective 4 Image | Perspective 4 Depth Map |
| Perspective 5 Image | Perspective 5 Depth Map | Perspective 6 Image | Perspective 6 Depth Map |
| Perspective 7 Image | Perspective 7 Depth Map | Perspective 8 Image | Perspective 8 Depth Map |

FIG. 31

| Perspective 1 Image | Perspective 1 Depth Map | Perspective 2 Image | Perspective 2 Depth Map |
|---|---|---|---|
| Perspective 3 Depth Map | Perspective 3 Image | Perspective 4 Depth Map | Perspective 4 Image |
| Perspective 5 Image | Perspective 5 Depth Map | Perspective 6 Image | Perspective 6 Depth Map |
| Perspective 7 Depth Map | Perspective 7 Image | Perspective 8 Depth Map | Perspective 8 Image |

FIG. 32

| IMAGE 1 PIXEL 1 | IMAGE 1 PIXEL 2 | IMAGE 1 PIXEL 3 | IMAGE 2 PIXEL 1 | IMAGE 2 PIXEL 2 | IMAGE 2 PIXEL 3 |
|---|---|---|---|---|---|
| IMAGE 1 PIXEL 4 | IMAGE 1 PIXEL 5 | IMAGE 1 PIXEL 6 | IMAGE 2 PIXEL 4 | IMAGE 2 PIXEL 5 | IMAGE 2 PIXEL 6 |
| IMAGE 1 PIXEL 7 | IMAGE 1 PIXEL 8 | IMAGE 1 PIXEL 9 | IMAGE 2 PIXEL 7 | IMAGE 2 PIXEL 8 | IMAGE 2 PIXEL 9 |
| IMAGE 1 DEPTH VALUE 1 | IMAGE 1 DEPTH VALUE 2 | IMAGE 1 DEPTH VALUE 3 | IMAGE 2 DEPTH VALUE 1 | IMAGE 2 DEPTH VALUE 2 | IMAGE 2 DEPTH VALUE 3 |
| IMAGE 1 DEPTH VALUE 4 | IMAGE 1 DEPTH VALUE 5 | IMAGE 1 DEPTH VALUE 6 | IMAGE 2 DEPTH VALUE 4 | IMAGE 2 DEPTH VALUE 5 | IMAGE 2 DEPTH VALUE 6 |
| IMAGE 1 DEPTH VALUE 7 | IMAGE 1 DEPTH VALUE 8 | IMAGE 1 DEPTH VALUE 9 | IMAGE 2 DEPTH VALUE 7 | IMAGE 2 DEPTH VALUE 8 | IMAGE 2 DEPTH VALUE 9 |

FIG. 35

| Image 1 Pixel 1 | Image 1 Depth 1 | Image 1 Pixel 2 | Image 1 Depth 2 | Image 1 Pixel 3 | Image 1 Depth 3 |
|---|---|---|---|---|---|
| Image 1 Pixel 4 | Image 1 Depth 4 | Image 1 Pixel 5 | Image 1 Depth 5 | Image 1 Pixel 6 | Image 1 Depth 6 |
| Image 1 Pixel 7 | Image 1 Depth 7 | Image 1 Pixel 8 | Image 1 Depth 8 | Image 1 Pixel 9 | Image 1 Depth 9 |
| Image 2 Pixel 1 | Image 2 Depth 1 | Image 2 Pixel 2 | Image 2 Depth 2 | Image 2 Pixel 3 | Image 2 Depth 3 |
| Image 2 Pixel 4 | Image 2 Depth 4 | Image 2 Pixel 5 | Image 2 Depth 5 | Image 2 Pixel 6 | Image 2 Depth 6 |
| Image 2 Pixel 7 | Image 2 Depth 7 | Image 2 Pixel 8 | Image 2 Depth 8 | Image 2 Pixel 9 | Image 2 Depth 9 |

FIG. 36

VIDEO RECONSTRUCTION METHOD, SYSTEM, DEVICE, AND COMPUTER READABLE STORAGE MEDIUM

CROSS REFERENCE TO RELATED PATENT APPLICATIONS

This application claims priority to the following Chinese Patent Applications: (1) CN201910177941.5, filed on 7 Mar. 2019, entitled "Method and Apparatus for Setting Capturing Device, Terminal, Capturing System and Device", (2) CN201910172743.X, filed on 7 Mar. 2019, entitled "Multi-Angle Free-Perspective Image Data Generating Method and Apparatus, Medium, and Device", (3) CN201910172727.0, filed on 7 Mar. 2019, entitled "Method, Apparatus, Medium, and Server for Generating Multi-angle Free-perspective Video Data", (4) CN201910172742.5, filed on 7 Mar. 2019, entitled "Multi-Angle Free-Perspective Data Processing Method and Apparatus, Medium, Terminal, and Device", (5) CN201910172729.X, filed on 7 Mar. 2019, entitled "Multi-Angle Free-Perspective Interaction Method and Apparatus, Medium, Terminal, and Device", (6) CN201910173415.1, filed on 7 Mar. 2019, entitled "Multi-Angle Free-Perspective Interaction Method and Apparatus, Medium, Terminal, and Device", (7) CN201910173413.2, filed on 7 Mar. 2019, entitled "Multi-Angle Free-Perspective Image Data Processing Method and Apparatus, Medium and Device", (8) CN201910173414.7, filed on 7 Mar. 2019, entitled "Multi-Angle Free-Perspective Video Data Processing Method and Apparatus, Medium, and Device", (9) CN201910172761.8, filed on 7 Mar. 2019, entitled "Video Generating Method and Apparatus, Medium, and Terminal", (10) CN201910172717.7, filed on 7 Mar. 2019, entitled "Video Reconstruction Method, System, Device, and Computer Readable Storage Medium", (11) CN201910172720.9, filed on 7 Mar. 2019, entitled "Image Reconstruction Method, System, Device, and Computer Readable Storage Medium", which are hereby incorporated by reference in their entirety.

TECHNICAL FIELD

The present disclosure relates to the field of video processing, and in particular, to video reconstruction methods, systems, devices, and computer readable storage media.

BACKGROUND

The 6 degrees of Freedom (6DoF) technology is a technology to provide viewing experience having a high degree of freedom. During viewing, a user can adjust a viewing perspective through an interactive means, and perform viewing from the perspective of a free viewpoint, thereby being able to greatly enhance the viewing experience. 6DoF videos can provide users with the experience of switching degrees of freedom while viewing.

Currently, there are Free-D playback technology and light field rendering technology for implementing for 6DoF videos. The Free-D playback technology represents a 6DoF video through a point cloud, and the point cloud represents and stores information of three-dimensional positions and pixels of all points in space. The light field rendering technology creates a light field database of a scene by taking a set of photos of the scene in advance without the need of depth information or correlation of images, and then for any given new viewpoint, obtains a view of the viewpoint through resampling and bilinear interpolation operations, thus realizing the roaming of the entire scene.

However, the Free-D playback technology and the light field rendering technology both require a very large amount of data computations. In addition, no good standard, and industrial hardware and software support currently exist for point cloud compression, which is not conducive to promotion and popularization.

SUMMARY

This Summary is provided to introduce a selection of implementations in a simplified form that are further described below in Detailed Description. This Summary is not intended to identify all features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Accordingly, embodiments of the present disclosure provide a method, a system, a device, and a computer readable storage medium for video reconstruction, in order to reduce the amount of data computations in a process of reconstructing a video that has multiple degrees of freedom.

In one aspect, the embodiments of the present disclosure provide a video reconstruction method. The method includes: obtaining an image combination of multi-angle free-perspective video frames, parameter data corresponding to the image combinations of the video frames, and position information of a virtual viewpoint based on a user interaction, wherein the image combinations of the video frames includes multiple groups of texture images and depth maps with multiple synchronized angles and having correspondence relationships; selecting texture images and depth maps of corresponding groups in the image combinations of the video frames at a time moment of the user interaction according to a preset rule and based on the position information of the virtual viewpoint and the parameter data corresponding to the image combinations of the video frames; and combining and rendering the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain a reconstructed image corresponding to a position of the virtual viewpoint at the time moment of the user interaction.

In an example embodiment, selecting the texture images and the depth maps of the corresponding groups in the image combinations of the video frames at the time moment of the user interaction according to the preset rule and based on the position information of the virtual viewpoint and the parameter data corresponding to the image combinations of the video frames includes: selecting texture images and depth maps of corresponding groups satisfying a preset position relationship and/or a quantity relationship with the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

Selecting the texture images and the depth maps of the corresponding groups satisfying the preset position relationship and/or the quantity relationship with the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction includes: selecting texture images and depth maps of a predetermined number of corresponding groups that are closest to the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

In an example embodiment, selecting the texture images and the depth maps of the predetermined number of corresponding groups that are closest to the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction includes: selecting texture maps and depth maps corresponding to 2 to N capturing devices that are closest to the position of the virtual viewpoint, based on the position information of the virtual viewpoint and the parameter data corresponding to the texture images and the depth maps of the corresponding groups in the image combinations of the video frames at the time moment of the user interaction, wherein N is the number of all capturing devices that capture the image combinations of the video frames.

In an example embodiment, combining and rendering the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain the reconstructed image corresponding the position of the virtual viewpoint at the time moment of the user interaction includes: separately performing forward projection on the depth maps of the corresponding groups in the image combinations of the video frames selected at the time moment of the user interaction to map thereof to a virtual position at the time moment of user interaction; separately performing postprocessing on the forward-projected depth maps; separately performing backward projection on the texture images of the corresponding groups in the image combinations of the video frames selected at the time moment of the user interaction; and combining each virtual texture image that is generated after the backward projection.

In an example embodiment, after combining each virtual texture image that is generated after the backward projection, the method further includes: performing inpainting on the combined texture image to obtain the reconstructed image corresponding to the position of the virtual viewpoint at the time moment of the user interaction.

In an example embodiment, separately performing the postprocessing on the forward-projected depth maps includes at least one of the following: separately performing foreground edge protection processing on the forward-projected depth maps, or separately performing pixel level filtering on the forward-projected depth maps.

In an example embodiment, combining each virtual texture image that is generated after the backward projection includes: combining each virtual texture image that is generated after the backward projection using global weights determined by distances between the position of the virtual viewpoint and positions of capturing devices that capture the corresponding texture maps in the image combination, based on the position information of the virtual viewpoint and the parameter data corresponding to the texture maps and the depth maps of the corresponding groups in the image combinations of the video frames at the time moment of the user interaction.

In an example embodiment, combining and rendering the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain the reconstructed image corresponding the position of the virtual viewpoint at the time moment of the user interaction includes: separately mapping the depth maps of the corresponding groups to the position of the virtual viewpoint at the time of the user interaction according to a spatial geometric relationship, to form virtual viewpoint position depth maps, and copying pixel points from the texture images of the corresponding groups to the generated texture images corresponding to the position of the virtual viewpoint according to the mapped depth maps to form corresponding virtual texture images of the corresponding groups; and combining the corresponding virtual texture images of the corresponding groups in the image combinations of the video frames at the time moment of the user interaction to obtain the reconstructed image of the position of the virtual viewpoint at the time moment of the user interaction.

In an example embodiment, combining the corresponding virtual texture images of the corresponding groups in the image combinations of the video frames at the time moment of the user interaction to obtain the reconstructed image of the position of the virtual viewpoint at the time moment of the user interaction includes: performing weighting processing on pixels of corresponding positions in the virtual texture map corresponding to the corresponding groups in the frame image combinations of the video frames at the time moment of the user interaction to obtain pixel values of the corresponding positions in the reconstructed image of the position of the virtual viewpoint at the time moment of the user interaction; and performing inpainting using pixels around a pixel in the reconstructed image for a position whose pixel value is zero in the reconstructed image of the position of the virtual viewpoint at the time of the user interaction, to obtain the reconstructed image of the virtual viewpoint position at the time moment of the user interaction.

In an example embodiment, combining the corresponding virtual texture images of the corresponding groups in the image combinations of the video frames at the time moment of the user interaction to obtain the reconstructed image of the position of the virtual viewpoint at the time moment of the user interaction includes: separately using surrounding pixel values to perform inpainting for positions whose pixel values are zero in the virtual texture images corresponding to the corresponding groups in the image combinations of the video frames at the time moment of the user interaction; and performing weighting processing on pixel values at corresponding positions in the virtual texture images corresponding to the corresponding groups after the inpainting to obtain the reconstructed image of the position of the virtual viewpoint at the time moment of the user interaction.

In an example embodiment, obtaining the image combination of the multi-angle free perspective video frames and the parameter data corresponding to the image combinations of the video frames includes: decoding compressed data of multi-angle free perspective video to obtain the image combination of the multi-angle free perspective video frames, and the parameter data corresponding to the image combinations of the video frames.

The embodiments of the present disclosure further provide a video reconstruction device including a memory and a processor, wherein the memory stores computer instructions that are executable by the processor, and when the processor performs the steps of the video reconstruction method according to any one of the above embodiments when executing the computer instructions.

In an example embodiment, the video reconstruction device includes at least one of a terminal device, or an edge node.

The embodiments of the present disclosure further provide a computer readable storage media storing computer instructions that, when executed, perform the steps of the video reconstruction method according to any one of the above embodiments.

By adopting the video reconstruction method in the embodiments of the present disclosure, image combinations of video frames of multiple angles and free perspectives, parameter data corresponding to the image combinations of the video frames, and position information of a virtual viewpoint according to a user interaction are obtained. The image combinations of the video frames includes multiple angle-synchronized groups of texture images and depth maps that have a correspondence relationship. Texture images and depth maps of corresponding groups in the image combinations of the video frames are selected at a time moment of the user interaction according to a preset rule and based on the position information of the virtual viewpoint and the parameter data corresponding to the image combinations of the video frames. Combining and rendering need to be performed for texture images and the depth maps of the corresponding groups in the image combinations of the video frames that are selected at the time moment of the user interaction only based on the position information of the virtual viewpoint and parameter data corresponding to the depth maps and the texture images of the corresponding groups that are selected in the image combinations of the video frames at the time moment of the user interaction, without the need of performing video image reconstruction based on texture maps and depth maps of all of the groups in the image combinations of the video frames at the time moment of the user interaction, thus reducing an amount of data computations during a process of video reconstruction.

Furthermore, texture images and depth maps of corresponding groups satisfying a preset position relationship and/or a quantity relationship with the position of the virtual viewpoint are selected based on the position information of the virtual viewpoint and the parameter data corresponding to the texture images and the depth maps of the corresponding groups in the image combinations of the video frames at the time moment of the user interaction, which can provide a higher degree of freedom of selection and flexibility, while reducing an amount of data computations and ensuring the quality of the reconstructed image. Moreover, installation requirements of an image capturing device that captures videos are lowered, thus facilitating to adapt to different site requirements with ease of installation.

Furthermore, selecting texture images and depth maps of a predetermined number of corresponding groups that are closest to the position of the virtual viewpoint based on the position information of the virtual viewpoint and the parameter data corresponding to the texture images and the depth maps of the corresponding groups in the image combinations of the video frames at the time moment of the user interaction can reduce an amount of data computations and ensure the quality of the reconstructed image.

Furthermore, texture maps and depth maps corresponding to 2 to N capturing devices that are closest to the position of the virtual viewpoint are selected based on the position information of the virtual viewpoint and the parameter data corresponding to the texture images and the depth maps of the corresponding groups in the image combinations of the video frames at the time moment of the user interaction, wherein N is the number of all capturing devices that capture the image combinations of the video frames. Therefore, texture images captured by a plurality of capturing devices that are closest to the position of the virtual viewpoint and corresponding depth maps may be selected according to needs, which thereby can obtain a reconstructed image that satisfies a resolution requirement using a minimal amount of data, and can save transmission resources at the same time.

Furthermore, forward projection is separately performed on the depth maps of the corresponding groups in the image combinations of the video frames that are selected at the time moment of the user interaction to map thereof to a virtual position at the time moment of user interaction. Postprocessing is separately performed on the forward-projected depth maps, and backward projection is separately performed on the texture images of the corresponding groups in the image combinations of the video frames that are selected at the time moment of the user interaction. Virtual texture images that are generated after the backward projection are combined. After the above processing, the reconstructed image at the position of the virtual viewpoint at the time moment of the user interaction is obtained. Since only a portion of texture images and depth maps in the image combination are used for performing reconstruction, and using video data including the texture images and the depth maps of the image combination of multiple angles and free perspectives occupies a relatively less amount of data, which thus can save processing resources and improve the efficiency of video reconstruction.

Furthermore, performing inpainting on the combined texture image to obtain the reconstructed image corresponding to the position of the virtual viewpoint at the time moment of the user interaction can improve the quality of the reconstructed image.

Furthermore, separately performing foreground edge protection processing on the forward-projected depth maps, and/or separately performing pixel level filtering on the forward-projected depth maps when performing the postprocessing on the forward-projected depth maps can improve the quality of depth maps that are reconstructed.

Furthermore, combining each virtual texture image that is generated after the backward projection using global weights determined by distances between the position of the virtual viewpoint and positions of capturing devices that capture the corresponding texture maps in the image combination based on the position information of the virtual viewpoint and the parameter data corresponding to the texture maps and the depth maps of the corresponding groups in the image combinations of the video frames at the time moment of the user interaction can make the reconstructed image more real, and further improve the quality of the reconstructed video.

Furthermore, after decoding compressed data of the multi-angle free-perspective video, the method of the embodiments of the present disclosure is used for performing video reconstruction, which can further save network transmission resources, and can also use a common compression method and compression software and hardware for performing compression, thus leading to promotion and popularity.

Furthermore, the video reconstruction solutions in the embodiments of the present disclosure are applied to a device such as a terminal device, an edge node device, and the like, and can be adapted to a device with limited computing capabilities, such as a terminal device, an edge node device, etc., so as to satisfy viewing requirements of a user for viewing a video based on a virtual viewpoint, and to enhance user visual experience.

BRIEF DESCRIPTION OF THE DRAWINGS

FIG. 20 is a schematic diagram of distribution positions of the pixel data and the depth data of a single image in an example embodiment of the present disclosure;

FIG. 25 is a schematic diagram of distribution positions of the pixel data and the depth data of another image in an example embodiment of the present disclosure;

FIG. 27 is a schematic diagram of a structure of a stitched image in an example embodiment of the present disclosure;

FIG. 28 is a schematic diagram of another structure of a stitched image in an example embodiment of the present disclosure;

FIG. 29 is a schematic diagram of another structure of a stitched image in an example embodiment of the present disclosure;

FIG. 30 is a schematic diagram of another structure of a stitched image in an example embodiment of the present disclosure;

FIG. 31 is a schematic diagram of another structure of a stitched image in an example embodiment of the present disclosure;

FIG. 32 is a schematic diagram of another structure of a stitched image in an example embodiment of the present disclosure;

FIG. 35 is a schematic diagram of data storage in a stitched image in an example embodiment of the present disclosure;

FIG. 36 is a schematic diagram of another data storage in a stitched image in an embodiment of the present disclosure;

DETAILED DESCRIPTION

Figure 1:
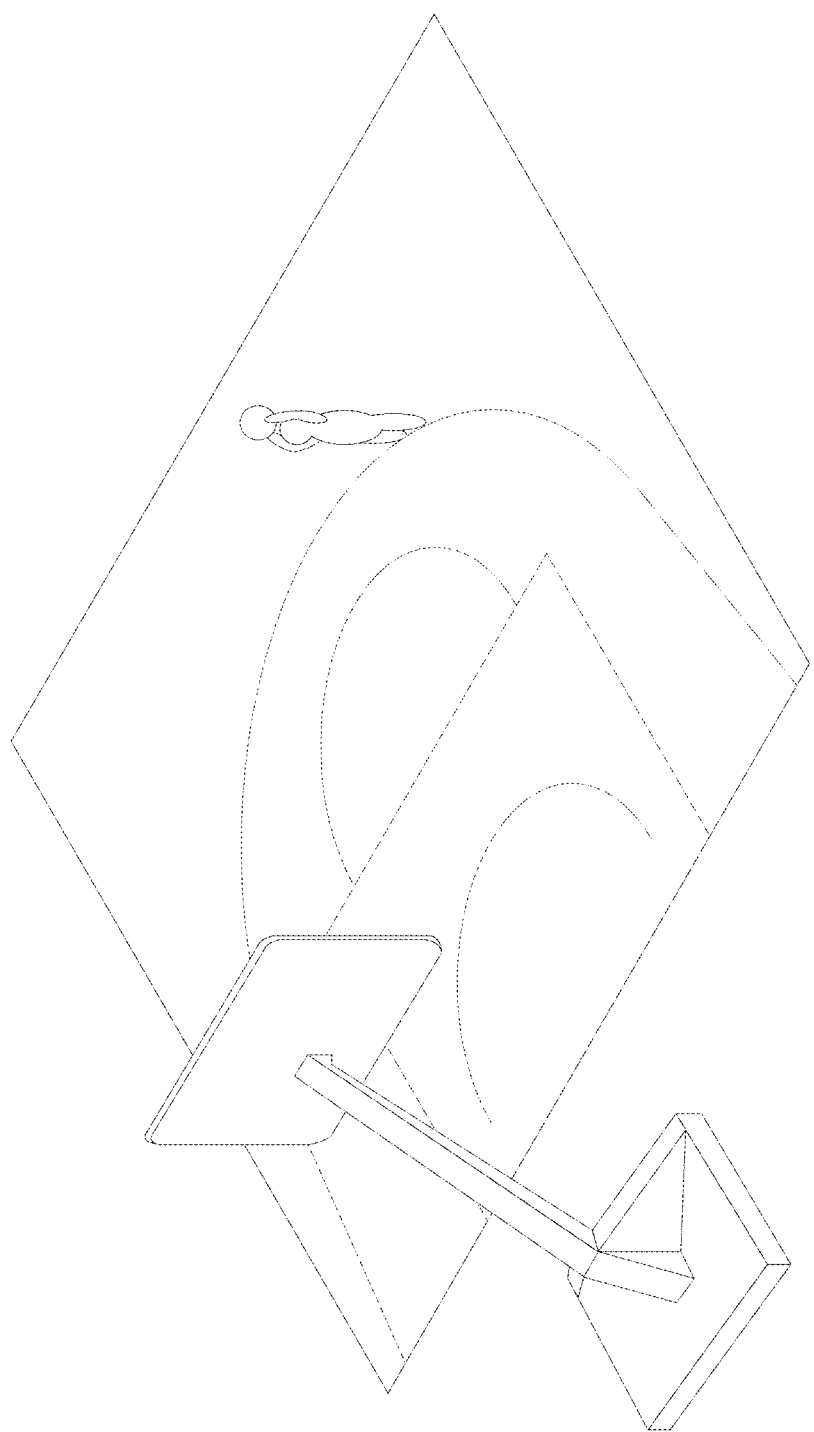
FIG. 1 is a schematic diagram of a to-be-viewed area in an example embodiment of the present disclosure.

To enable a person of ordinary skill in the art to better understand the solutions of the present disclosure, hereinafter, technical solutions in the example embodiments of the present disclosure will be clearly and thoroughly described with reference to the accompanying drawings in the example embodiments of the present disclosure. Example embodiments described herein merely represent some of the example embodiments of the present disclosure. Other example embodiments obtained by a person of ordinary skill in the art based on the example embodiments of the present disclosure without making creative efforts should fall within the scope of the present disclosure.

As mentioned earlier, in order to achieve a video with multiple degrees of freedom, a large amount of data computations is required. For example, a point cloud is used to represent a video with multiple degrees of freedom. Since a point cloud represents and stores three-dimensional position and pixel information of all points in space, a very large amount of storage is required. Accordingly, during a process of video reconstruction, a very large amount of data computations is also required. If video reconstruction is performed in the cloud by using the video reconstruction method as described above, a great processing pressure will be exerted on a cloud reconstruction device. If the video reconstruction is performed on a terminal, it is difficult for the terminal to process such a large amount of data due to a limited processing power. In addition, there is currently no good standard for point cloud compression and industrial hardware and software support, which is not conducive to promotion and popularization.

In view of the above technical problems, the embodiments of the present disclosure provide image combinations of video frames with multiple angles and free perspectives, parameter data corresponding to the image combinations of the video frames, and position information of a virtual viewpoint based on a user interaction. The image combinations of the video frames includes multiple angle-synchronized groups of texture images and depth maps with correspondence relationships. During a process of video reconstruction, texture images and depth maps of corresponding groups in the image combinations of the video frames at a time moment of the user interaction are selected according to preset rule based on the position information of the virtual viewpoint and the parameter data corresponding to the image combination of the video frame. The texture images and the depth maps of the corresponding groups in the image combinations of the video frames at the time moment of the user interaction that are selected based on the position information of the virtual viewpoint and the parameter data corresponding to the texture images and the depth maps of the corresponding groups at the time moment of the user interaction are combined and rendered to obtain a reconstructed image corresponding to a position of the virtual viewpoint at the time moment of the user interaction. Since the entire process of video reconstruction needs to combine and render the texture images and the depth maps of the corresponding groups at the time moment of the user interaction only based on the position information of the virtual viewpoint and the parameter data corresponding to the texture images and the depth maps of the corresponding groups at the time moment of the user interaction, without the need of performing video image reconstruction based on texture maps and depth maps of all the groups in the video frames that are obtained by decoding, an amount of data computations in the process of video reconstruction can be reduced.

In order to make the above objectives, features, and beneficial effects of the present disclosure more comprehensible, example embodiments of the present disclosure will be described in detail hereinafter with reference to the accompanying drawings.

In the embodiments of the present disclosure, video compressed data or image data can be obtained by a capturing device. In order to enable a those skilled in the art to better understand and implement the embodiments of the present disclosure, specific application scenarios are described hereinafter.

Figure 41:
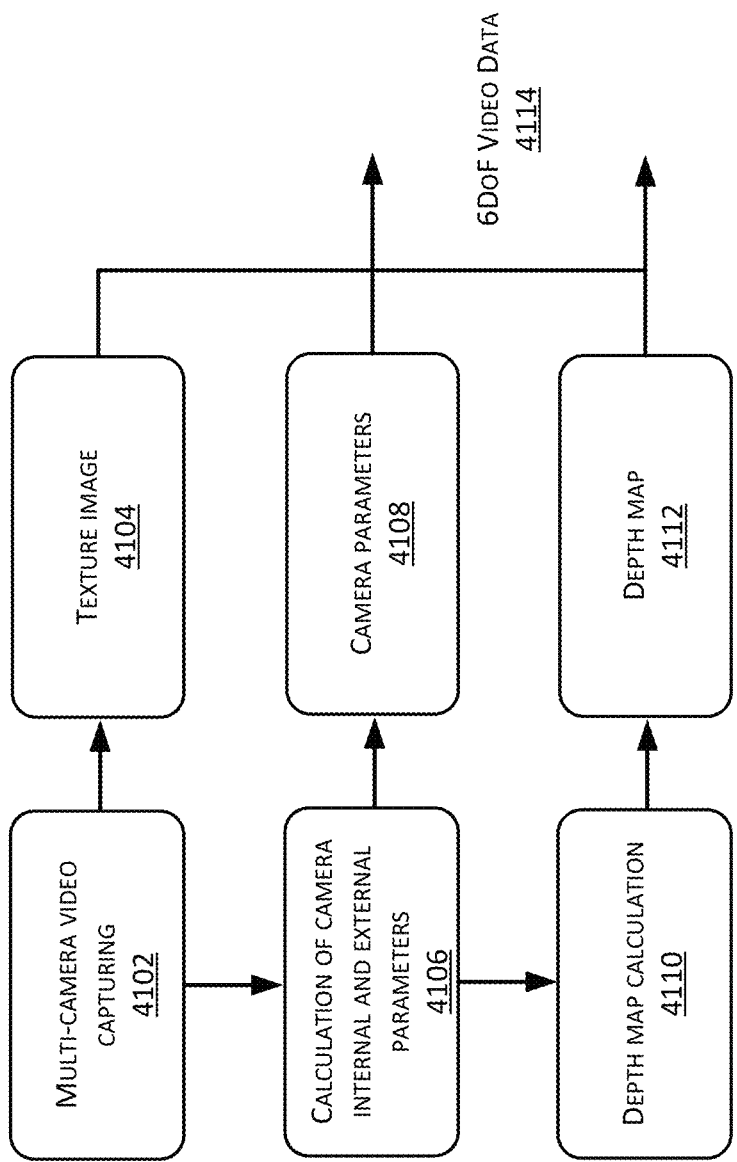
FIG. 41 is a schematic diagram of a process for generating multi-angle free-perspective data in an example embodiment of the present disclosure.

As an example embodiment of the present disclosure, the following steps may be included. The first step is capturing and depth map calculation, including three main steps, which respectively are multi-camera video capturing, camera internal and external parameter calculation (camera parameter estimation), and depth map calculation. For multi-camera capturing, the videos captured by respective cameras are required to be aligned at the frame level. Referring to FIG. 41, through the multi-camera video capturing at 4102, a texture image may be obtained at 4104, i.e., the multiple synchronized images as described hereinafter. Through the calculation of camera internal and external parameters at 4106, camera parameters (i.e., parameter data as described in the following text) may be obtained at 4108, including internal parameter data and external parameter data as described hereinafter. Through the depth map calculation at 4110, a depth map may be obtained at 4112.

Figure 42:
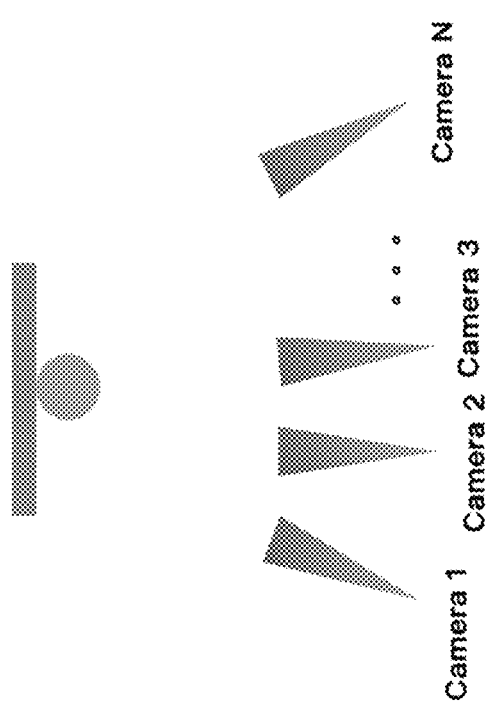
FIG. 42 is a schematic diagram of a multi-camera 6DoF capturing system in an example embodiment of the present disclosure.

In this solution, no special camera, such as a light field camera, is required to capture the video. Similarly, no complicated camera calibration is required before capturing. Positions of multiple cameras may be laid out and arranged to better capture the objects or scenarios that need to be captured. Referring to FIG. 42, multiple capturing devices, such as camera 1 to camera N, may be set in the to-be-viewed area.

After the above three steps are processed, the texture image captured from multiple cameras, all camera parameters, and the depth map of each camera are obtained. These three pieces of data may be referred to as data files in multi-angle free-perspective video data, and may also be referred to as 6 degrees of freedom video data (6DoF video data) 4114. Because of these pieces of data, the user terminal may generate a virtual viewpoint based on the virtual 6 degrees of freedom (DoF) position, thereby providing a 6DoF video experience.

Figure 43:
FIG. 43 is a schematic diagram of generating and processing of 6DoF video data in an example embodiment of the present disclosure.

Referring to FIG. 43, 6DoF video data and indicative data (metadata at 4302) may be compressed and transmitted to the user side at 4304. The user side may obtain the user-side 6DoF expression at 4306 according to the received data, i.e., the above 6DoF video data and metadata, and thereby the user side may perform 6DoF rendering, where the indicative data may also be referred to as metadata.

Figure 44:
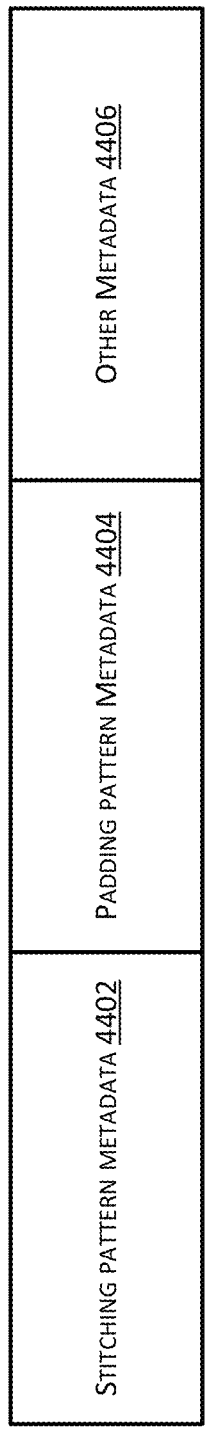
FIG. 44 is a structural schematic diagram of the data header file in an example embodiment of the present disclosure.

Referring to FIG. 44, metadata may be used to describe the data pattern of 6DoF video data, which may include stitching pattern metadata 4402, which is used to indicate storage rules of the pixel data and the depth data of multiple images in the stitched image; padding pattern metadata 4404, which may be used to indicate the padding pattern in the stitched image; and other metadata 4406. The metadata may be stored in the data header file, and the storage order may be as shown in FIG. 44, or may be other orders.

Figure 45:
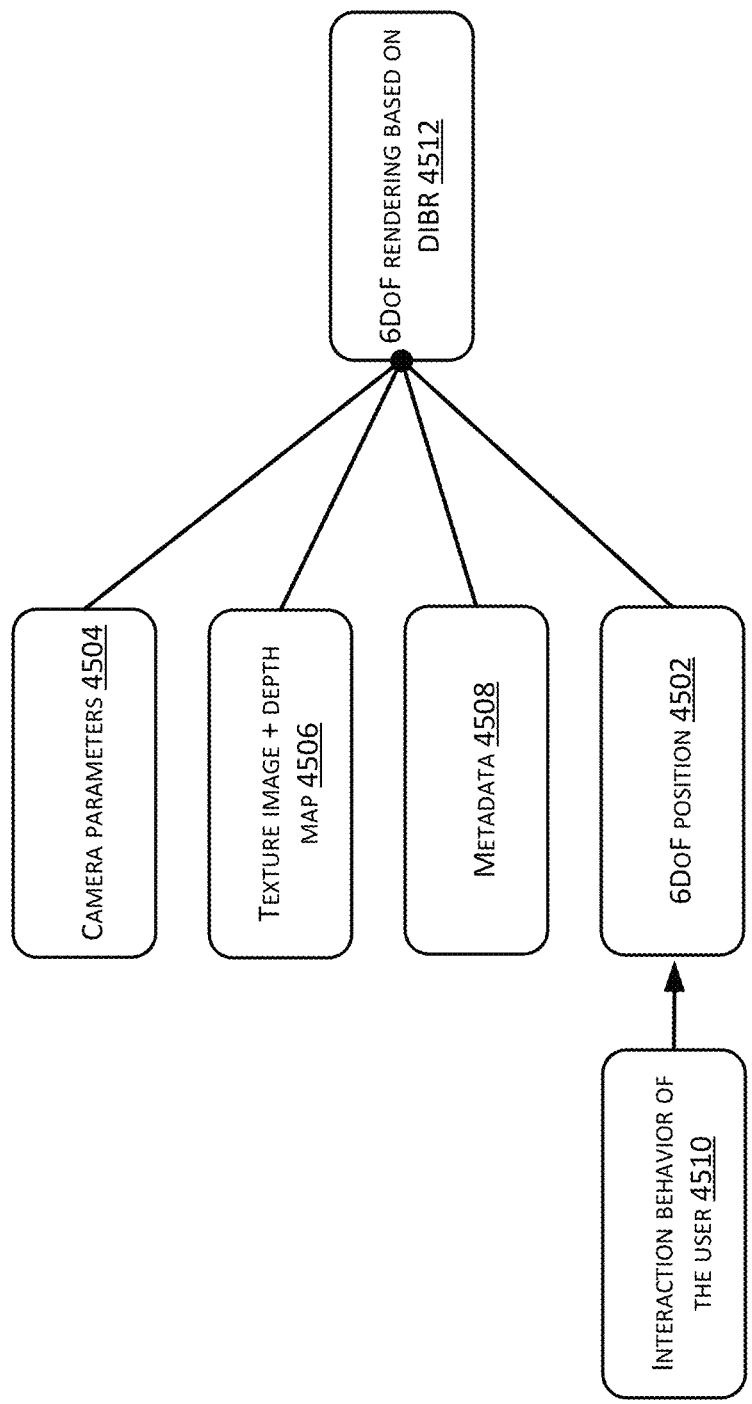
FIG. 45 is a schematic diagram of 6DoF video data processing on the user side in an example embodiment of the present disclosure.

Referring to FIG. 45, the user terminal obtains 6DoF video data, which includes 6DoF position 4502 camera parameters 4504, the texture image and the depth map 4506, and descriptive metadata 4508 (i.e., the metadata described above), in addition, interaction behavior data of the user terminal 4510. With these pieces of data, the user may use 6DoF rendering based on depth map-based rendering (DIBR) 4512 to generate the virtual viewpoint image at the 6DoF position generated according to the user behavior, that is, to determine the virtual viewpoint of the 6DoF position corresponding to the instruction according to the user instruction.

In an example embodiment implemented during a test, each test example includes 20 seconds of video data. The video data is 30 frames/second with a resolution of 1920*1080. For any one of the 30 cameras, there are 600 frames of data in total. The main folder includes the texture image folder and the depth map folder. Under the texture image folder, the secondary directories from 0 to 599 may be found. These secondary directories respectively represent 600 frames of content corresponding to the 20-second video. Each secondary directory includes texture images captured by 30 cameras, named from 0.yuv to 29.yuv in the format of yuv420. Accordingly, in the depth map folder, each secondary directory includes 30 depth maps calculated by the depth estimation algorithm. Each depth map corresponds to the texture image with the same name. The texture images and corresponding depth maps of multiple cameras belong to a certain frame moment in the 20-second video.

All depth maps in the test example are generated by a preset depth estimation algorithm. In the test, these depth maps may provide good virtual viewpoint reconstruction quality at the virtual 6DoF position. In one case, a reconstructed image of the virtual viewpoint may be generated directly from the given depth maps. Alternatively, the depth map may also be generated or improved by the depth calculation algorithm based on the original texture image.

In addition to the depth map and the texture image, the test example also includes a .sfm file, which is used to describe the parameters of all 30 cameras. The data of the .sfm file is written in binary format. The data format is described hereinafter. Considering the adaptability to different cameras, a fisheye camera model with distortion parameters was used in the test. How to read and use camera parameter data from the file may be understood with reference to DIBR reference software provided by us. The camera parameter data includes the following fields:

(1) krt_R is the rotation matrix of the camera;
(2) krt_cc is the optical center position of the camera;
(3) krt_WorldPosition is the three-dimensional space coordinate of the camera;
(4) krt_kc is the distortion coefficient of the camera;
(5) src_width is the width of the calibration image;
(6) src_height is the height of the calibration image; and
(7) fisheye_radius and lens_fov are parameters of the fisheye camera.

In the technical solutions implemented by the present disclosure, the user may find the detailed code of how to read the corresponding parameters in the .sfm file from the preset parameter reading function (set_sfm_parameters function).

In the video reconstruction system or DIBR software used by the embodiments of the present disclosure, camera parameters, the texture image, the depth map, and the 6DoF position of the virtual camera are received as inputs, and the generated texture image and depth map at the virtual 6DoF position are output at the same time. The 6DoF position of the virtual camera is the above 6DoF position determined according to user behavior. The DIBR software may be the software that implements image reconstruction based on the virtual viewpoint in the example embodiments of the present disclosure.

Figure 46:
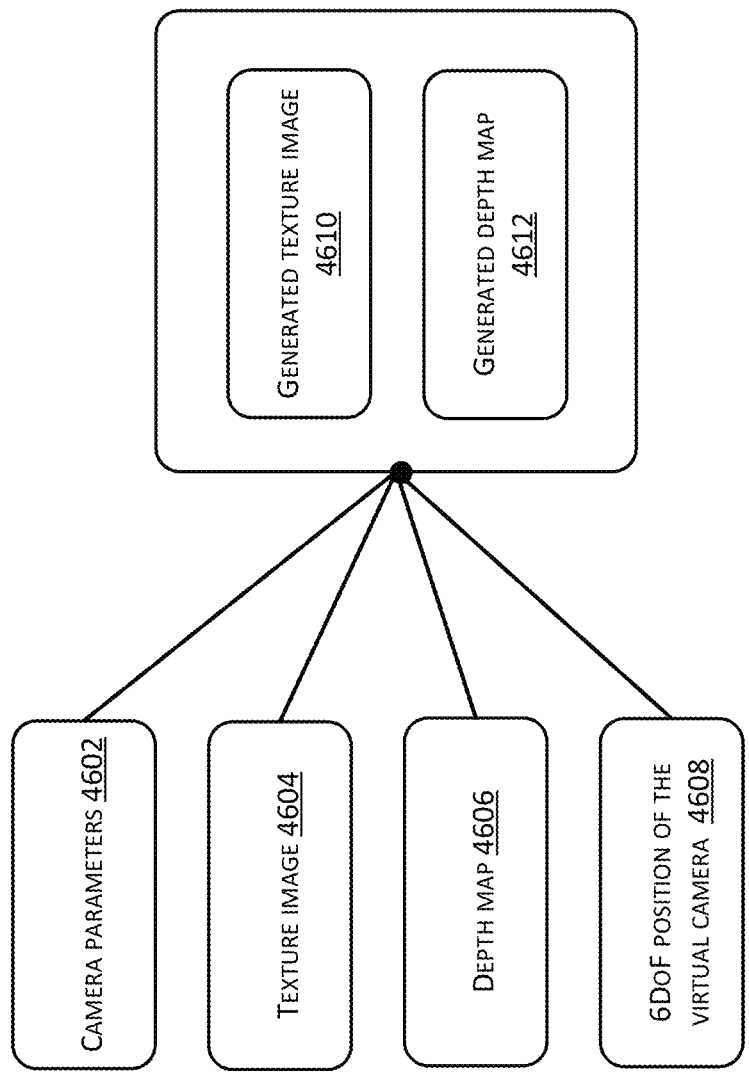
FIG. 46 is a schematic diagram of input and output of a video reconstruction system in an example embodiment of the present disclosure.

Referring to FIG. 46, in the DIBR software used by the embodiments of the present disclosure, camera parameters 4602, the texture image 4604, the depth map 4606, and the 6DoF position of the virtual camera 4608 are received as inputs, and generated texture image 4610 and generated depth map 4612 at the virtual 6DoF position are output at the same time.

Figure 47:
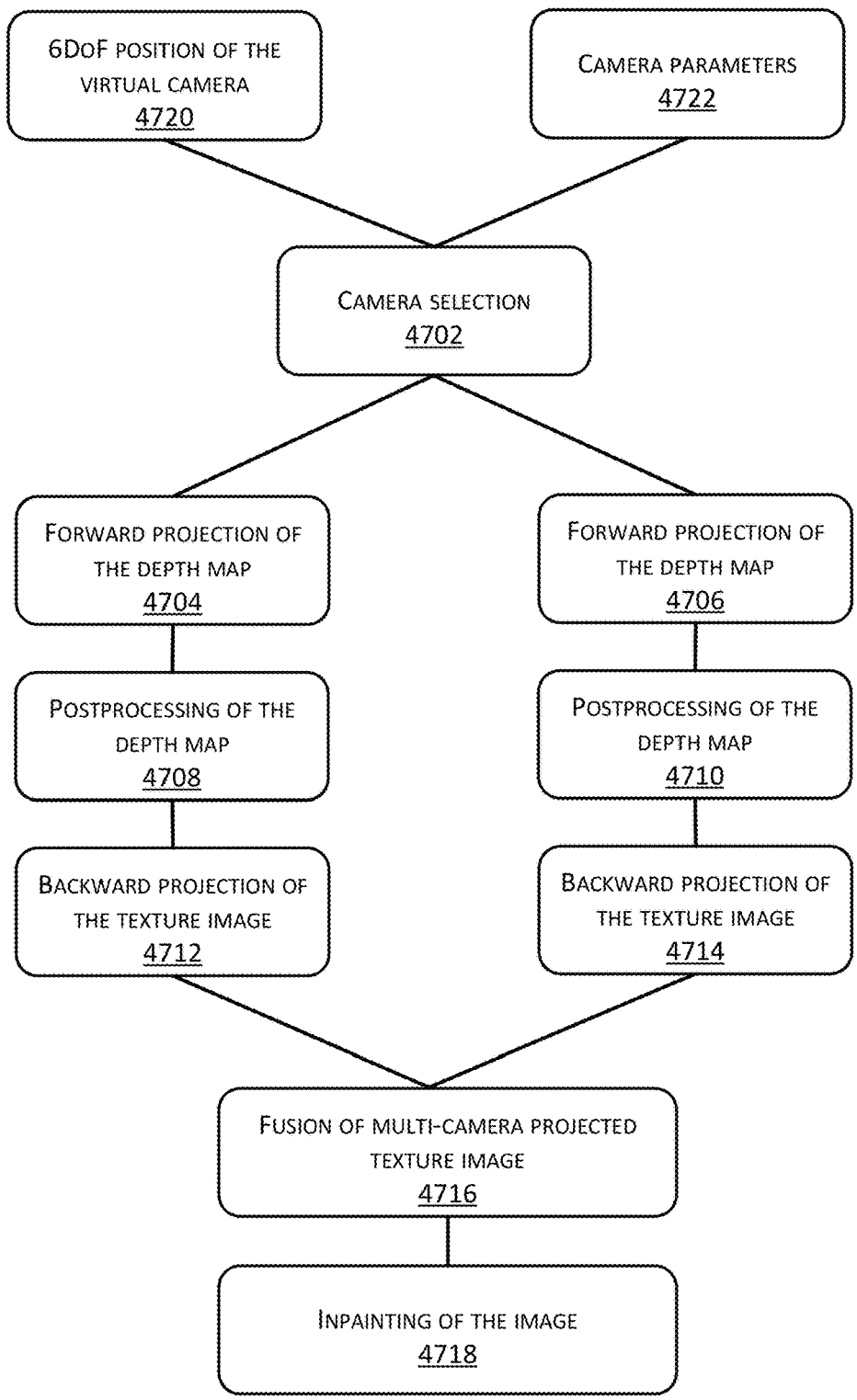
FIG. 47 is a schematic diagram of an architecture of an implementation of a video reconstruction system in an example embodiment of the present disclosure.

Referring to FIG. 47, the video reconstruction method implemented in the embodiments of the present disclosure, or the software that is capable of implementing the video reconstruction method of the embodiments of the present disclosure may include some or all of the following processing steps: camera selection 4702, forward projection of the depth map 4704 and 4706, postprocessing of the depth map 4708 and 4710, backward projection of the texture image 4712 and 4714, fusion of multi-camera projected texture image, and inpainting of the image.

In the foregoing DIBR software, two cameras closest to the virtual 6DoF position may be selected by default to generate the virtual viewpoint.

In the postprocessing step of the depth map, the quality of the depth map may be improved by various methods, such as foreground padding, pixel-level filtering, and the like.

For the output generated image, a method 4716 for fusing texture images from two cameras is used. The fusion weight is a global weight and is determined by the distance of the position of the virtual viewpoint from the position of the reference camera. When the pixel of the output virtual viewpoint image is projected to only one camera, the projected pixel may be directly used as the value of the output pixel.

After the fusion step, if there are still hollow pixels that have not been projected to, an inpainting 4718 method may be used to fill the hollow pixels.

For the output depth map, for the convenience of errors and analysis, a depth map obtained by projecting from one of the cameras to the position of the virtual viewpoint may be used as the output.

Additionally, 6DoF position of the virtual camera 4720 and camera parameters 4722 may be used as the input for the camera selection step 4720.

Those skilled in the art may understand that the above example embodiments are merely examples and are not limitations on the implementation manners. The technical solutions in the embodiments of the present disclosure will be further described hereinafter.

Referring to FIG. 1, the to-be-viewed area may be a basketball court, and multiple capturing devices may be provided to perform data capturing on the to-be-viewed area.

Figure 2:
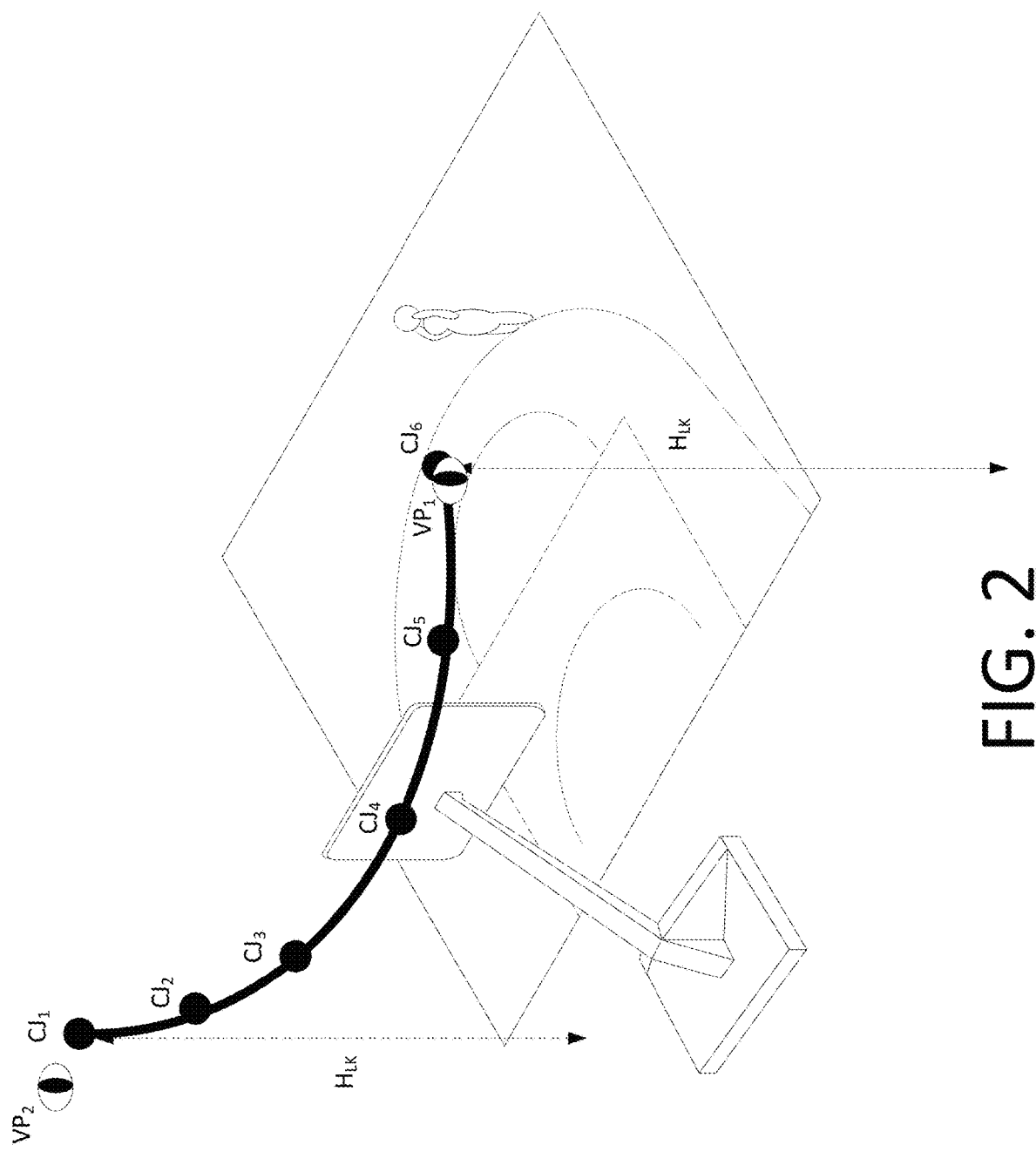
FIG. 2 is a schematic diagram of a setting method of capturing devices in an example embodiment of the present disclosure.

For example, referring to FIG. 2, several capturing devices may be set along a certain path at a height $H_{LK}$ higher than the hoop. For example, six capturing devices may be set along the arc, i.e., the capturing devices $CJ_1$ to $CJ_6$. Those skilled in the art may understand that the setting position, number, and supporting manners of the capturing devices may be various, and there is no limitation herein.

The capturing device may be a camera or a video camera capable of synchronous shooting, for example, a camera or a video camera capable of synchronous shooting through a hardware synchronization line. With multiple capturing devices capturing data in the to-be-viewed area, multiple images or video streams in synchronization may be obtained. According to the video streams captured by multiple capturing devices, multiple synchronized frame images may also be obtained as multiple synchronized images. Those skilled in the art may understand that, ideally, the term synchronization refer to corresponding to the same moment, but the existence of errors and deviations may also be tolerated.

Figure 3:
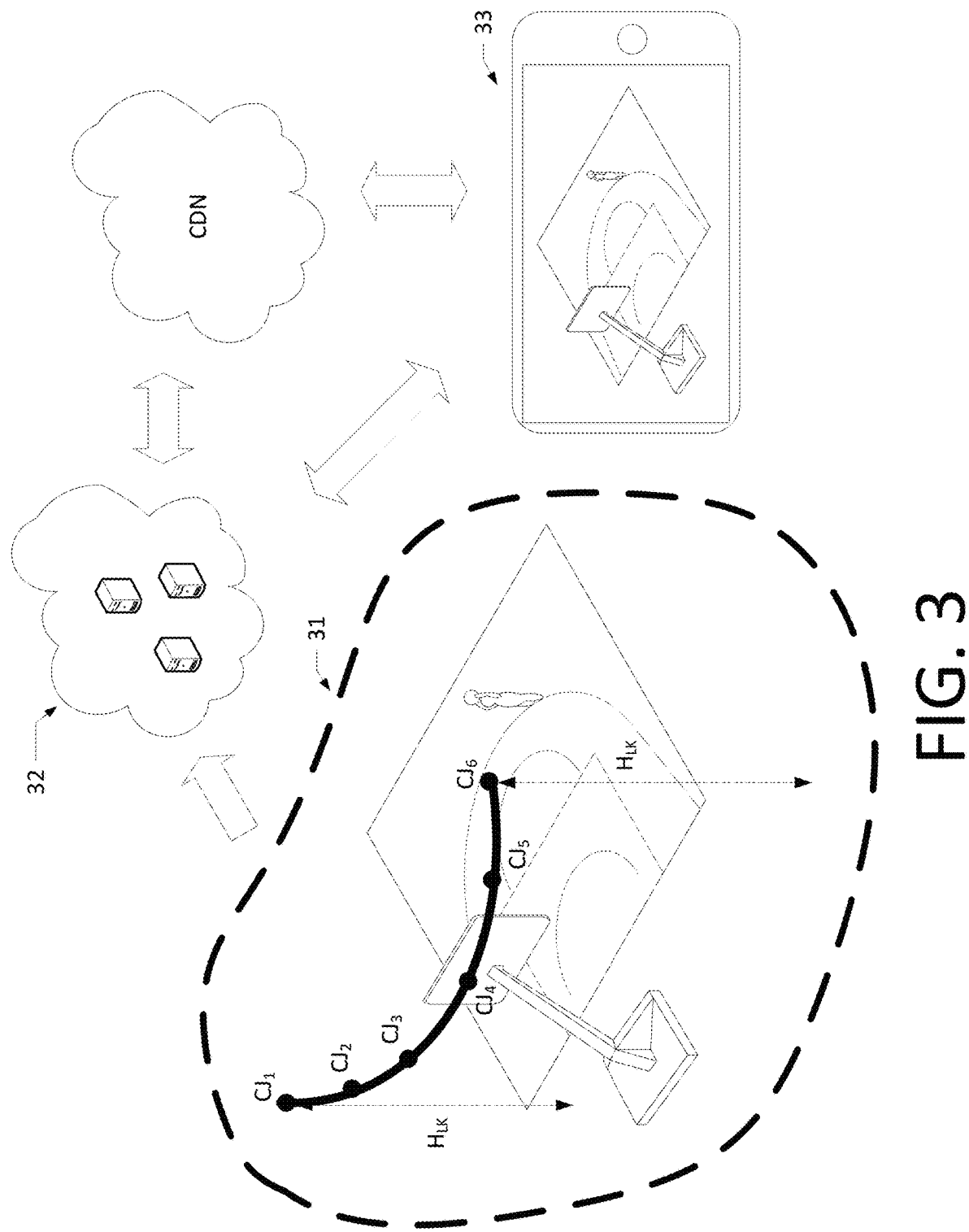
FIG. 3 is a schematic diagram of a multi-angle free-perspective display system in an example embodiment of the present disclosure.

Referring to FIG. 3, in the embodiments of the present disclosure, data may be captured in the to-be-viewed area through the capturing system 31 including multiple capturing devices. The acquired multiple synchronized images may be processed by the capturing system 31 or the server 32 to generate multi-angle free-perspective data which are capable of supporting the device 33 that performs displaying to perform virtual viewpoint switching. The device 33 that performs displaying may display the reconstructed image generated based on the multi-angle free-perspective data. The reconstructed image corresponds to the virtual viewpoint. According to the user instruction, reconstructed images corresponding to different virtual viewpoints may be displayed, and the viewing position and viewing angle may be switched.

In specific implementations, the process of performing video reconstruction or image reconstruction to obtain a reconstructed image may be implemented by the device 33 that performs displaying, or may be implemented by a device located on a Content Delivery Network (CDN) in an edge computing manner. Those skilled in the art may understand that FIG. 3 is merely an example, and is not a limitation on the capturing system, the server, the device that performs displaying, and the implementation manner.

The process of image reconstruction based on multi-angle free-perspective data will be described in detail hereinafter with reference to FIG. 38 to FIG. 41 and will not be repeated herein.

Figure 4:
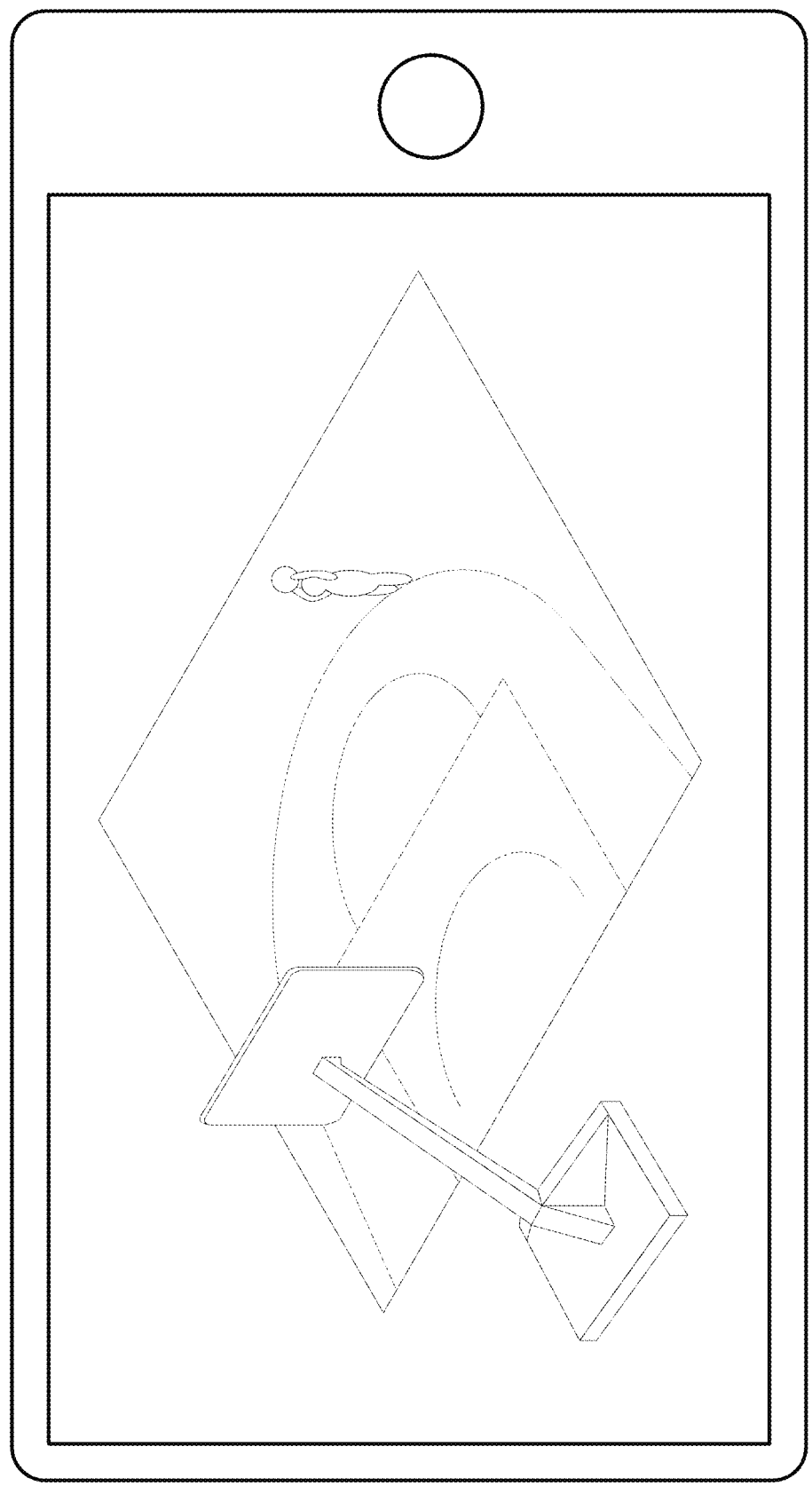
FIG. 4 is a schematic diagram of a device display in an example embodiment of the present disclosure.

Referring to FIG. 4, following the previous example, the user may watch the to-be-viewed area through the device that performs displaying. In this example embodiment, the to-be-viewed area is a basketball court. As described above, the viewing position and viewing angle may be switched.

Figure 5:
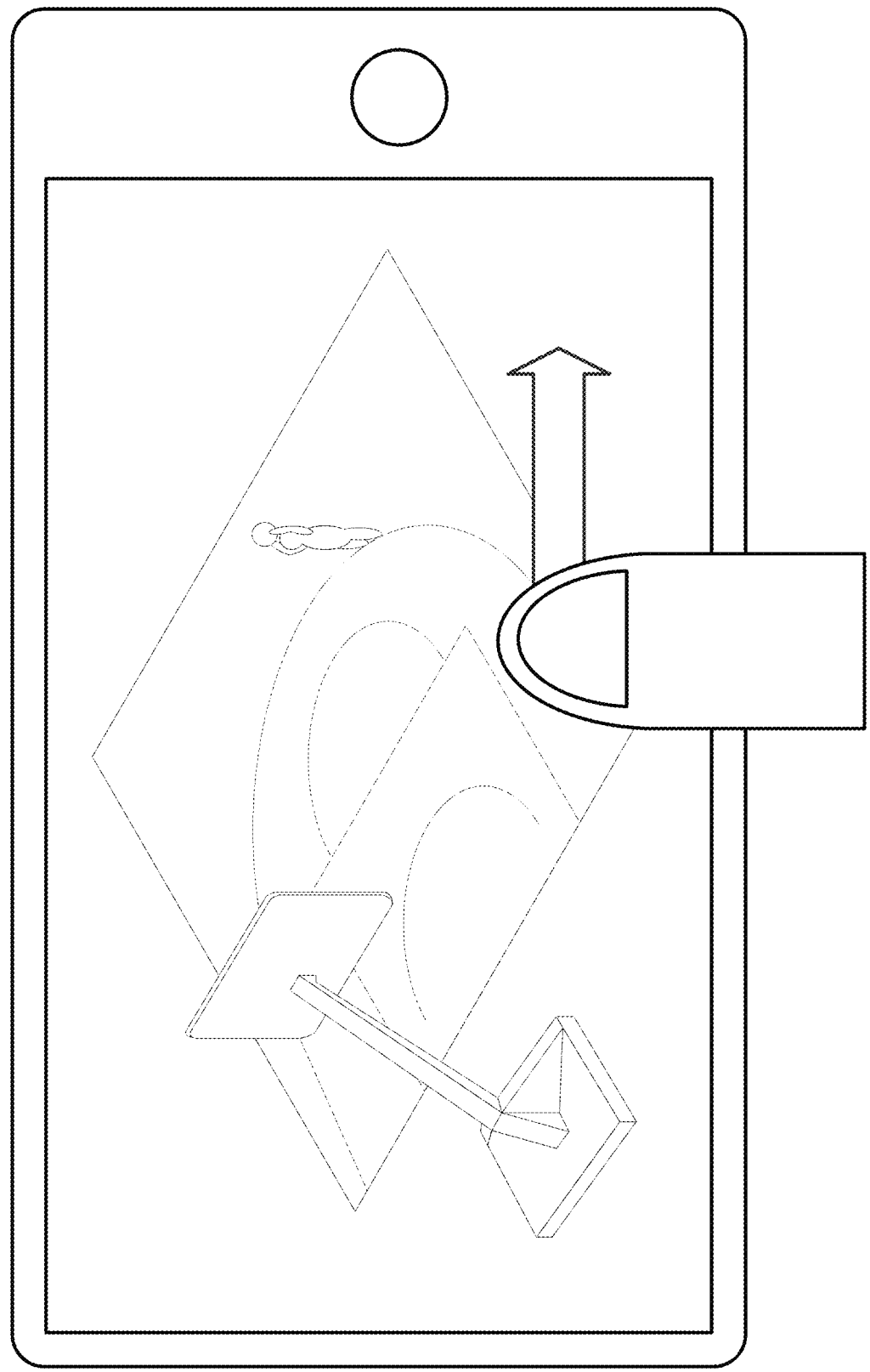
FIG. 5 is a schematic diagram of a control performed on a device in an example embodiment of the present disclosure.

For example, the user may perform sliding on the surface of the screen to switch the virtual viewpoint. In an example embodiment of the present disclosure, referring to FIG. 5, when the user slides along the surface of the screen with his/her finger to the right, the virtual viewpoint for viewing may be switched. Still referring to FIG. 2, the position of the virtual viewpoint before sliding may be $VP_1$. The position of the virtual viewpoint may be $VP_2$ after the virtual viewpoint is switched by sliding along the surface of the screen.

Figure 6:
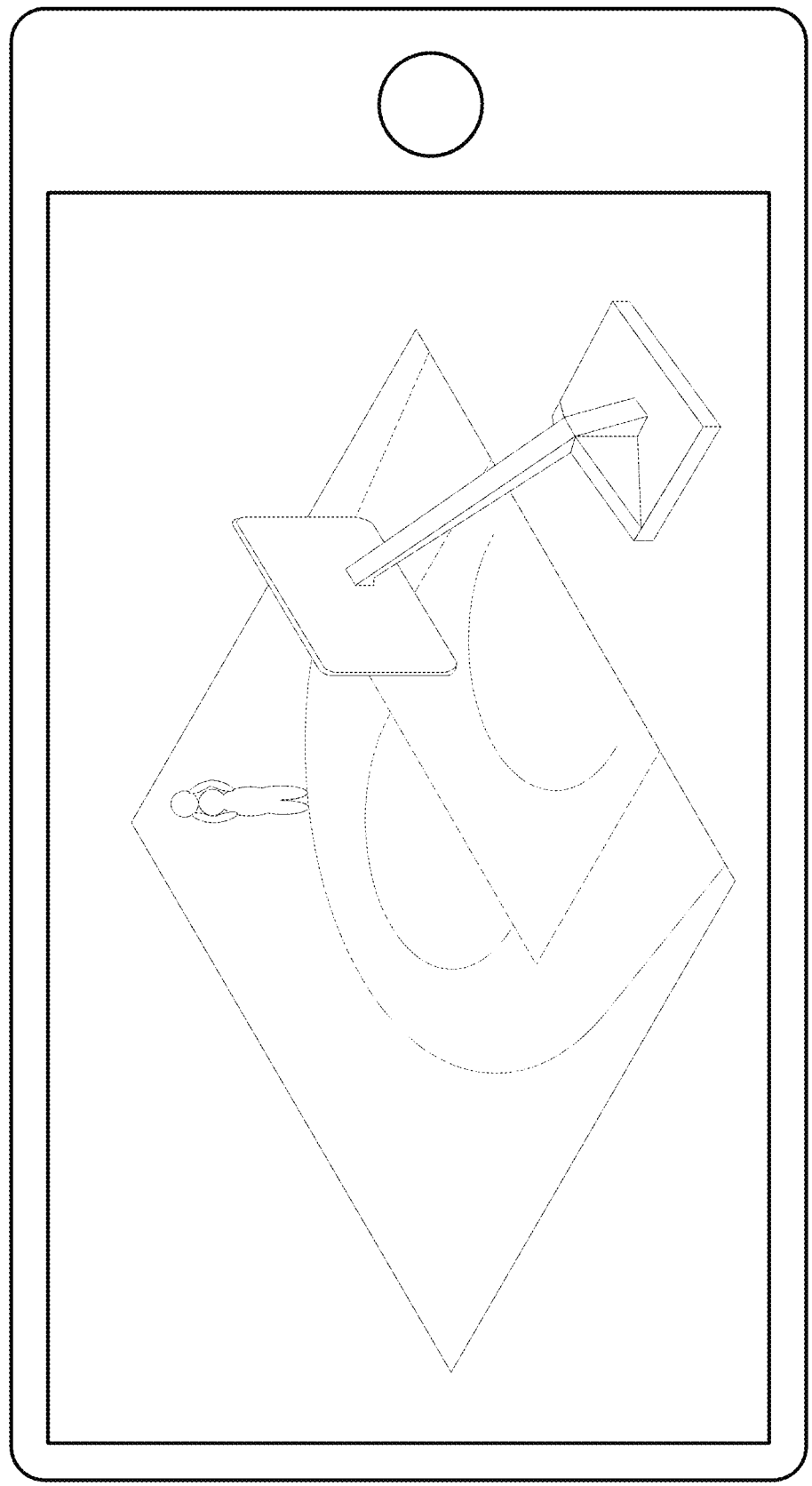
FIG. 6 is a schematic diagram of another control performed on a device in an example embodiment of the present disclosure.

Referring to FIG. 6, after sliding the screen, the reconstructed image displayed on the screen may be as shown in FIG. 6. The reconstructed image may be obtained by performing image reconstruction based on multi-angle free-perspective data generated from data captured by multiple capturing devices in an actual capturing scenario.

Those skilled in the art may understand that the image viewed before switching may also be a reconstructed image. The reconstructed image may be a frame image in a video stream. In addition, there are various manners to switch the virtual viewpoint according to the user instruction, which is not limited herein.

In implementations, the virtual viewpoint may be represented by 6 degrees of freedom (DoF) coordinates, where the spatial position of the virtual viewpoint may be represented as $(x, y, z)$, and the perspective may be represented as three directions of rotation $(\Theta, \varphi, \gamma)$.

The virtual viewpoint is a three-dimensional concept. Three-dimensional information is required to generate the reconstructed image. In an implementation manner, the multi-angle free-perspective data may include the depth data for providing third-dimensional information outside the plane image (texture image). Compared with other implementation manners, such as providing three-dimensional information through point cloud data, the data amount of the depth data is smaller. Implementation of generating multi-angle free-perspective data will be described in detail hereinafter with reference to FIG. 19 to FIG. 37 and will not be repeated herein.

In the embodiments of the present disclosure, the switching of the virtual viewpoint may be performed within a certain range, which is the multi-angle free-perspective range. That is, within the multi-angle free-perspective range, the position of the virtual viewpoint and the perspective may be arbitrarily switched.

The multi-angle free-perspective range is related to the arrangement of the capturing devices. The broader the shooting coverage of the capturing devices is, the larger the multi-angle free-perspective range is. The quality of the picture displayed by the device that performs displaying is related to the number of capturing devices. Generally, the more the number of capturing devices is set, the fewer the number of the hollow areas in the displayed picture is.

Figure 7:
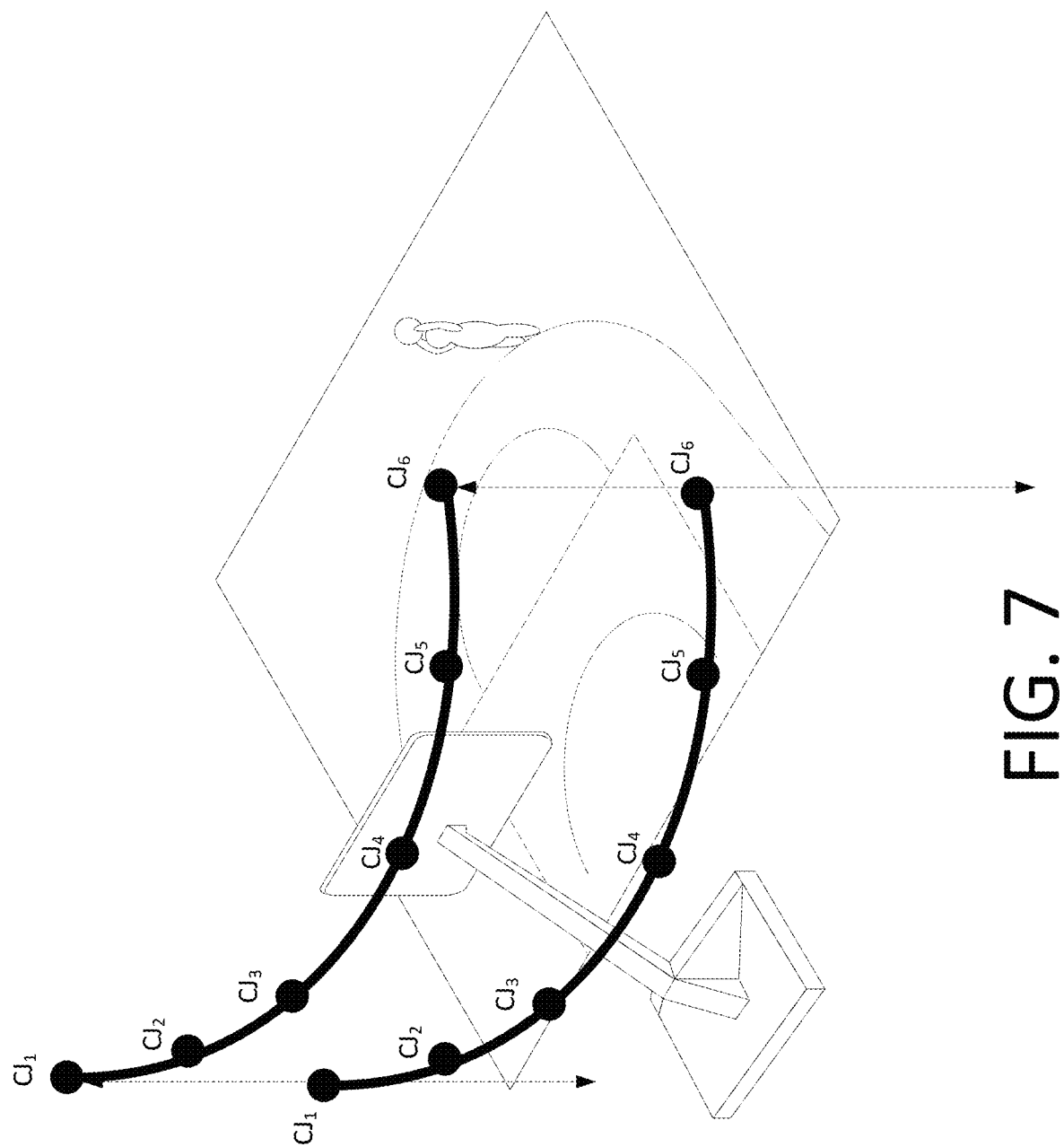
FIG. 7 is a schematic diagram of another setting method of capturing devices in an example embodiment of the present disclosure.

Referring to FIG. 7, if two rows (an upper row and a lower row) of capturing devices are set in the basketball court, i.e., the upper row of capturing devices $CJ_1$ to $CJ_6$ and the lower row of capturing devices $CJ_{11}$ to $CJ_{16}$, respectively, compared with setting only one row of capturing devices, the multi-angle free-perspective range thereof is greater.

Figure 8:
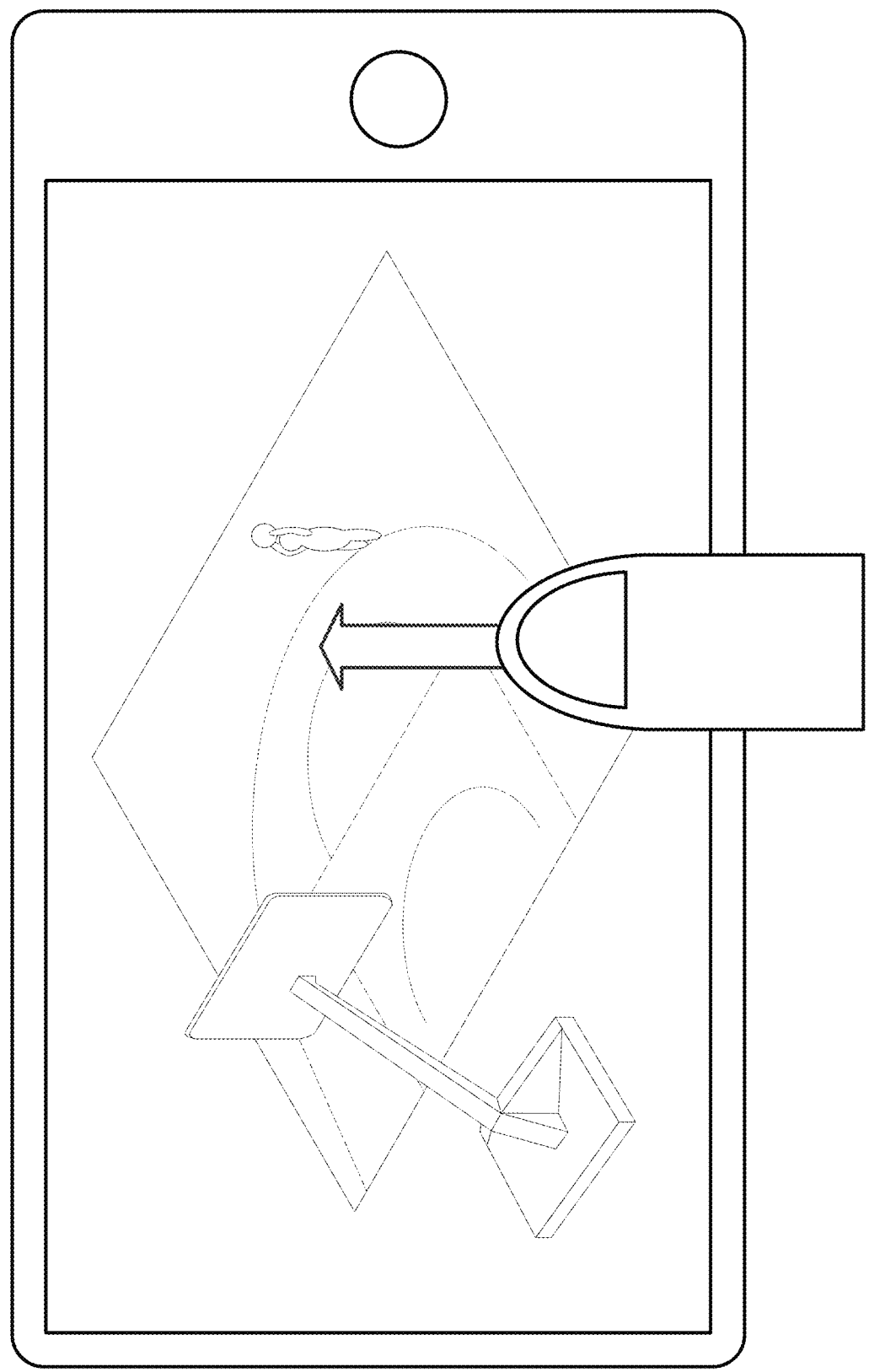
FIG. 8 is a schematic diagram of another control performed on a device in an example embodiment of the present disclosure.
Figure 9:
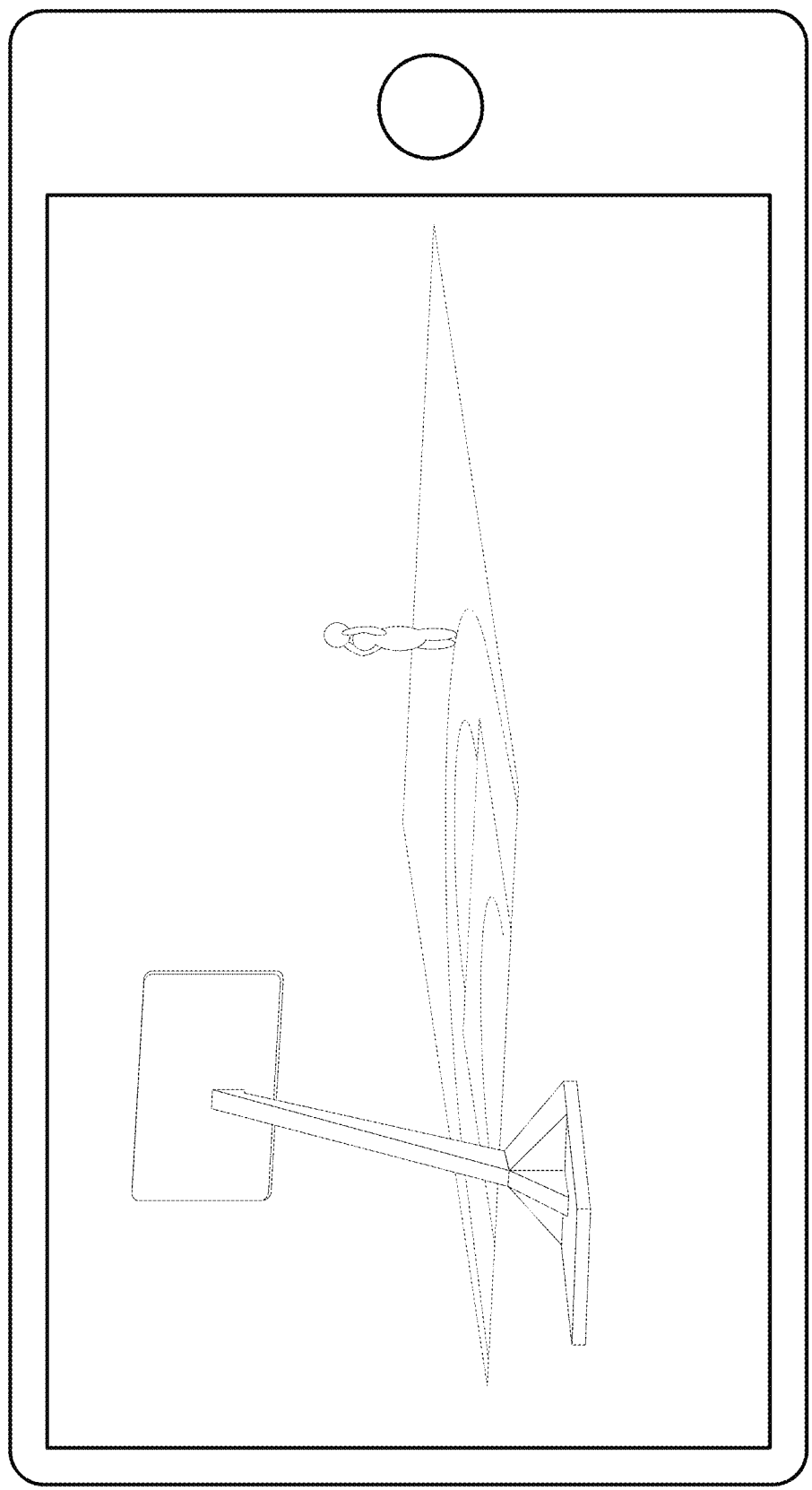
FIG. 9 is a schematic diagram of another device display in an example embodiment of the present disclosure.

Referring to FIG. 8, the user's finger may slide upward to switch the virtual viewpoint for viewing. Referring to FIG. 9, after sliding along the surface of the screen, the image displayed on the screen may be as shown in FIG. 9.

In implementations, if only one row of capturing devices is set, a certain degree of freedom in the vertical direction may also be obtained in the process of image reconstruction to obtain the reconstructed image, but the multi-angle free-perspective range thereof is smaller than the multi-angle free-perspective range of two rows of capturing devices that are set in the vertical direction.

Those skilled in the art may understand that the above respective example embodiments and corresponding drawings are merely for illustrative purposes and are not intended to limit the association relationship between the setting of the capturing devices and the multi-angle free-perspective range, nor are they limitations of operation manners or obtained display effects of the device that performs displaying.

Hereinafter, a setting method of capturing devices is further described specifically.

Figure 10:
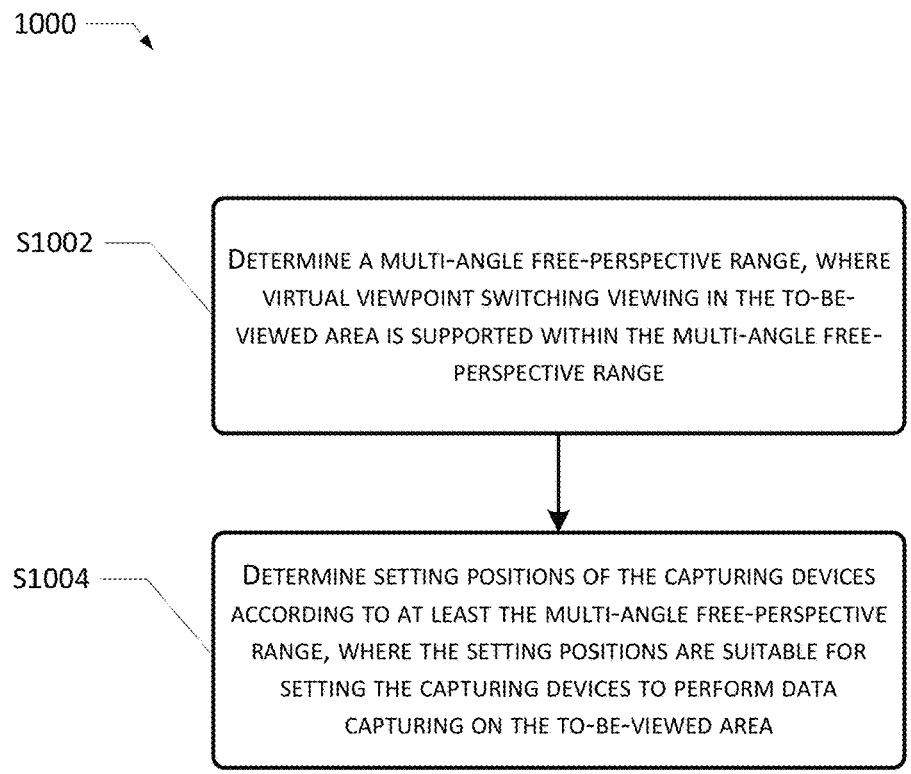
FIG. 10 is a flowchart of a setting method of capturing devices in an example embodiment of the present disclosure.

FIG. 10 shows a flowchart of a setting method 1000 of capturing devices in an example embodiment of the present disclosure. In the embodiments of the present disclosure, the following steps may be included:

Step S1002, determining a multi-angle free-perspective range, where virtual viewpoint switching viewing in the to-be-viewed area is supported within the multi-angle free-perspective range;

Step S1004, determining setting positions of the capturing devices according to at least the multi-angle free-perspective range, where the setting positions are suitable for setting the capturing devices to perform data capturing in the to-be-viewed area.

Those skilled in the art may understand that a completely free perspective may refer to a perspective with 6 degrees of freedom. That is, the user may freely switch the spatial position and perspective of the virtual viewpoint on the device that performs displaying, where the spatial position of the virtual viewpoint may be expressed as (x, y, z), and the perspective may be expressed as three directions of rotation ($\Theta$, $\varphi$, $\gamma$). There are 6 degrees of freedom in total, and thus the perspective is referred to as a perspective with 6 degrees of freedom.

As described above, in the embodiments of the present disclosure, the switching of the virtual viewpoint may be performed within a certain range, which is the multi-angle free-perspective range. That is, within the multi-angle free-perspective range, the position of the virtual viewpoint and the perspective may be arbitrarily switched.

The multi-angle free-perspective range may be determined according to the needs of the application scenario. For example, in some scenarios, the to-be-viewed area may have a core focus, such as the center of the stage, or the center of the basketball court, or the hoop of the basketball court. In such scenarios, the multi-angle free-perspective range may include a planar or three-dimensional area including the core focus. Those skilled in the art may understand that the to-be-viewed area may be a point, a plane, or a three-dimensional area, which is not limited herein.

As described above, the multi-angle free-perspective range may be various areas, and further examples are described hereinafter with reference to FIG. 11 to FIG. 15.

Figure 11:
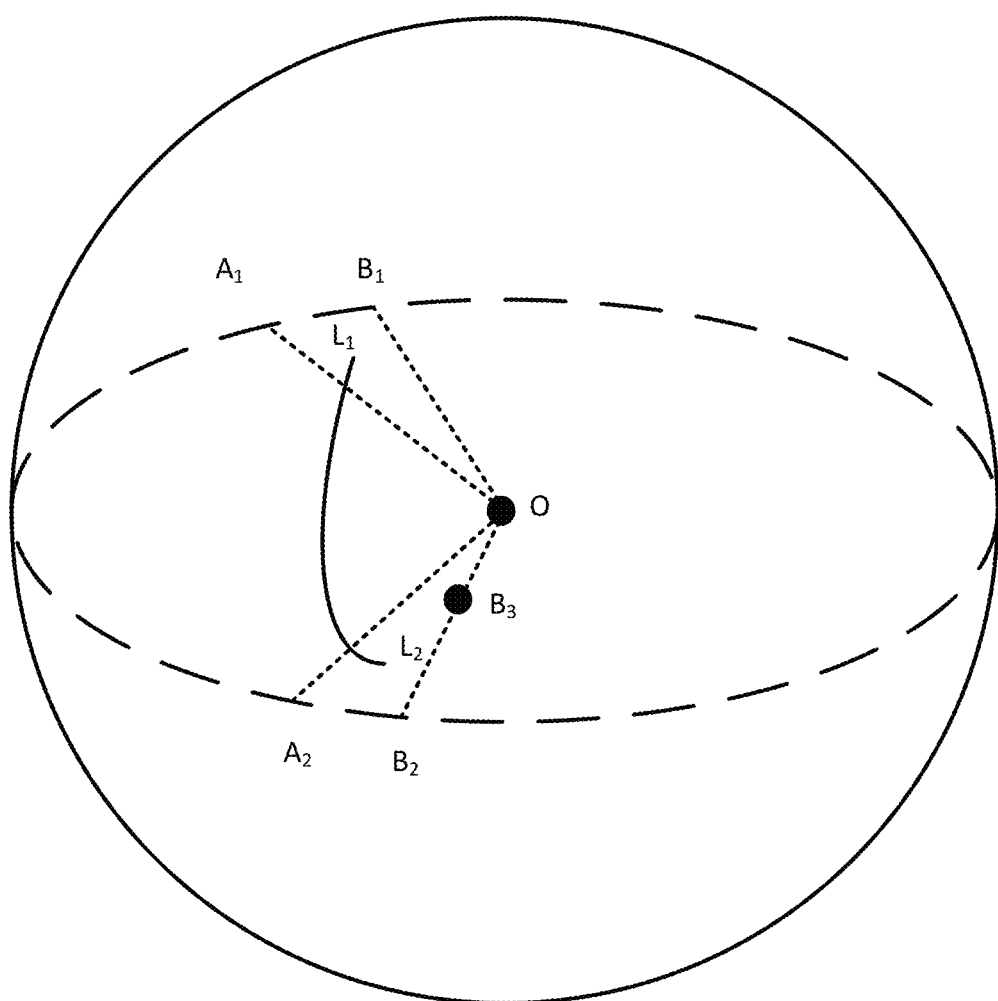
FIG. 11 is a schematic diagram of a multi-angle free-perspective range in an example embodiment of the present disclosure.

Referring to FIG. 11, point O represents the core focus. The multi-angle free-perspective range may be a sector area with the core focus as the center and located in the same plane as the core focus, such as the sector area $A_1OA_2$, or the sector area $B_1OB_2$. The multi-angle free-perspective range may also be a circular plane centered at point O.

Taking the multi-angle free-perspective range as the sector area $A_1OA_2$ as an example, the position of the virtual viewpoint may be continuously switched in this area. For example, the position of the virtual viewpoint may be continuously switched from $A_1$ along the arc segment $A_1A_2$ to $A_2$. Alternatively, the position of the virtual viewpoint may also be continuously switched along the arc segment $L_1L_2$. Alternatively, the position is switched in the multi-angle free-perspective range in other manners. Accordingly, the perspective of the virtual viewpoint may also be changed in this area.

Figure 12:
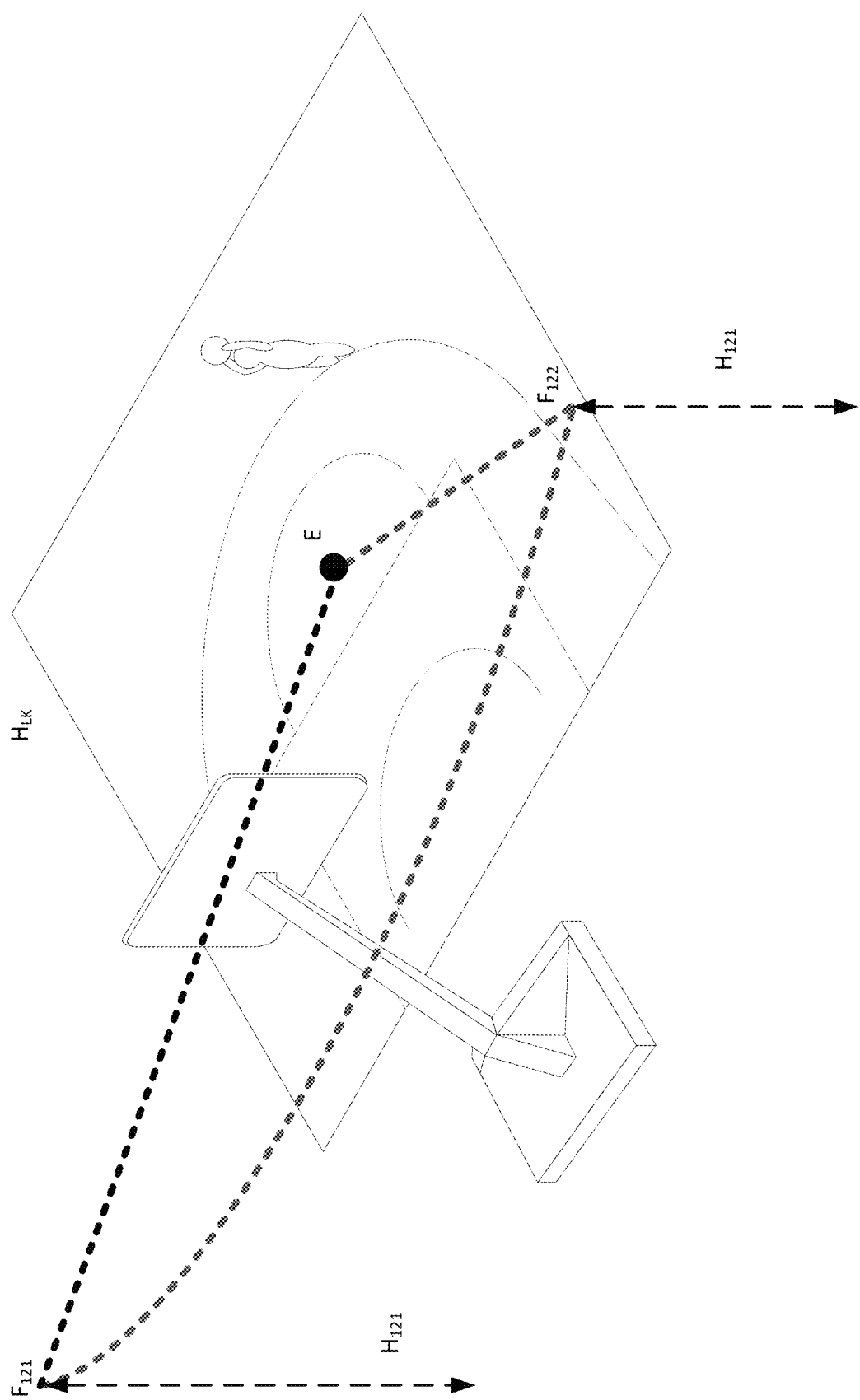
FIG. 12 is a schematic diagram of another multi-angle free-perspective range in an example embodiment of the present disclosure.

Further referring to FIG. 12, the core focus may be the center point E of the basketball court. The multi-angle free-perspective range may be a sector area with the center point E as the center and located in the same plane as the center point E, such as the sector area $F_{121}EF_{122}$. The center point E of the basketball court may be located on the ground of the court. Alternatively, the center point E of the basketball court may be at a certain height from the ground. The height of the arc endpoint $F_{121}$ and the height of the arc endpoint $F_{122}$ of the sector area may be the same, for example, the height $H_{121}$ in the figure.

Figure 13:
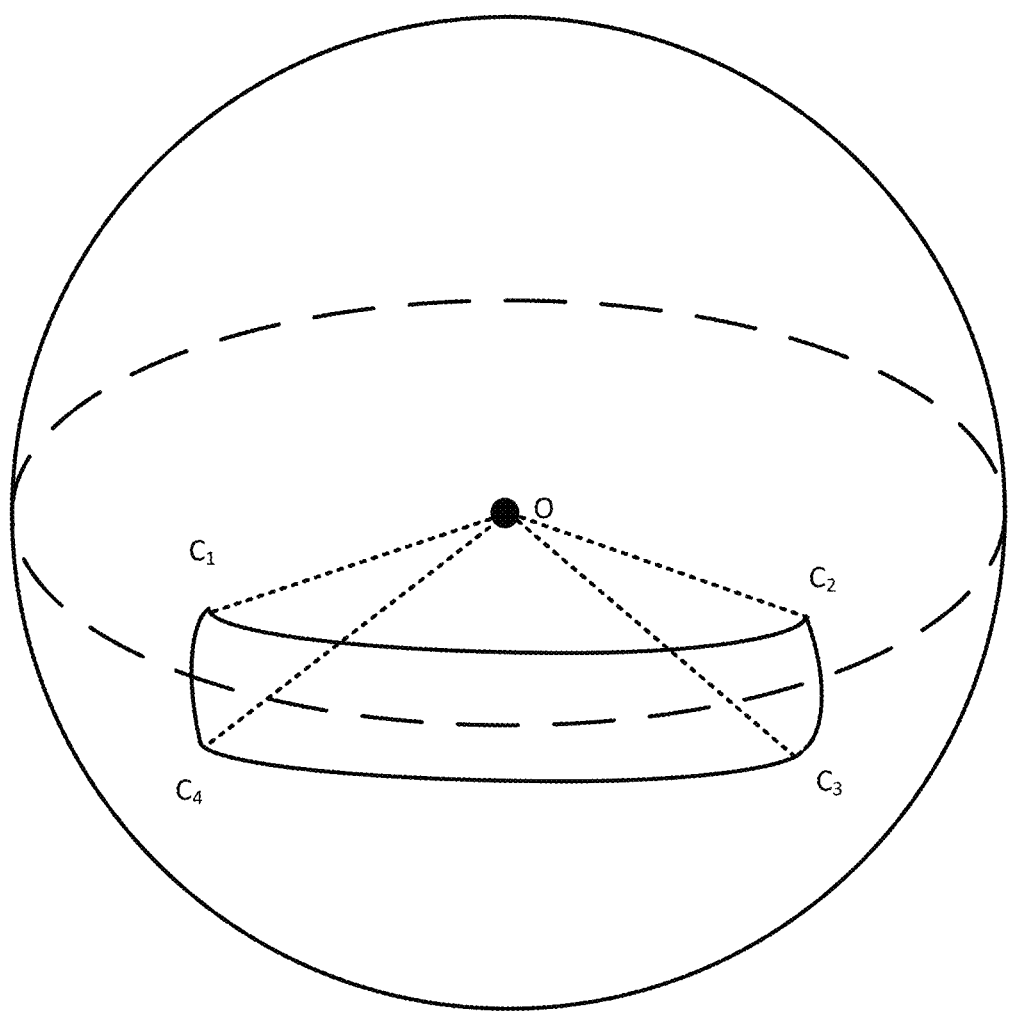
FIG. 13 is a schematic diagram of another multi-angle free-perspective range in an example embodiment of the present disclosure.

Referring to FIG. 13, the core focus is represented by point O. The multi-angle free-perspective range may be a part of a sphere centered on the core focus. For example, the area $C_1C_2C_3C_4$ is used to illustrate a partial area of the spherical surface, and the multi-angle free-perspective range may be a three-dimensional range formed by the area $C_1C_2C_3C_4$ and the point O. Any point within this range may be used as the position of the virtual viewpoint.

Figure 14:
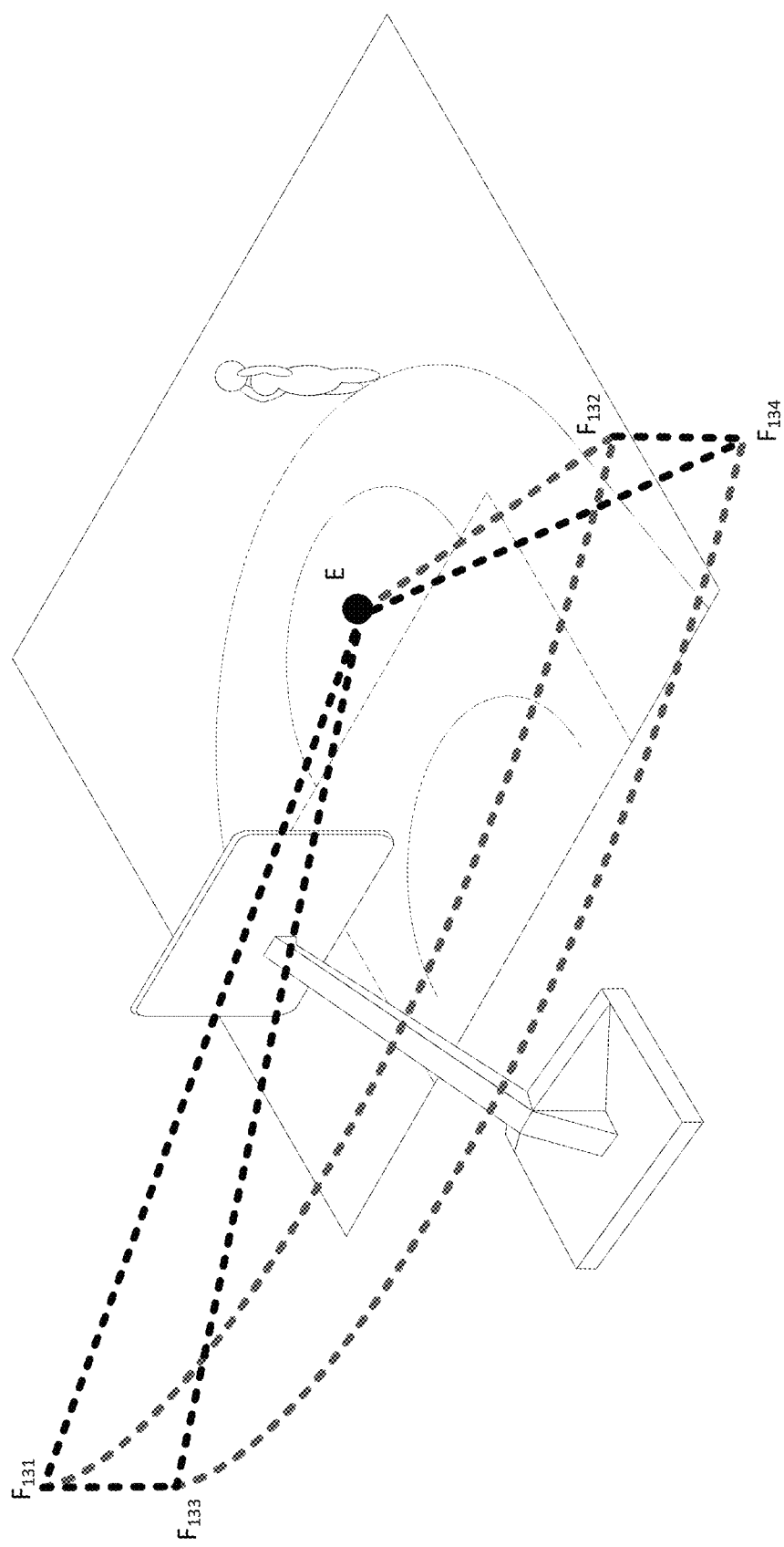
FIG. 14 is a schematic diagram of another multi-angle free-perspective range in an example embodiment of the present disclosure.

Further referring to FIG. 14, the core focus may be the center point E of the basketball court. The multi-angle perspective range may be a part of the sphere centered on the center point E. For example, the area $F_{131}F_{132}F_{133}F_{134}$ illustrates a partial area of the spherical surface. The multi-angle free-perspective range may be a three-dimensional range formed by the area $F_{131}F_{132}F_{133}F_{134}$ and the center point E.

In the scenario with the core focus, the position of the core focus may be various, and the multi-angle free-perspective range may also be various, which are not listed herein one by one. Those skilled in the art may understand that the above respective example embodiments are merely examples and are not limitations on the multi-angle free-perspective range. Moreover, the shapes shown therein are not limitations on actual scenarios and applications.

In implementations, the core focus may be determined according to the scenario. In a shooting scenario, there may also be multiple core focuses, and the multi-angle free-perspective range may be a superposition of multiple subranges.

In other application scenarios, the multi-angle free-perspective range may also be without the core focus. For example, in some application scenarios, it is necessary to provide multi-angle free-perspective viewing of historic buildings, or to provide multi-angle free-perspective viewing of art exhibitions. Accordingly, the multi-angle free-perspective range may be determined according to the requirements of these scenarios.

Those skilled in the art may understand that the shape of the degree of freedom perspective range may be arbitrary. Any point within the multi-angle free-perspective range may be used as the position.

Figure 15:
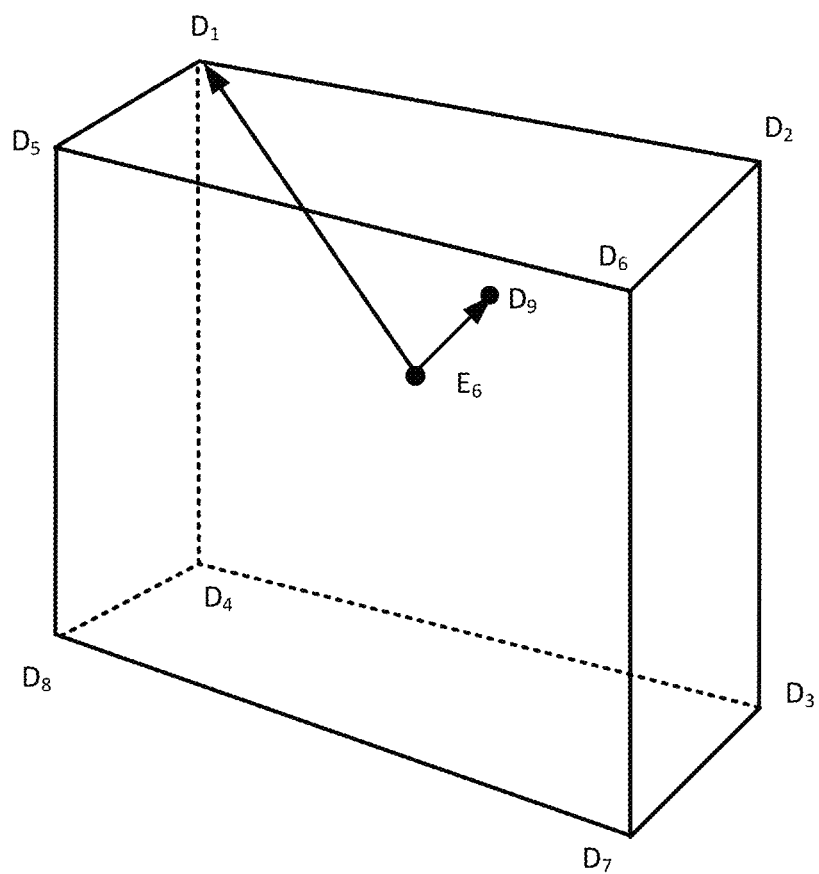

Referring to FIG. 15, the multi-angle free-perspective range may be the cube $D_1D_2D_3D_4D_6D_6D_7D_8$, and the to-be-viewed area is the surface $D_1D_2D_3D_4$. Then, any point in the cube $D_1D_2D_3D_4D_5D_6D_7D_8$ may be used as the position of the virtual viewpoint. The perspective of the virtual viewpoint, i.e., the viewing angle, may be various. For example, the position $E_6$ on the surface $D_5D_6D_7D_8$ may be selected to view with the perspective of $E_6D_1$ or to view along the angle of $E_6D_9$, where the point $D_9$ is selected from the to-be-viewed area.

In implementations, after the multi-angle free-perspective range is determined, the positions of the capturing devices may be determined according to the multi-angle free-perspective range.

In an example embodiment, the setting positions of the capturing devices may be selected within the multi-angle free-perspective range. For example, the setting positions of the capturing devices may be determined at boundary points of the multi-angle free-perspective range.

Figure 16:
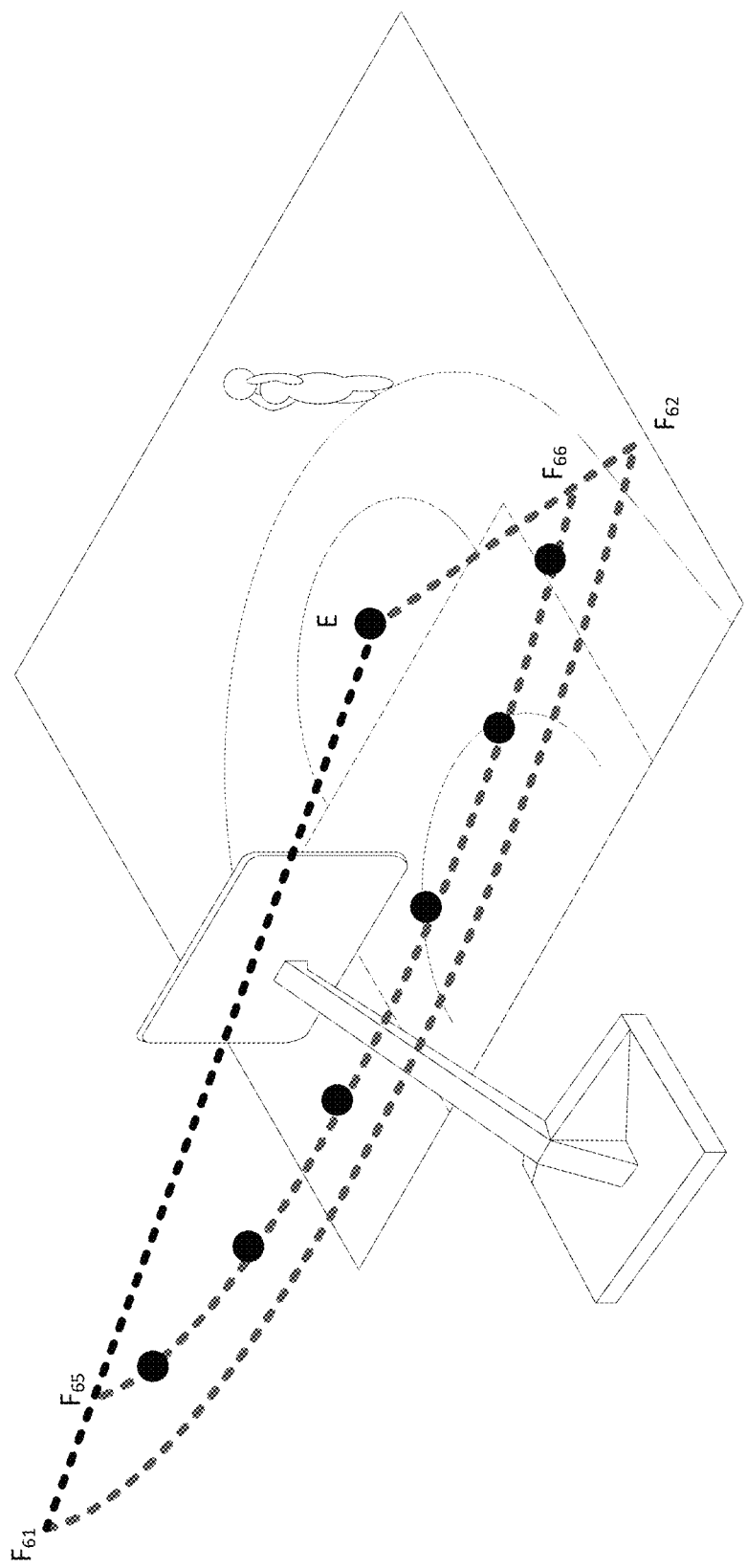
FIG. 16 is a schematic diagram of another setting method of capturing devices in an example embodiment of the present disclosure.

Referring to FIG. 16, the core focus may be the center point E of the basketball court, and the multi-angle free-perspective range may be the sector area with the center point E as the center and located in the same plane as the center point E, such as the sector area $F_{61}EF_{62}$. The capturing devices may be set inside the multi-angle perspective range, for example, along the arc $F_{65}F_{66}$. Areas that are not covered by the capturing devices may be reconstructed using algorithms. In implementations, the capturing devices may also be set along the arc $F_{61}F_{62}$, and the capturing devices may be set at the ends of the arc to improve the quality of the reconstructed image. Each capturing device may be set towards the center point E of the basketball court. The position of the capturing device may be represented by spatial position coordinates, and the orientation of the capturing device may be represented by three rotation directions.

In implementations, two or more setting positions may be set, and correspondingly, two or more capturing devices may be set. The number of capturing devices may be determined according to the requirements of the quality of the reconstructed image or video. In a scenario with a higher requirement on the picture quality of the reconstructed image or video, the number of capturing devices may be greater. In a scenario with a lower requirement on the picture quality of the reconstructed image or video, the number of capturing devices may be smaller.

Still referring to FIG. 16, those skilled in the art may understand that if the higher picture quality of reconstructed image or video and a reduction in the number of holes in the reconstructed image are pursued, a larger number of capturing devices may be set along the arc $F_{61}F_{62}$. For example, 40 cameras may be set.

Figure 17:
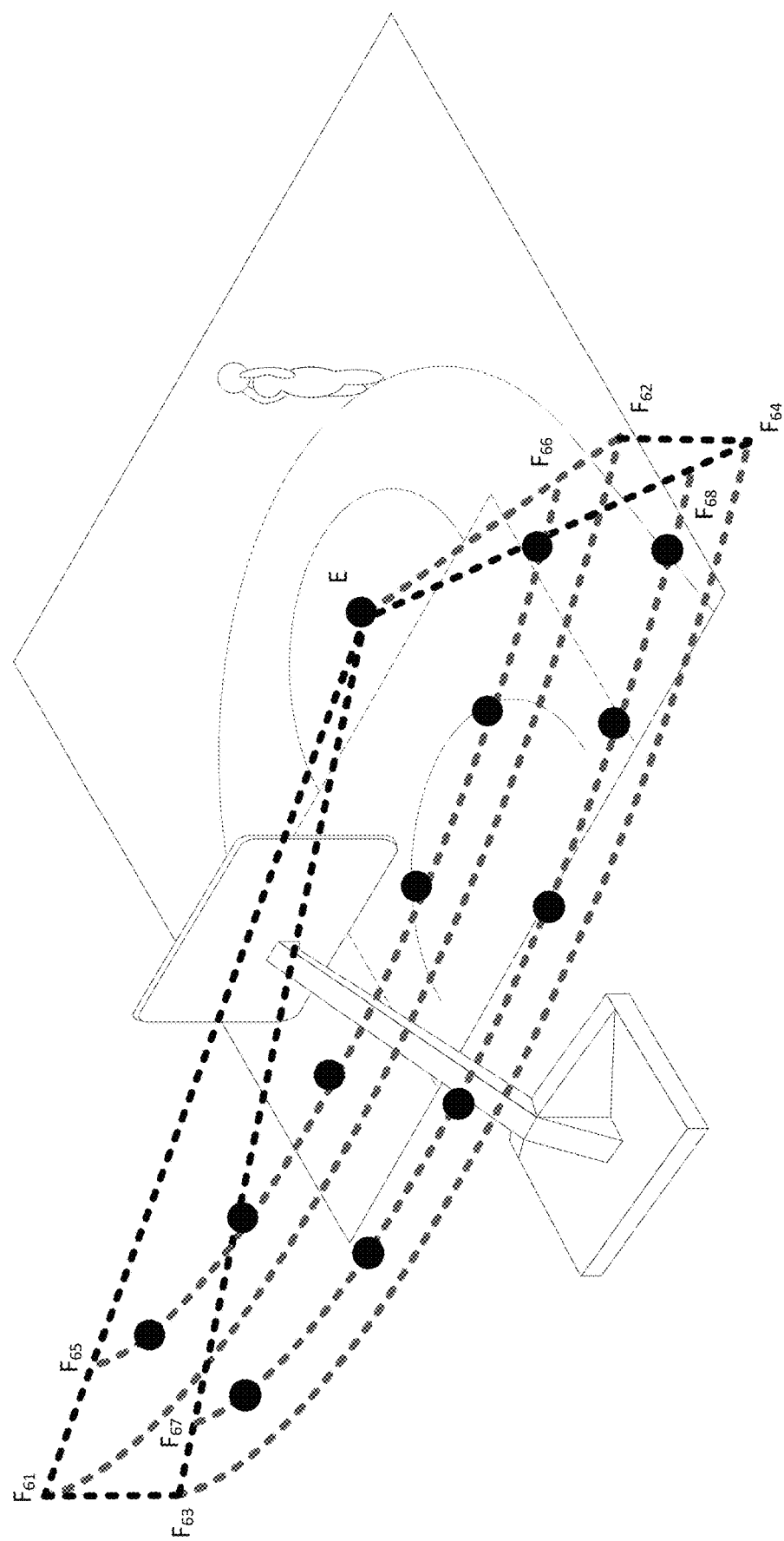
FIG. 17 is a schematic diagram of another setting method of capturing devices in an example embodiment of the present disclosure.

Referring to FIG. 17, the core focus may be the center point E of the basketball court, and the multi-angle perspective range may be a part of the sphere centered on the center point E. For example, the area $F_{61}F_{62}F_{63}F_{64}$ illustrates a partial area of the spherical surface, and the multi-angle free-perspective range may be a three-dimensional range formed by the area $F_{61}F_{62}F_{63}F_{64}$ and the center point E. The capturing devices may be set inside the multi-angle perspective range, for example, along the arc $F_{65}F_{66}$ and the arc $F_{67}F_{68}$. Similar to the previous example, areas that are not covered by the capturing devices may be reconstructed using algorithms. In implementations, the capturing devices may also be set along the arc $F_{61}F_{62}$ and the arc $F_{63}F_{64}$, and the capturing devices may be set at the ends of the arc to improve the quality of the reconstructed image.

Each capturing device may be set to face the center point E of the basketball court. Those skilled in the art may understand that, although not being shown in the figure, the number of capturing devices along the arc $F_{61}F_{62}$ may be more than the number of capturing devices along the arc $F_{63}F_{64}$.

As described above, in some application scenarios, the to-be-viewed area may include the core focus. Accordingly, the multi-angle free-perspective range includes the area where the perspective is directed to the core focus. In such an application scenario, the setting positions of the capturing devices may be selected from an arc-shaped area whose concave direction (radius direction) points to the core focus.

When the to-be-viewed area includes the core focus, the setting positions are selected in the arc-shaped area pointing to the core focus in the concave direction, so that the capturing devices are arranged with an arc shape. Because the to-be-viewed area includes the core focus, the perspective points to the core focus. In such a scenario, the capturing devices are arranged with the arc shape, such that fewer capturing devices may be used to cover a larger multi-angle free-perspective range.

In implementations, the setting positions of the capturing devices may be determined with reference to the perspective range and the boundary shape of the to-be-viewed area. For example, the setting positions of the capturing devices may be determined at a preset interval along the boundary of the to-be-viewed area within the perspective range.

Figure 18:
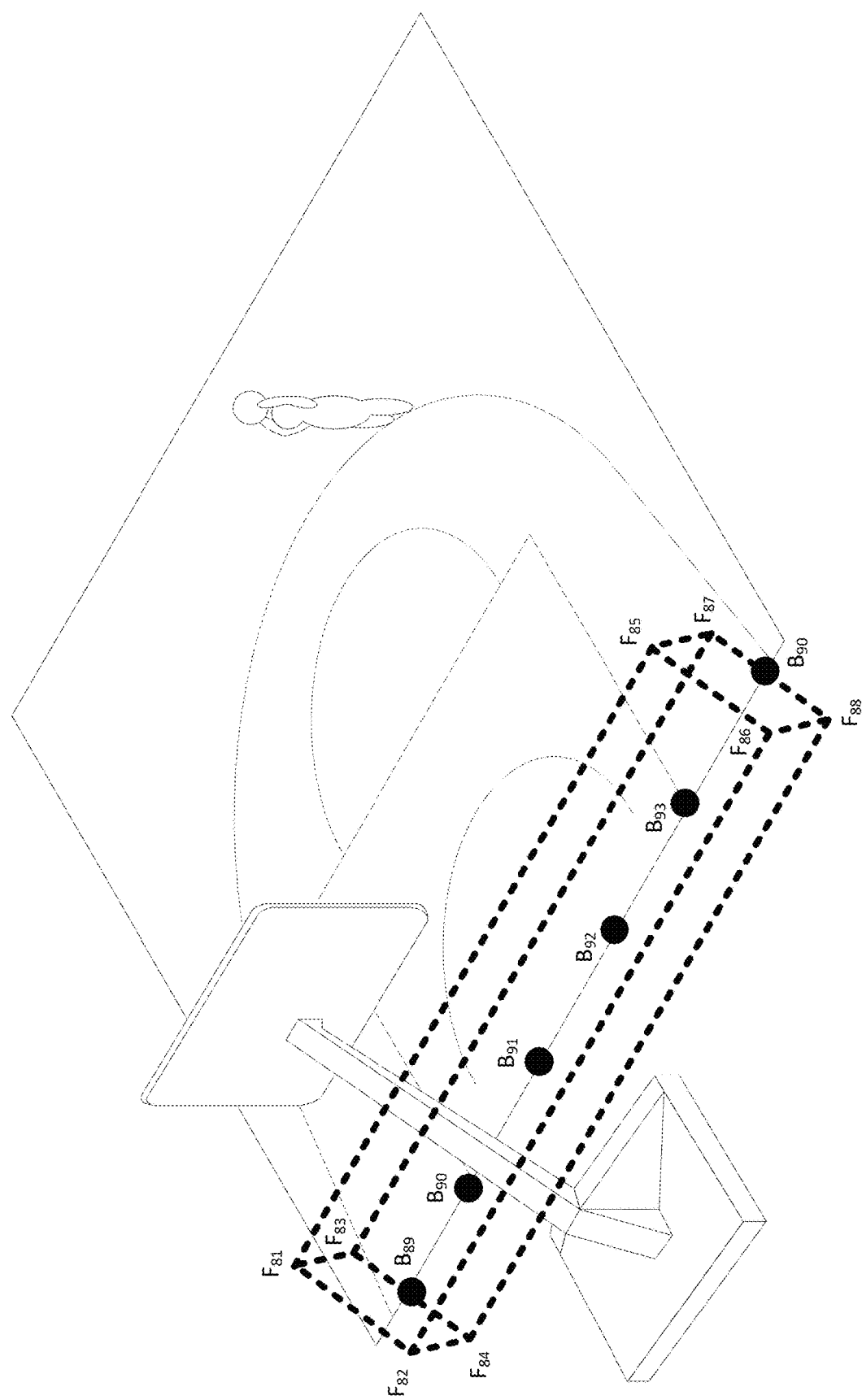
FIG. 18 is a schematic diagram of another setting method of capturing devices in an example embodiment of the present disclosure.

Referring to FIG. 18, the multi-angle perspective range may be without the core focus. For example, the position of the virtual viewpoint may be selected from the hexahedron $F_{81}F_{82}F_{83}F_{84}F_{85}F_{86}F_{87}F_{88}$, and the virtual viewpoint position is used for viewing the to-be-viewed area. The boundary of the to-be-viewed area may be the ground boundary of the court. The capturing devices may be set along the intersecting line $B_{89}B_{90}$ of the ground boundary line with the to-be-viewed area. For example, six capturing devices may be set at positions $B_{89}$ to $B_{94}$. The degree of freedom in the up and down direction may be realized by an algorithm. Alternatively, another row of capturing devices may be set at the positions where the horizontal projection positions thereof are in the intersection line $B_{89}B_{90}$.

In implementations, the multi-angle free-perspective range may also support viewing from the upper side of the to-be-viewed area, and the upper side is in a direction away from the horizontal plane.

Accordingly, the capturing device may be mounted on the drone to set the capturing device on the upper side of the to-be-viewed area, or on the top of the building where the to-be-viewed area is located. The top of the building is the structure in the direction away from the horizontal plane.

For example, the capturing device may be set on the top of the basketball stadium, or may hover on the upper side of the basketball court through the drone carrying the capturing device. The capturing device may be set on the top of the stadium where the stage is located, or may be carried by the drone.

By setting the capturing device on the upper side of the to-be-viewed area, the multi-angle free-perspective range may include the perspective above the to-be-viewed area.

In implementations, the capturing device may be a camera or a video camera, and the captured data may be pictures or video data.

Those skilled in the art may understand that the manner in which the capturing device is set at the setting position may be various. For example, the capturing device may be supported by the support frame at the setting position, or in other setting manners.

In addition, those skilled in the art may understand that the above respective example embodiments are merely examples for illustration, and are not limitations on the setting manner of capturing devices. In various application scenarios, the implementations of determining the setting positions of the capturing devices and setting the capturing devices for capturing according to the multi-angle free-perspective range are all within the protection scope of the present disclosure.

Hereinafter, the method for generating multi-angle free-perspective data is further described.

As described above, still referring to FIG. 3, the acquired multiple two-dimensional synchronized images may be processed by the capturing system 31 or the server 32 to generate multi-angle free-perspective data that is capable of supporting the device 33 that performs displaying to switch the virtual viewpoint. The multi-angle free-perspective data may indicate the third-dimension information outside the two-dimensional image through the depth data. The depth data can reflect a relative distance between a subject that is photographed and a camera or video camera. Based on the two-dimensional synchronized images and corresponding depth data, the multi-angle free perspective data supporting the device 33 that performs displaying to perform switching of virtual viewpoints can be generated.

Figure 19:
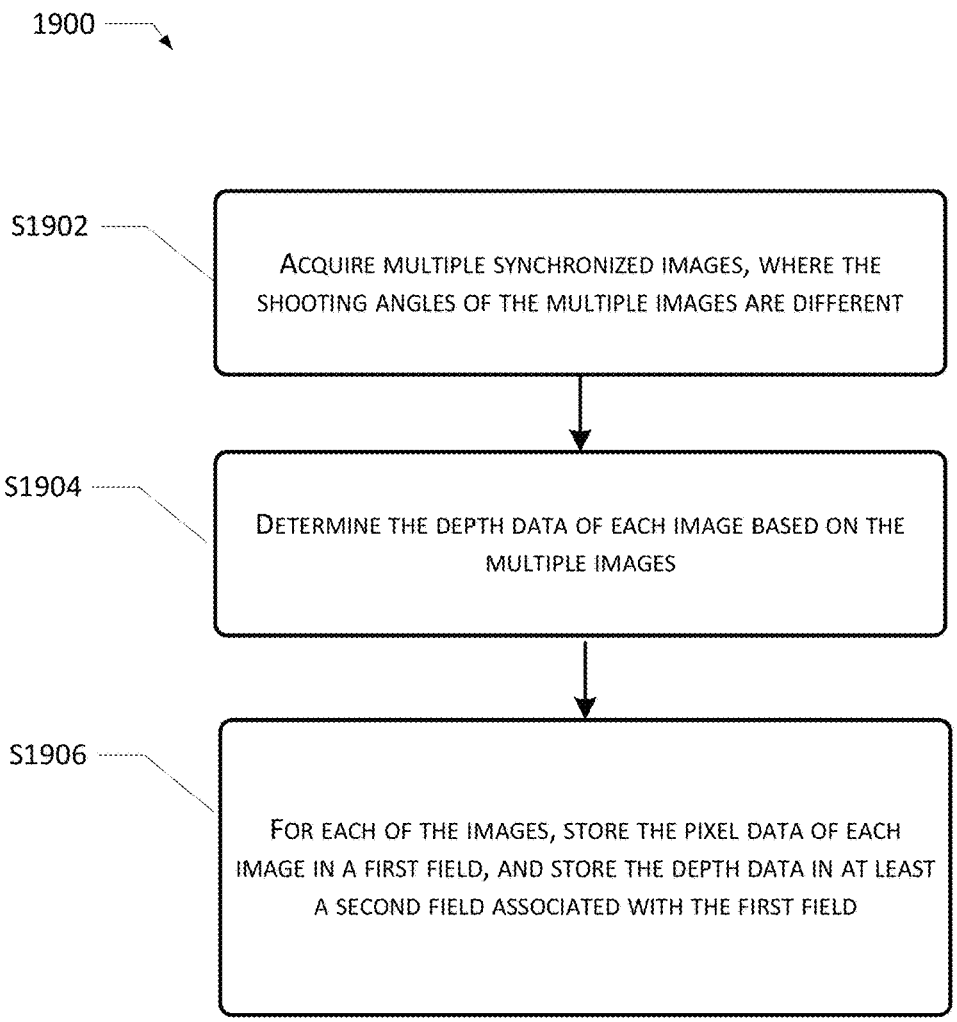
FIG. 19 is a flowchart of a method for generating multi-angle free-perspective data in an example embodiment of the present disclosure.

In implementations, referring to FIG. 19, a method 1900 for generating the multi-angle free-perspective data may include the following steps:

Step S1902, acquiring multiple synchronized two-dimensional images, where shooting angles of the multiple two-dimensional images are different;

Step S1904, determining depth data of each two-dimensional image based on the multiple two-dimensional images;

Step S1906, for each two-dimensional image, storing pixel data of each two-dimensional image in a first field, and storing the depth data in at least one second field that is associated with the first field.

The multiple synchronized two-dimensional images may be images captured by the camera or frame images in video data captured by the video camera. In the process of generating the multi-angle free-perspective data, the depth data of each two-dimensional image may be determined based on the multiple two-dimensional images.

The depth data may include a depth value corresponding to a pixel of the two-dimensional image. The distance from the capturing device to each point in the to-be-viewed area may be used as the above depth value, and the depth value may directly reflect the geometry of the visible surface in the to-be-viewed area. For example, the depth value may be the distance from respective points in the to-be-viewed area along the optical axis of the camera to the optical center, and the origin of the camera coordinate system may be used as the optical center. Those skilled in the art may understand that the distance may be a relative value, and multiple images may use the same reference.

Further, the depth data may include depth values corresponding to the pixels of the two-dimensional image on a one-to-one basis. Alternatively, the depth data may be some values selected from a set of depth values corresponding to the pixels of the two-dimensional image on a one-to-one basis.

Those skilled in the art may understand that the two-dimensional image is also called as the texture image, and the set of depth values may be stored in the form of a depth map. In implementations, the depth data may be data obtained by down-sampling the original depth map. The image form where the set of depth values corresponding to the pixels of the two-dimensional image (texture image) on a one-to-one basis is stored according to the arrangement of pixel points of the two-dimensional image (texture image) is the original depth map.

In implementations, the pixel data of the two-dimensional image stored in the first field may be original two-dimensional image data, such as data obtained from the capturing device, or may be data with a reduced resolution of the original two-dimensional image data. Further, the pixel data of the two-dimensional image may be original pixel data of the image, or the pixel data with reduced resolution. The pixel data of the two-dimensional image may be any one of YUV data and RGB data, or may be other data capable of expressing the two-dimensional image.

In implementations, the amount of the depth data stored in the second field may be the same as or different from the amount of pixel points corresponding to the pixel data of the two-dimensional image stored in the first field. The amount may be determined according to the bandwidth limitation of data transmission of the device terminal that processes the multi-angle free-perspective image data. If the bandwidth is small, the amount of data may be reduced in the above manners such as down-sampling or resolution reduction, and the like.

In implementations, for each of the two-dimensional images (texture images), the pixel data of the two-dimensional image (texture image) may be sequentially stored in multiple fields in a preset order, and these fields may be consecutive or may be distributed in an interleaving manner with the second field. The fields storing the pixel data of the two-dimensional image (texture image) may be used as the first fields. Hereinafter, examples are provided for explanation.

Figure 20:
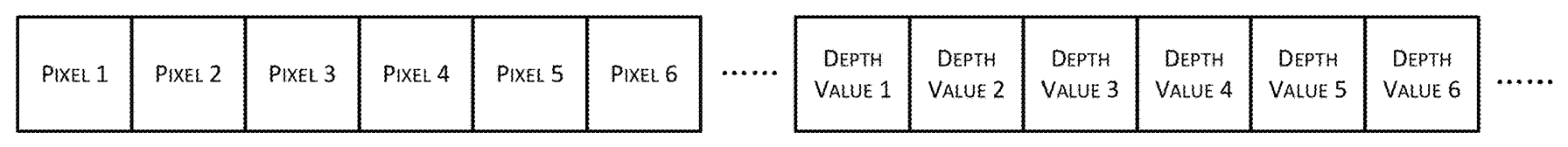

Referring to FIG. 20, the pixel data of a two-dimensional image that is represented by pixel 1 to pixel 6 and other pixels not shown in the figure, may be stored in multiple consecutive fields in a preset order. These consecutive fields may be used as the first fields. The depth data corresponding to the two-dimensional image that is represented by depth value 1 to depth value 6 and other depth values not shown in the figure, may be stored in multiple consecutive fields in a preset order. These consecutive fields may be used as the second fields. The preset order may be a storing performed line by line sequentially according to the distribution positions of pixels of the two-dimensional image, or may be other orders.

Figure 21:
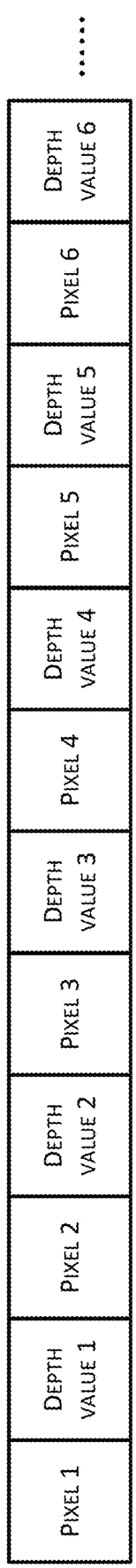
FIG. 21 is a schematic diagram of distribution positions of the pixel data and the depth data of another single image in an example embodiment of the present disclosure.

Referring to FIG. 21, the pixel data and corresponding depth values of a two-dimensional image may also be stored in multiple fields alternately. Multiple fields storing the pixel data may be used as the first fields, and multiple fields storing the depth values may be used as the second fields.

In implementations, the depth data may be stored in the same order as the pixel data of the two-dimensional image, so that a respective field in the first fields may be associated with a respective field in the second fields, thereby reflecting the depth value corresponding to each pixel.

In implementations, the pixel data and the depth data of multiple two-dimensional images may be stored in various ways. Hereinafter, examples are provided for further explanation.

Figure 22:
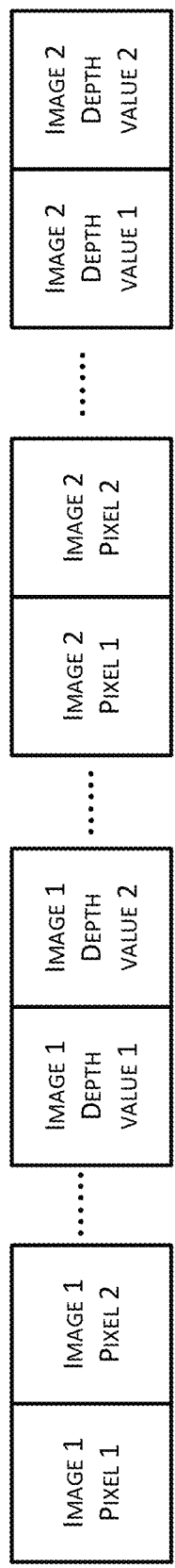
FIG. 22 is a schematic diagram of distribution positions of the pixel data and the depth data of an image in an example embodiment of the present disclosure.

Referring to FIG. 22, respective pixels of texture image 1 are represented by image 1 pixel 1, image 1 pixel 2, and other pixels not shown in the figure, and may be stored in consecutive fields, which may be used as the first fields. Corresponding depth data of texture image 1 is represented by image 1 depth value 1, image 1 depth value 2, and the other depth data not shown in the figure, and may be stored in the fields adjacent to the first fields. These fields may be used as the second fields. Similarly, the pixel data of texture image 2 may be stored in the first fields, and corresponding depth data of texture image 2 may be stored in the adjacent second fields.

Those skilled in the art may understand that respective images in the image stream or respective frame images in the video stream that are continuously captured by one capturing device of multiple synchronized capturing devices may be used as the above image 1 respectively. Similarly, among the multiple synchronized capturing devices, the two-dimensional image captured in synchronization with texture image 1 may be used as texture image 2. The capturing device may be the capturing device shown in FIG. 2, or capturing devices in other scenarios.

Figure 23:
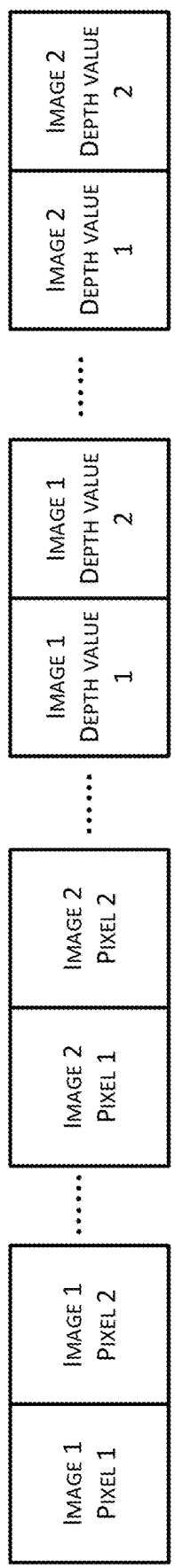
FIG. 23 is a schematic diagram of distribution positions of the pixel data and the depth data of another image in an example embodiment of the present disclosure.

Referring to FIG. 23, the pixel data of texture image 1 and the pixel data of texture image 2 may be stored in multiple adjacent first fields, and corresponding depth data of texture image 1 and corresponding depth data of texture image 2 may be stored in multiple adjacent second fields.

Figure 24:
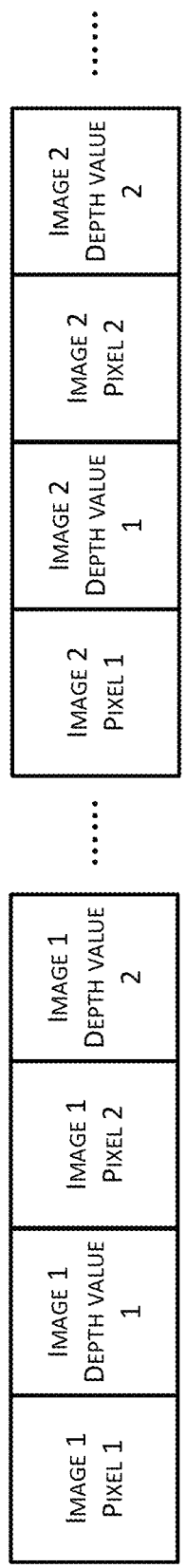
FIG. 24 is a schematic diagram of distribution positions of the pixel data and the depth data of another image in an example embodiment of the present disclosure.

Referring to FIG. 24, the pixel data of each image in the multiple images may be stored in multiple fields respectively, and these fields may be used as the first fields. Fields storing the pixel data may be interleaved with fields storing the depth values.

Referring to FIG. 25, pixel data and corresponding depth values of different texture images may also be arranged in the interleaving manner. For example, image 1 pixel 1, image 1 depth value 1, image 2 pixels 1, image 2 depth value 1, . . . may be sequentially stored until the completion of storing the pixel data and the depth data corresponding to the first pixel of each image of the multiple images. The adjacent fields thereof store image 1 pixel 2, image 1 depth value 2, image 2 pixel 2, image 2 depth value 2, . . . until the completion of storing of the pixel data and the depth data of each image.

In summary, the fields storing the pixel data of each two-dimensional image may be used as the first fields, and the fields storing corresponding depth data of the respective two-dimensional image may be used as the second fields. For each piece of multi-angle free-perspective data, first fields and second fields associated with the first fields may be stored respectively.

Those skilled in the art may understand that the above respective example embodiments are merely examples, and are not specific limitations on the type, size, and arrangement of the fields.

Referring to FIG. 3, the multi-angle free-perspective data including the first fields and the second fields may be stored in a server 32 in the cloud, transmitted to the CDN or to the device 33 that performs displaying, for reconstructing the image.

In implementations, both the first fields and the second fields may be pixel fields in the stitched image. The stitched image is used to store the pixel data and the depth data of the multiple images. By using image format for data storage, the amount of data may be reduced, the time length of data transmission may be reduced, and the resource occupation may be reduced.

The stitched image may be an image in various formats such as BMP format, JPEG format, PNG format, and the like. These image formats may be the compressed format or the uncompressed format. Those skilled in the art may understand that the two-dimensional image in various formats may include fields corresponding to respective pixels, which are referred to as pixel fields. The size of the stitched image, i.e., parameters like the number of pixels and the aspect ratio of the stitched image, may be determined according to needs, for example, may be determined based on the number of the multiple synchronized two-dimensional images, the amount of data to be stored in each two-dimensional image, the amount of the depth data to be stored in each two-dimensional image, and other factors.

In implementations, among the multiple synchronized two-dimensional images, the depth data corresponding to the pixels of each two-dimensional image and the number of bits of the pixel data may be associated with the format of the stitched image.

For example, when the format of the stitched image is the BMP format, the range of the depth value may be 0-255, which is 8-bit data, and the data may be stored as the gray value in the stitched image. Alternatively, the depth value may also be 16-bit data, which may be stored as the gray value at two pixel positions in the stitched image, or stored in two channels at one pixel position in the stitched image.

When the format of the stitched image is the PNG format, the depth value may also be 8-bit or 16-bit data. In the PNG format, the depth value of 16-bit may be stored as the gray value of one pixel position in the stitched image.

Those skilled in the art may understand that the above embodiments are not limitations on the storage manner or the number of data bits, and other data storage manners that may be implemented by those skilled in the art fall within the protection scope of the present disclosure.

In implementations, the stitched image may be split into a texture image area and a depth map area. The pixel fields of the texture image area store the pixel data of the multiple two-dimensional images, and the pixel fields of the depth map area store the depth data of the multiple images. The pixel fields storing the pixel data of each two-dimensional image in the texture image area are used as the first fields, and the pixel fields storing the depth data of each image in the depth map area are used as the second fields.

In implementations, the texture image area may be a continuous area, and the depth map area may also be a continuous area.

Further, in implementations, the stitched image may be equally split, and the two split parts are used as the texture image area and the depth map area respectively. Alternatively, the stitched image may also be split in an unequal manner according to the amount of the pixel data and the amount of the depth data of the two-dimensional image to be stored.

Figure 26:
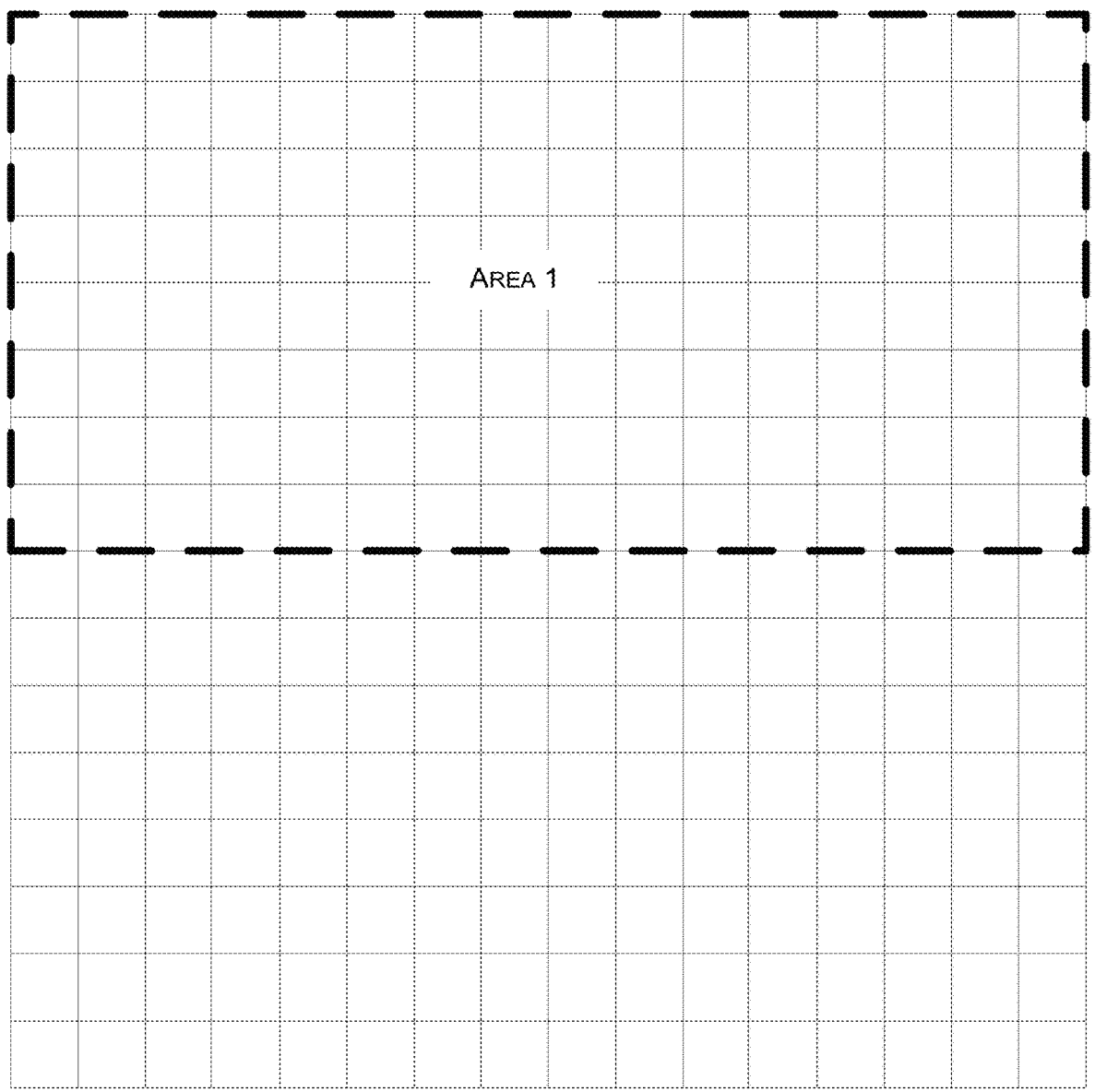
FIG. 26 is a schematic diagram of image area stitching in an example embodiment of the present disclosure.

For example, referring to FIG. 26, one pixel is represented by each minimum square, then the texture image area may be area 1 within the dashed frame, i.e., the upper half area after the stitched image is split equally up and down. The lower half area of the stitched image may be used as the depth map area.

Those skilled in the art may understand that FIG. 26 is merely for illustration, and the number of the minimum squares therein is not a limitation on the number of pixels of the stitched image. In addition, the method of equal splitting may be equally splitting the stitched image left and right.

In implementations, the texture image area may include multiple texture image sub-areas. Each texture image sub-area is used to store one of the multiple images. The pixel fields of each texture image sub-area may be used as the first fields. Accordingly, the depth map area may include multiple depth map sub-areas. Each depth map sub-area is used to store the depth data of one of the multiple depth maps. The pixel fields of each depth map sub-area may be used as the second fields.

The number of texture image sub-areas and the number of depth map sub-areas may be equal, both of which are equal to the number of multiple synchronized images. In other words, the number of image sub-areas and the number of depth map sub-areas may be equal to the number of cameras described above.

Referring to FIG. 27, equally splitting the stitched image up and down is still taken as an example for further description. The upper half of the stitched image in FIG. 27 is the texture image area, which is split into eight texture image sub-areas, which store the pixel data of the synchronized eight images respectively. Each image has a different shooting angle, i.e., a different perspective. The lower half of the stitched image is the depth map area, which is split into 8 depth map sub-areas, which store the depth maps of the 8 texture images respectively.

With reference to the descriptions above, the pixel data of the synchronized 8 texture images, i.e., perspective 1 texture image to perspective 8 texture image, may be the original images obtained from the cameras, or may be images after the original images are reduced in resolution. The depth data is stored in a partial area of the stitched image and may also be referred to as the depth map.

As described above, in implementations, the stitched image may also be split in an unequal manner. For example, referring to FIG. 28, the number of pixels occupied by the depth data may be less than the number of pixels occupied by the pixel data of the texture image. Then, the texture image area and the depth map area may have different sizes. For example, the depth data may be obtained by quarter-down-sampling the depth map, and a splitting manner as shown in FIG. 28 may be used. The number of pixels occupied by the depth map may also be greater than the number of pixels occupied by the pixel data of the image.

Those skilled in the art may understand that FIG. 28 is not a limitation on the splitting of the stitched images in the unequal manner. In implementations, the number of pixels and the aspect ratio of the stitched image may be various, and the splitting manner may also be various.

In implementations, the texture image area or the depth map area may also include multiple areas. For example, as shown in FIG. 29, the texture image area may be a continuous area, and the depth map area may include two continuous areas.

Alternatively, referring to FIG. 30 and FIG. 31, the texture image area may include two continuous areas, and the depth map area may also include two continuous areas. The texture image areas and the depth areas may be arranged in the interleaving manner.

Alternatively, referring to FIG. 32, the texture image sub-areas included in the texture image area may be arranged in the interleaving manner with the depth map sub-areas included in the depth map area. The number of continuous areas included in the texture image area may be equal to the number of texture image sub-areas, and the number of continuous areas included in the depth map area may be equal to the number of sub-areas in the depth map.

In implementations, the pixel data of each texture image may be stored in the texture image sub-areas in the order of the arrangement of pixel points. The depth data of each image may also be stored in the depth map sub-areas in the order of the arrangement of pixel points.

Figure 33:
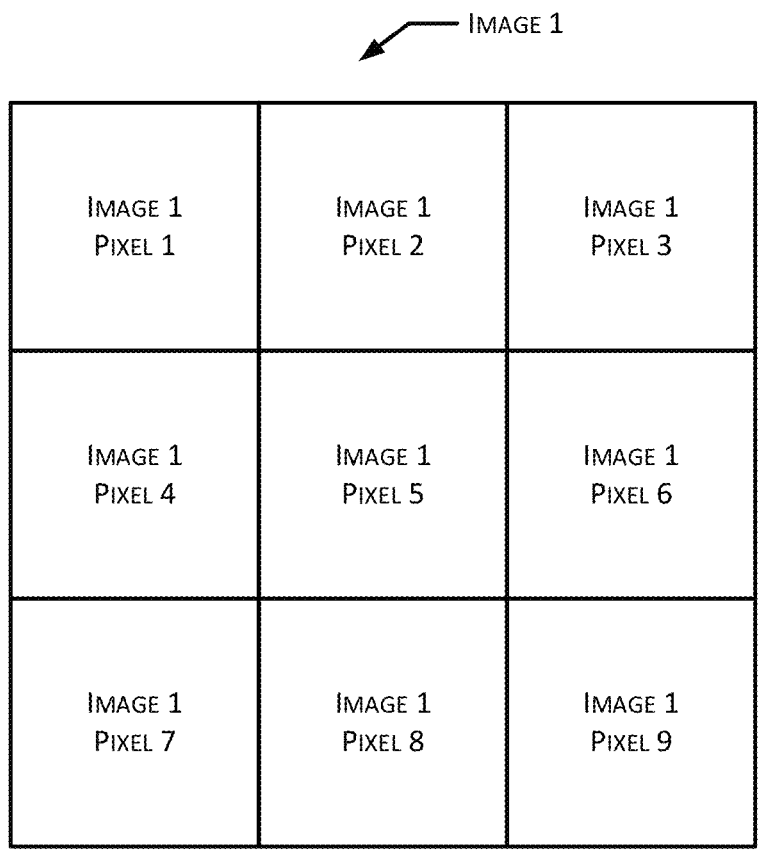
FIG. 33 is a schematic diagram of the pixel data distribution of an image in an example embodiment of the present disclosure.
Figure 34:
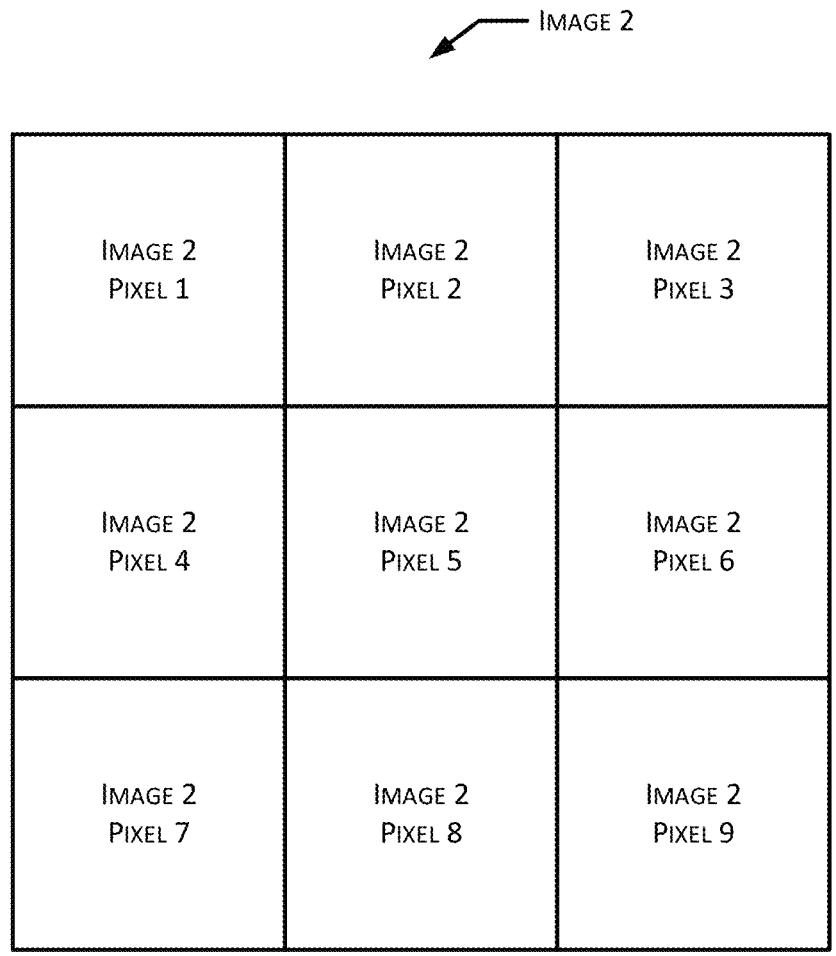
FIG. 34 is a schematic diagram of another pixel data distribution of an image in an example embodiment of the present disclosure.

Referring to FIG. 33 to FIG. 35, FIG. 33 illustrates texture image 1 with 9 pixels, and FIG. 34 illustrates texture image 2 with 9 pixels, where texture image 1 and texture image 2 are two synchronized two-dimensional images with different angles. According to image 1 and image 2, the depth data corresponding to texture image 1 may be obtained, including image 1 depth value 1 to image 1 depth value 9. Also, the depth data corresponding to texture image 2 may be obtained, including image 2 depth value 1 to image 2 depth value 9.

Referring to FIG. 35, when texture image 1 is stored in the image sub-areas, texture image 1 may be stored in the upper-left texture image sub-area in the order of the arrangement of pixel points. That is, in the texture image sub-areas, the arrangement of pixel points may be the same as texture image 1. When texture image 2 is stored in the image sub-areas, similarly, image 2 may be stored in the upper-right texture image sub-areas in this manner.

Similarly, when the depth data corresponding to texture image 1 is stored into the depth map sub-areas, texture image 1 may be stored in a similar manner. In the case where the depth value corresponds to the pixel value of the texture image on a one-to-one basis, the depth data of texture image 1 may be stored in a manner as shown in FIG. 35. If the depth values are obtained after down-sampling the original depth map, the depth data of image 1 may be stored in the depth map sub-areas in the order of the arrangement of pixel points of the depth map obtained after the down-sampling.

Those skilled in the art may understand that the compression ratio of compressing the image is related to the association of respective pixel points in the image. The stronger the association is, the higher the compression ratio is. Since the captured image corresponds to the real world, the association of respective pixel points is strong. By storing the pixel data and the depth data of the image in the order of the arrangement of pixel points, the compression ratio when compressing the stitched image may be higher. That is, the amount of data after compression may be made smaller if the amount of data before compression is the same.

By splitting the stitched image into the texture image area and the depth map area, in the case where multiple texture image sub-areas are adjacent in the texture image area or multiple depth map sub-areas are adjacent in the depth map area, since the data stored in the respective texture image sub-areas is obtained from images or frame images in the videos taken from different angles of the to-be-viewed area, all the depth maps are stored in the depth map area, and thus when the stitched image is compressed, a higher compression ratio may also be obtained.

In implementations, padding may be performed on all or some of the texture image sub-areas and the depth map sub-areas. The form of padding may be various. For example, taking perspective 1 depth map in FIG. 31 as an example, redundant pixels may be set around the original perspective 1 depth map. Alternatively, the number of pixels in the original perspective 1 depth map may be maintained, while redundant pixels which do not actually store the pixel data are reserved around the original perspective 1 depth map, and the original perspective 1 depth map is reduced and stored in the remaining pixels. Alternatively, other manners may be used to make redundant pixels set aside between perspective 1 depth map and other surrounding images finally.

Because the stitched image includes multiple texture images and depth maps, the association between adjacent borders of respective texture images is poor. By performing padding, quality loss of the texture images and the depth maps in the stitched image may be reduced when the stitched image is compressed.

In implementations, the pixel field of the texture image sub-area may store three-channel data, and the pixel field of the depth map sub-area may store single-channel data. The pixel field of the texture image sub-area is used to store the pixel data of any one of the multiple synchronized two-dimensional images. The pixel data is usually three-channel data, such as RGB data or YUV data.

The depth map sub-areas are used to store the depth data of the image. If the depth value is 8-bit binary data, a single channel of the pixel field may be used for storage. If the depth value is 16-bit binary data, two channels of the pixel field may be used for storage. Alternatively, the depth value may also be stored with a larger pixel area. For example, if the multiple synchronized images are all 1920*1080 images and the depth values are 16-bit binary data, the depth values may also be stored in a doubled 1920*1080 image area, where each texture image area is stored with the single channel. The stitched image may also be split in combination with the storage manner.

The uncompressed amount of data of the stitched image is stored in such a way that each channel of each pixel occupies 8 bits, which may be calculated according to the following formula, i.e., the number of the multiple synchronized two-dimensional images*(the amount of data of the pixel data of the two-dimensional image+the amount of data of the depth map).

If the original image has a resolution of 1080P, i.e., 1920*1080 pixels, with a progressive scan format, the original depth map may also occupy 1920*1080 pixels, which is the single channel. The amount of data of pixels of the original image is 1920*1080*8*3 bits, and the amount of data of the original depth map is 1920*1080*8 bits. If the number of cameras is 30, the amount of data of pixels of the stitched image is 30*(1920*1080*8*3+1920*1080*8) bits, which is about 237M. If not compressed, the stitched image will occupy a lot of system resources and have a large delay. Especially when the bandwidth is small, for example, when the bandwidth is 1 Mbps, the uncompressed stitched image needs about 237 seconds to be transmitted. The real-time performance is poor, and the user experience needs to be improved.

By one or more of manners such as storing regularly to obtain a higher compression ratio, reducing the resolution of the original image, or using the pixel data with reduced resolution as the pixel data of the two-dimensional image, or performing down-sampling on one or more of the original depth maps, and the like, the amount of data of stitched image may be reduced.

For example, if the resolution of the original two-dimensional image is 4K, i.e., the pixel resolution of 4096*2160, and the down-sampling has a resolution of 540P, i.e., the pixel resolution of 960*540, the number of pixels of the stitched image is approximately one-sixteenth of the number of pixels before down-sampling. In combination with any one or more of other manners for reducing the amount of data described above, the amount of data may be made smaller.

Those skilled in the art may understand that if the bandwidth is supportive and the decoding capability of the device that performs data processing may support the stitched image with higher resolution, the stitched image with higher resolution may also be generated to improve the image quality.

Those skilled in the art may understand that in different application scenarios, the pixel data and corresponding depth data of the multiple synchronized two-dimensional images may also be stored in other manners, for example, stored in the stitched image in units of pixel points. Referring to FIG. 33, FIG. 34, and FIG. 36, image 1 and image 2 shown in FIG. 33 and FIG. 34 may be stored in the stitched image in the manner of FIG. 36.

In summary, the pixel data and the corresponding depth data of the two-dimensional image may be stored in the stitched image. The stitched image may be split into the texture image area and the depth map area in various manners, or may not be split.

The pixel data of the texture image and the depth data may be stored in a preset order. In implementations, the multiple synchronized two-dimensional images may also be multiple synchronized frame images obtained by decoding multiple videos. The videos may be acquired by multiple cameras, and the settings thereof may be the same as or similar to the cameras that acquire the two-dimensional images as described above.

In implementations, generating the multi-angle free-perspective image data may further include generating the association relationship field, and the association relationship field may indicate the association relationship between the first field and at least one second field. The first field stores the pixel data of one of the multiple synchronized two-dimensional images, and the second field stores the depth data corresponding to the two-dimensional image, where the first field and the second field correspond to the same shooting angle, i.e., the same perspective. The association relationship between the first field and the second field may be described by the association relationship field.

Taking FIG. 27 as an example, the area where perspective 1 texture image to perspective 8 texture image are stored in FIG. 27 includes 8 first fields, and the area where perspective 1 depth map to perspective 8 depth map are stored includes 8 second fields. There is an association relationship between the first field of perspective 1 texture image and the second field of perspective 1 depth map. Similarly, there is an association relationship between the field storing the perspective 2 texture image and the field storing the perspective 2 depth map.

The association relationship field may indicate the association relationship between the first field and the second field of each two-dimensional image of the multiple synchronized two-dimensional images in various manners, for example, may be content storage rules of the pixel data and the depth data of the multiple synchronized two-dimensional images, that is, indicating the association relationship between the first field and the second field through indicating the storage manner described above.

In implementations, the association relationship field may only include different mode numbers. The device that performs data processing may learn the storage manner of the pixel data and the depth data in the obtained multi-angle free-perspective image data according to the mode number of the field and the data stored in the device that performs data processing. For example, if the received mode number is 1, the storage manner is parsed as follows. The stitched image is equally split into two areas up and down, where the upper half area is the texture image area, and the lower half area is the depth map area. The texture image at a certain position in the upper half area is associated with the depth map stored at the corresponding position in the lower half area.

Those skilled in the art may understand that the manner of storing the stitched image in the above example embodiments, for example, the storage manners illustrated in FIG. 27 to FIG. 36, may be described by corresponding association relationship field, so that the device that performs data processing may obtain the associated two-dimensional image and the depth data according to the association relationship field.

As described above, the picture format of the stitched image may be any one of the two-dimensional image formats such as BMP, PNG, JPEG, Webp and the like, or other image formats. The storage manner of the pixel data and the depth data in multi-angle free-perspective image data is not limited to the manner of stitched image. The pixel data and the depth data in multi-angle free-perspective image data may be stored in various manners, and may also be described by the association relationship field.

Similarly, the storage manner may also be indicated in a manner of mode number. For example, in the storage manner shown in FIG. 23, the association relationship field may store the mode number 2. After reading the mode number, the device that performs data processing may parse that the pixel data of the multiple synchronized two-dimensional images are stored sequentially. The device that performs data processing may also parse the length of the first field and the length of the second field, where the depth data of each image is stored in the same storage order as the two-dimensional image after the storage of multiple first fields is complete. Further, the device that performs data processing may determine the association relationship between the pixel data and the depth data of the two-dimensional image according to the association relationship field.

Those skilled in the art may understand that storage manners of the pixel data and the depth data of the multiple synchronized two-dimensional images may be various, and expression manners of the association relationship field may also be various. The association relationship field may be indicated by the above mode number or may directly indicate the content. The device that performs data processing may determine the association relationship between the pixel data and the depth data of the two-dimensional image according to the content of the association relationship field with reference to stored data or other priori knowledge such as the content corresponding to each mode number or the specific number of the multiple synchronized images, and the like.

In implementations, generating the multi-angle free-perspective image data may further include, calculating and storing parameter data of each two-dimensional image based on the multiple synchronized two-dimensional images, and the parameter data includes data of the shooting position and the shooting angle of the two-dimensional image.

With reference to the shooting position and the shooting angle of each image of the multiple synchronized two-dimensional images, the device that performs data processing may determine the virtual viewpoint in the same coordinate system with reference to the user's needs, and perform the reconstruction of the image based on the multi-angle free-perspective image data, to show the user the expected viewing position and perspective.

In implementations, the parameter data may further include internal parameter data. The internal parameter data includes attribute data of the image capturing device. The above data of the shooting position and shooting angle of the image may also be referred to as external parameter data. The internal parameter data and external parameter data may be referred to as attitude data. With reference to the internal parameter data and external parameter data, factors indicated by internal parameter data such as lens distortion may be taken into account during image reconstruction, and the image of the virtual viewpoint may be reconstructed more accurately.

In implementations, generating the multi-angle free-perspective image data may further include generating a parameter data storage address field, where the parameter data storage address field is used to indicate the storage address of the parameter data. The device that performs data processing may obtain the parameter data from the storage address of the parameter data.

In implementations, generating the multi-angle free-perspective image data may further include generating a data combination storage address field, which is used to indicate the storage address of the data combination, i.e., to indicate the storage addresses of the first field and the second field of each image of the multiple synchronized images. The device that performs data processing may obtain the pixel data and the depth data of the multiple synchronized two-dimensional images from the storage space corresponding to the storage address of the data combination. From this perspective, the data combination includes the pixel data and the depth data of the multiple synchronized two-dimensional images.

Those skilled in the art may understand that the multi-angle free-perspective image data may include data such as the pixel data of the two-dimensional image, corresponding depth data of the two-dimensional image, and parameter data, and the like, as well as other indicative data such as the above generated association relationship field, and parameter data storage address field, data combination storage address field, and the like. These pieces of indicative data may be stored in the data header file to instruct the device that performs data processing to obtain the data combination, the parameter data, and the like.

In implementations, the terminology explanations, specific implementations, and beneficial effects involved in respective example embodiments of generating multi-angle free-perspective data may refer to other embodiments.

The multi-angle free-perspective data may be multi-angle free-perspective video data. Hereinafter, a method for generating multi-angle free-perspective video data is further described.

Figure 37:
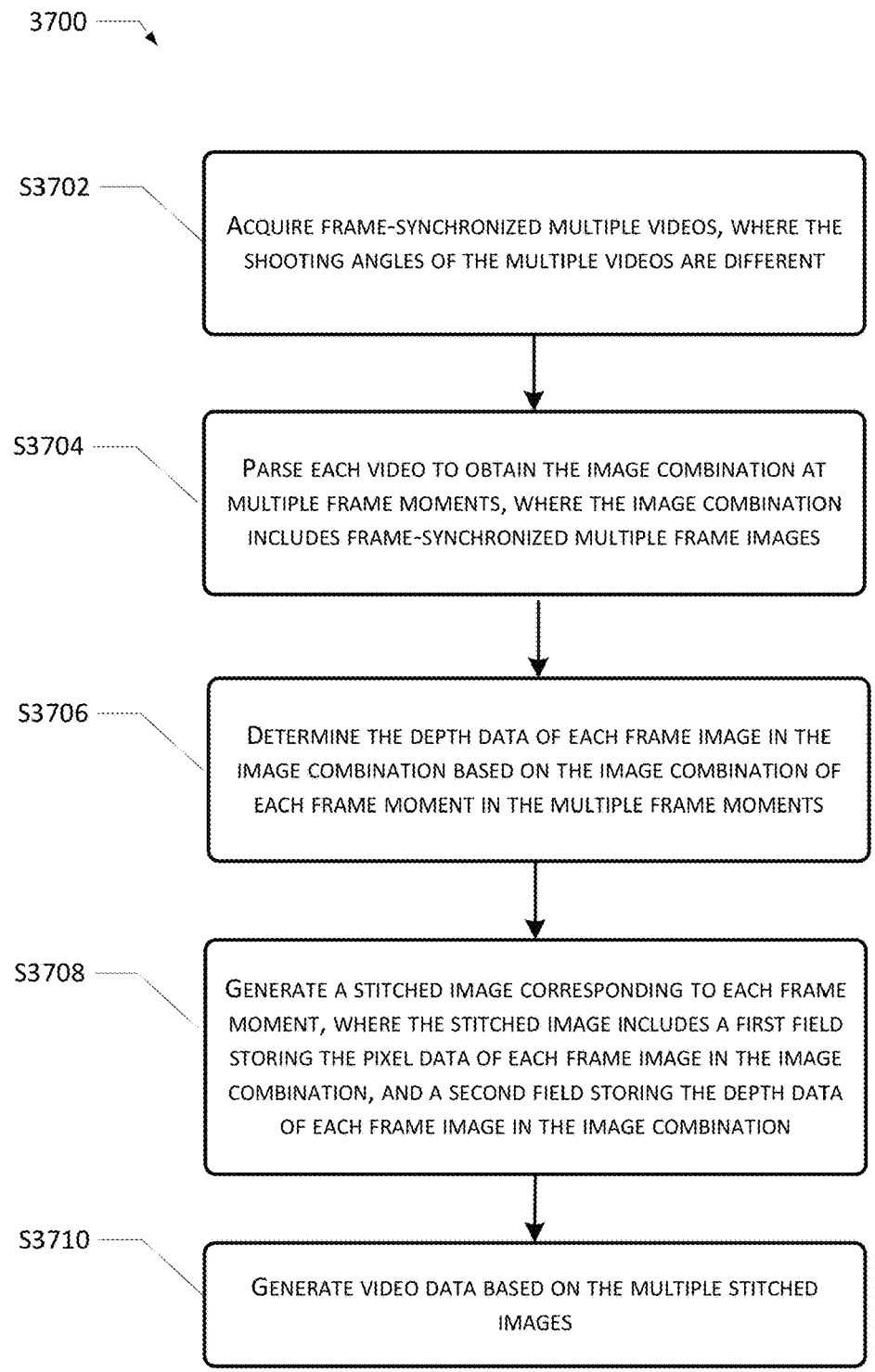
FIG. 37 is a flowchart of a method for generating multi-angle free-perspective video data in an example embodiment of the present disclosure.

Referring to FIG. 37, the method 3700 for generating multi-angle free-perspective video data may include the following steps:

Step S3702, acquiring multiple frame-synchronized videos, where the shooting angles of the multiple videos are different;

Step S3704, parsing each video to obtain the image combinations at multiple frame moments, where the image combination includes multiple frame-synchronized frame images;

Step S3706, determining the depth data of each frame image in the image combination based on the image combination of each frame moment in the multiple frame moments;

Step S3708, generating a stitched image corresponding to each frame moment, where the stitched image includes a first field storing the pixel data of each frame image in the image combination, and a second field storing the depth data of each frame image in the image combination;

Step S3710, generating video data based on the multiple stitched images.

In an example embodiment, the capturing device may be the camera. Multiple frame-synchronized videos may be acquired through multiple cameras. Each video includes frame images at multiple frame moments. Multiple image combinations may correspond to different frame moments respectively. Each image combination includes multiple frame-synchronized frame images.

In implementations, the depth data of each frame image in the image combination can be determined based on the image combination at each frame moment in the multiple frame moments.

Following the previous example embodiment, if the frame image in the original video has a resolution of 1080P, i.e., 1920*1080 pixels, with a progressive scan format, the original depth map may also occupy 1920*1080 pixels, which is the single channel. The amount of data of pixels of the original image is 1920*1080*8*3 bits. The amount of data of the original depth map is 1920*1080*8 bits. If the number of cameras is 30, the amount of data of pixels of the stitched image is 30*(1920*1080*8*3+1920*1080*8) bits, which is about 237M. If not compressed, the stitched image will occupy a lot of system resources and have a large delay. Especially when the bandwidth is small, for example, when the bandwidth is 1 Mbps, the uncompressed stitched image needs about 237 seconds to be transmitted. If the original stitched image is transmitted at the frame rate, real-time video playing is difficult to achieve.

By one or more of the following manners, the amount of data of stitched images may be reduced. Through regular storage, a higher compression ratio may be obtained when the video format is compressed. Alternatively, the original image may be reduced in resolution, and the pixel data after resolution reduction may be used as the pixel data of the two-dimensional image. Alternatively, down-sampling may be performed on one or more of the original depth maps. Alternatively, increasing the video compression bit ratio and other manners may be used.

For example, if the original video, i.e., the obtained multiple videos, the resolution of the frame image is 4K, i.e., the pixel resolution of 4096*2160, and the down-sampling has a resolution of 540P, i.e., the pixel resolution of 960*540, the number of pixels of the stitched image is approximately one-sixteenth of the number of pixels before down-sampling. In combination with any one or more of other manners for reducing the amount of data described above, the amount of data may be made smaller.

Those skilled in the art may understand that if the bandwidth is supportive and the decoding capability of the device that performs data processing may support the stitched image with higher resolution, the stitched image with higher resolution may also be generated to improve the image quality.

In implementations, generating video data based on the multiple stitched images may be generating video data based on all or some of the stitched images, which may be determined according to the frame rate of the video to be generated and the frame rate of the obtained video, or may be determined based on the bandwidth of communication with the device that performs data processing.

In implementations, generating video data based on multiple the stitched images may be encoding and packaging the multiple stitched images in the order of frame moments to generate the video data.

In an example embodiment, the packaging format may be any one of formats such as AVI, Quick Time File Format, MPEG, WMV, Real Video, Flash Video, Matroska, and the like, or other packaging formats. The encoding format may be encoding formats of H.261, H.263, H.264, H.265, MPEG, AVS, and the like, or other encoding formats.

In implementations, generating the multi-angle free-perspective image data may further include generating the association relationship field. The association relationship field may indicate the association relationship between the first field and at least one second field. The first field stores the pixel data of a two-dimensional image of the multiple synchronized two-dimensional images. The second field stores the depth data corresponding to such two-dimensional image. The first field and the second field correspond to the same shooting angle, i.e., the same perspective.

In implementations, generating the multi-angle free-perspective video data may further include, calculating and storing parameter data of each frame image based on the multiple synchronized frame images. The parameter data includes the data of shooting position and shooting angle of the frame image.

In implementations, multiple frame-synchronized frame images in the image combinations at different moments in the multiple synchronized videos may correspond to the same parameter data. The parameter data may be calculated with any group of image combinations.

In implementations, generating the multi-angle free-perspective-range image data may further include generating a parameter data storage address field, where the parameter data storage address field is used to indicate a storage address of the parameter data. The device that performs data processing may obtain the parameter data from the storage address of the parameter data.

In implementations, generating the multi-angle free-perspective-range image data may further include generating a video data storage address field, where the video image storage address field is used to indicate a storage address of the generated video data.

Those skilled in the art may understand that the multi-angle free-perspective video data may include generated video data and other indicative data, such as the above generated association relationship field, parameter data storage address field, video data storage address field, and the like. These pieces of indicative data may be stored in the data header file to instruct the device that performs data processing to obtain the video data, the parameter data, and the like.

The terminology explanations, specific implementations, and beneficial effects involved in respective example embodiments of generating multi-angle free-perspective video data may refer to other example embodiments.

Hereinafter, a method for processing multi-angle free-perspective data is further described.

Referring to FIG. 3, for the multi-angle free-perspective video data generated above, in order to save bandwidth, the multi-angle free-perspective data that can be transmitted to the display device 33 via a network for virtual viewpoint switching after being encoded and compressed. The display device 33 can display a reconstructed image generated after video reconstruction based on the multi-angle free-perspective data.

In order to enable those skilled in the art to better understand and implement the example embodiments of the present disclosure, the video reconstruction method is further described below.

Figure 38:
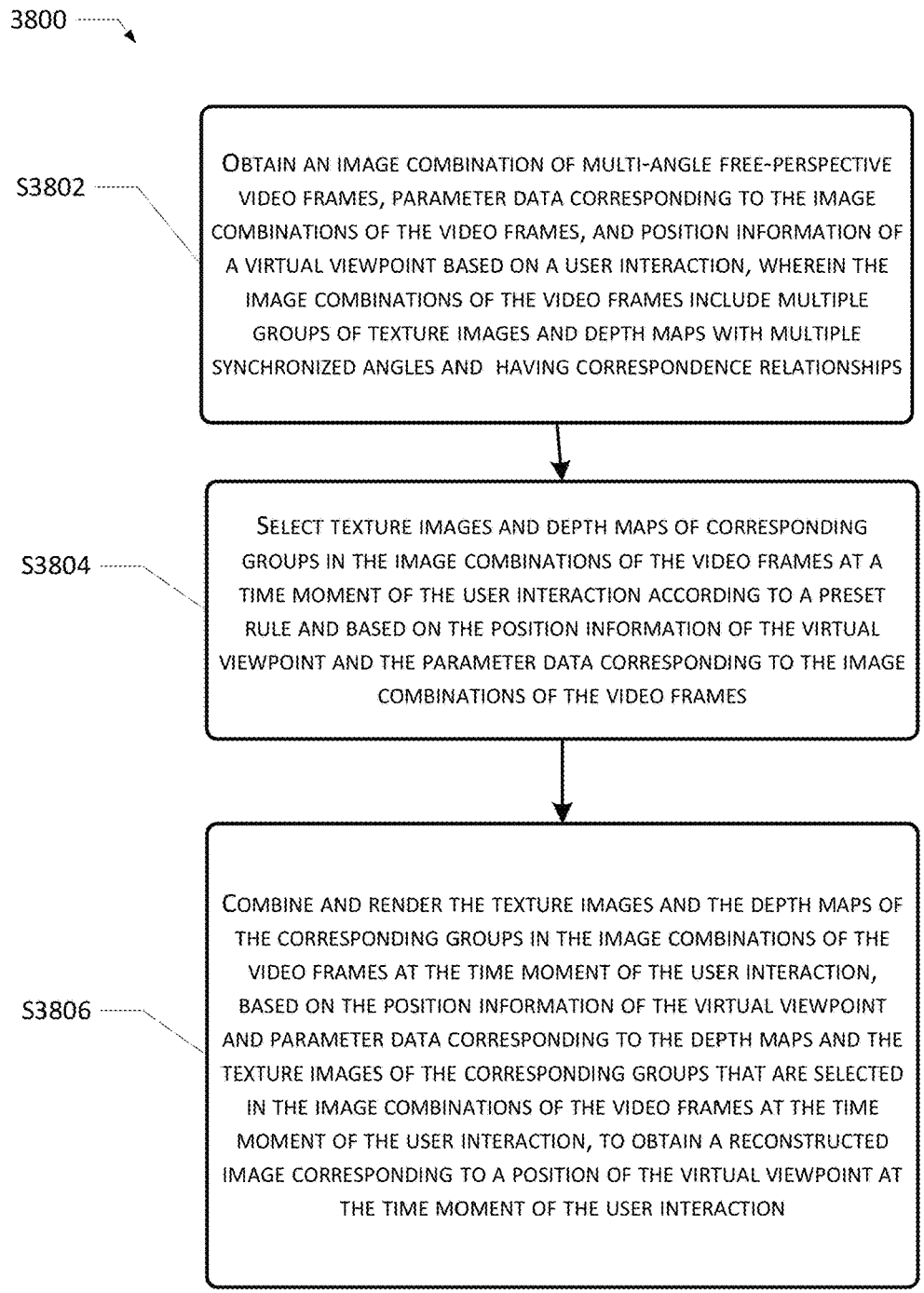
FIG. 38 is a flowchart of a video reconstruction method in an example embodiment of the present disclosure.

FIG. 38 shows a flowchart of a video reconstruction method 3800 in an example embodiment of the present disclosure. In specific implementations, the following steps may be included:

Step S3802, obtaining an image combination of multi-angle free-perspective video frames, parameter data corresponding to the image combinations of the video frames, and position information of a virtual viewpoint based on a user interaction.

The image combinations of the video frames includes multiple groups of texture images and depth maps with multiple synchronized angles and having correspondence relationships.

In implementations, compressed data of multi-angle free perspective video may be decoded to obtain the image combination of the multi-angle free perspective video frames, and the parameter data corresponding to the image combinations of the video frames. After decoding compressed data of the multi-angle free-perspective video, the method of the embodiments of the present disclosure is used for performing video reconstruction, which can further save network transmission resources, and can also use a common compression method and compression software and hardware for performing compression, thus leading to promotion and popularity.

Step S3804, selecting texture images and depth maps of corresponding groups in the image combinations of the video frames at a time moment of the user interaction according to a preset rule and based on the position information of the virtual viewpoint and the parameter data corresponding to the image combinations of the video frames.

In implementations, texture maps and depth maps corresponding to 2 to N capturing devices that are closest to the position of the virtual viewpoint are selected based on the position information of the virtual viewpoint and the parameter data corresponding to the texture images and the depth maps of the corresponding groups in the image combinations of the video frames at the time moment of the user interaction, wherein N is the number of all capturing devices that capture the image combinations of the video frames. In an example embodiment of the present disclosure, texture images and depth maps corresponding to two capturing devices that are closest to the position of the virtual viewpoint are selected by default. In implementations, the user can configure the number of capturing devices that are closest to the position of the virtual viewpoint that are to be selected. The maximum is not greater than the number of capturing devices corresponding to the video frames in the image combination.

Step S3806, combining and rendering the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain a reconstructed image corresponding to a position of the virtual viewpoint at the time moment of the user interaction.

In implementations, step S3806 may use the following steps:

separately performing forward projection on the depth maps of the corresponding groups in the image combinations of the video frames selected at the time moment of the user interaction to map thereof to a virtual position at the time moment of user interaction;

separately performing postprocessing on the forward-projected depth maps;

separately performing backward projection on the texture images of the corresponding groups in the image combinations of the video frames selected at the time moment of the user interaction; and combining each virtual texture image that is generated after the backward projection.

In implementations, the combined texture image can be output as the reconstructed image corresponding to the position of the virtual viewpoint at the time moment of the user interaction.

In implementations, in addition to the texture image, the reconstructed image can also include a corresponding depth map, and multiple ways of obtaining the corresponding depth map can exist. For example, the corresponding depth map may be randomly selected from the depth maps that are obtained after the postprocessing as the depth map of the reconstructed image. For another example, the depth map that is closest to the position of the virtual viewpoint at the time moment of the user interaction may be selected from the depth maps that are obtained after the postprocessing as the depth map of the reconstructed image. If more than one depth map closest to the position of the virtual viewpoint exist, any one of them may be selected. As another example, the depth maps obtained after the post-processing can be combined to obtain a reconstructed depth map.

In implementations, after combining each virtual texture image that is generated after the backward projection, inpainting may further be performed on the combined texture image to obtain the reconstructed image corresponding to the position of the virtual viewpoint at the time moment of the user interaction.

In implementations, a plurality of methods can be used to post-process the depth map after the forward projection. For example, foreground edge protection processing may be performed on the depth map after the forward projection, and pixel level filtering processing may also be performed on the depth map after the forward projection. A single post-processing action may be performed individually, or multiple post-processing actions may be used at the same time.

In an example embodiment of the present disclosure, each virtual texture image that is generated after the backward projection is combined in the following manner: combining each virtual texture image that is generated after the backward projection using global weights determined by distances between the position of the virtual viewpoint and positions of capturing devices that capture the corresponding texture maps in the image combination, based on the position information of the virtual viewpoint and the parameter data corresponding to the texture maps and the depth maps of the corresponding groups in the image combinations of the video frames at the time moment of the user interaction.

Figure 39:
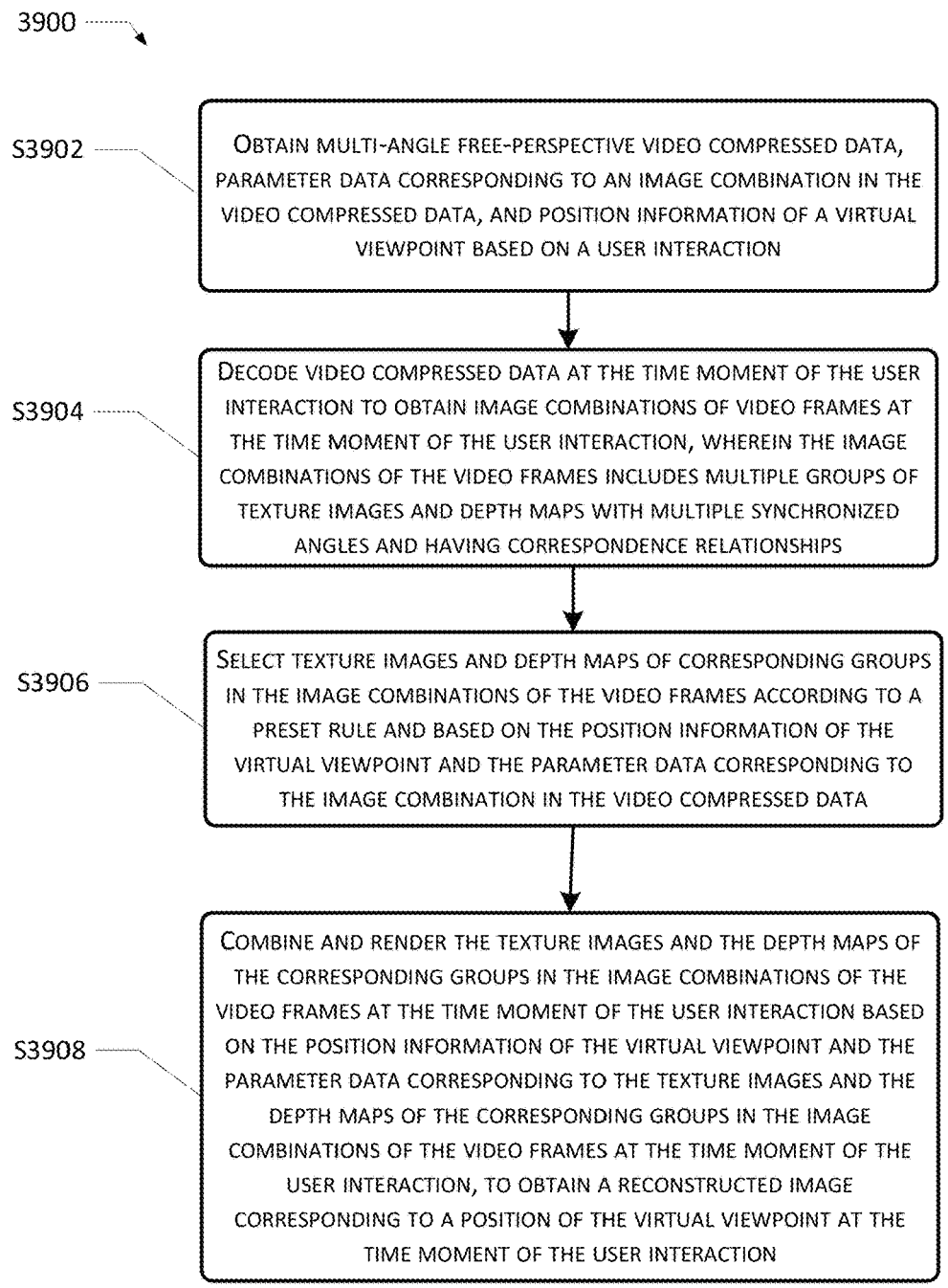
FIG. 39 is a flowchart of another video reconstruction method in an example embodiment of the present disclosure.

FIG. 39 shows a flowchart of another video reconstruction method 3900 in an example embodiment of the present disclosure. In specific implementations, the following method may be used for video reconstruction:

S3902, obtaining multi-angle free-perspective video compressed data, parameter data corresponding to an image combination in the video compressed data, and position information of a virtual viewpoint based on a user interaction.

In implementations, as described above, multiple cameras or video cameras can be used to collect images or videos of a certain scene from multiple angles.

The multi-angle free-perspective video compressed data may be video compressed data with completely free perspectives. In implementations, the perspective can be a perspective of 6 degrees of freedom (DoF), i.e., a spatial position and a perspective of a viewpoint can be freely switched. As described above, the spatial position of the virtual viewpoint may be represented as (x, y, z), and the perspective may be represented as three directions of rotation ($\Theta$, $\varphi$, $\gamma$).

During the process of video reconstruction, video compressed data with multiple angles and free perspectives, and parameter data corresponding to an image combination in the video compressed data may be obtained first.

In implementations, the video compressed data may include a data header file and a data file. The data header file may indicate a defined format of the data file, so that a device that performs video reconstruction on the multi-angle free-perspective data may parse the required data from the data file according to the data header file.

Referring to FIG. 3, the device that performs data processing may be a device located in the CDN, or the device 33 that performs displaying, or may be the device that performs data processing. Both the data file and the data header file may be stored on the server 32 in the cloud. Alternatively, in some application scenarios, the data header file may also be stored in the device that performs data processing, and the data header file is obtained locally.

In implementations, the parameter data of the image combination in the video may be obtained from the data header file of the video compressed data.

As mentioned above, the parameter data may include external parameter data, and may also include internal parameter data. The external parameter data is used to describe spatial coordinates and attitude of an image capturing device, etc. The internal parameter data is used to describe attribute information of the image capturing device, such as an optical center and a focal length of the image capturing device, etc. The internal parameter data may also include distortion parameter data. The distortion parameter data includes radial distortion parameter data and tangential distortion parameter data. A radial distortion occurs when a coordinate system of the image capturing device is transformed into a physical coordinate system of an image. A tangential distortion occurs during a manufacturing process of the image capturing device, because the plane of photoreceptors is not parallel to the lens. Information such as a shooting position and a shooting angle of the video can be determined based on the external parameter data. In the process of video reconstruction, incorporating the internal parameter data including the distortion parameter data can make the determined spatial mapping relationship more accurate.

The header file of the video compressed data may include a field indicating a storage format of the image combination. The field may indicate the storage format using a number. Alternatively, the storage format may be directly written in the field. Accordingly, the parsing result may be the number of the storage format, or the storage format.

Accordingly, the video reconstruction device may determine the storage format according to the parsing result. For example, the specific storage format may be determined according to the number and the stored supporting data. Alternatively, the storage format may also be obtained directly from the field indicating the storage format of the image combination. In other example embodiments, the storage format may be fixed in advance, or the fixed storage format may also be recorded in the video reconstruction device.

In implementations, the image combination in each of the foregoing example embodiments may be used as a data file in the embodiments of the present disclosure. In application scenarios where bandwidth is limited, the image combination can be divided into multiple parts, which are transmitted individually.

In implementations, the 6DoF representation is used. The position information of the virtual viewpoint based on the user interaction can be expressed in a form of coordinates (x, y, z, Θ, ϕ, γ'). The position information of the virtual viewpoint may be generated under one or more preset user interactions. Examples include coordinates inputted by user operations, such as manual clicks or gesture paths, or a virtual position determined by voice input, or a customized virtual viewpoint provided by a user (for example, the user can enter a position or a perspective in a scene, such as under the basketball stand, the edge of the court, the perspective of a referee, the perspective of a coach, etc.) or based on a specific object (such as a player on the court, an actor or guest in the video, a host, etc., and switching to the perspective of the object can be performed after the user clicks on the corresponding object). It can be understood that the way of user interaction is not limited in the example embodiments of the present disclosure, as long as the position information of the virtual viewpoint based on the user interaction can be obtained.

S3904, decoding video compressed data at the time moment of the user interaction to obtain image combinations of video frames at the time moment of the user interaction, wherein the image combinations of the video frames includes multiple groups of texture images and depth maps with multiple synchronized angles and having correspondence relationships.

In implementations, a video format used may be obtained in a data header file of the video compressed data. The video format may include a packaging format and a video compression format. The packaging format may be any one of formats such as AVI, QuickTime File Format, MPEG, WMV, Real Video, Flash Video, Matroska, and the like, or other packaging formats. The video compression format may be H.261, H.263, H.264, H.265, ASF (Advanced Streaming Format), AVS (Audio Video Standard), and the like, and a corresponding decoder can thus be used for decoding. In the embodiment of the present disclosure, there is no restriction on the compression format of the video compressed data. In the embodiments of the present disclosure, no limitations are made for specific decoding methods of the video compressed data. A hardware decoder, a software decoder, or a decoder having a combination of software and hardware may specifically be used.

The storage format may also be a format other than the picture format or the video format, which is not limited herein. Various storage formats that may be indicated by the data header file or the stored supporting data, such that the video reconstruction device obtains the required data for subsequent reconstruction of the image or video of the virtual viewpoint, are all within the protection scope of the present disclosure.

After decoding the video compressed data transmitted in real time or the video compressed data that is locally stored, the image combinations of the video frames at the moment of the user interaction can be obtained. The image combinations of the video frames can include multiple groups of texture images and depth maps with multiple synchronized angles and have correspondence relationships. In implementations, multiple synchronized groups of texture images and depth maps in an image combination of each video frame can be stitched together to form a stitched frame image. Referring to FIG. 27, a structural schematic diagram of an image combination of a video frame obtained by decoding according to an embodiment of the present disclosure includes: texture images of 8 different perspectives that are stitched together and depth maps at corresponding perspectives.

As can be known from FIG. 27, multiple groups of texture images and depth maps in the image combinations in the decoded video frames can be stitched and combined according to a preset relationship. Specifically, the texture images and depth maps of an image combination in the video frames can be divided into a texture image area and a depth map area according to a position relationship. The texture image area stores pixel values of each texture image respectively, and the depth map area stores depth values corresponding to each texture image respectively based on a preset position relationship. The texture image area and the depth map area can be continuous or spaced apart. In the example embodiments of the present disclosure, the position relationship between the texture image and the depth map in the image combination in the video frames is not limited in any way.

For the relationship between multiple groups of texture images and depth maps in the image combinations in the video frames, reference may be made to the description of the foregoing example embodiments, and details thereof are not repeated herein.

In implementations, the texture image may adopt any type of two-dimensional image format, which may be, for example, any one of BMP, PNG, JPEG, or webp format. The depth map can represent a distance of each point in a scene relative to an image capturing device, that is, each pixel value in the depth map represents a distance between a point in the scene and the image capturing device.

S3906, selecting texture images and depth maps of corresponding groups in the image combinations of the video frames according to a preset rule and based on the position information of the virtual viewpoint and the parameter data corresponding to the image combination in the video compressed data.

In implementations, texture images and depth maps of corresponding groups satisfying a preset position relationship and/or a quantity relationship with a position of the virtual viewpoint can be selected from the image combinations of the video frames at the time of the user interaction based on the position information of the virtual viewpoint and the parameter data corresponding to the image combinations in the video compressed data. For example, in a position area of a virtual viewpoint with a high camera density, texture images taken only by two cameras that are closest to the virtual viewpoint and corresponding depth maps may be selected. In a position area of a virtual viewpoint with a low camera density, texture images taken only by 3 or 4 cameras that are closest to the virtual viewpoint and corresponding depth maps may be selected.

By using this method, there is no special requirement for a spatial position distribution of multiple image capturing devices that capture video (which may be, for example, a linear distribution, an arc array distribution, or a distribution of any irregular arrangement). Based on the obtained position information of the virtual viewpoint and the obtained parameter data corresponding to the image combinations of the video frames at the time moment of the user interaction, an actual distribution of image capturing devices are determined, and an adaptive strategy is then used to select texture images and depth maps of corresponding group(s) of image combination(s) of the video frames at the time moment of the user interaction. As such, provide a relatively high degree of freedom and flexibility of selection can be provided while reducing an amount of data computations and ensuring the quality of reconstructed images. Furthermore, installation requirements for an image capturing device that captures videos are lowered, which facilitates an adaptation to different site requirements and ease of installation.

In an example embodiment of the present disclosure, based on the position information of the virtual viewpoint and the parameter data corresponding to the video compressed data, texture images and depth maps of a preset number of corresponding groups closest to the position of the virtual viewpoint at the time moment of the user interaction are selected.

Those skilled in the art may understand that, in implementations, texture images and depth maps of corresponding groups can also be selected using other preset rules, for example, according to the processing capability of the video reconstruction device, or according to the user's requirement for the reconstruction speed or resolution requirement for the reconstructed video (such as low definition, high definition, or ultra high definition, etc.).

S3908, combining and rendering the texture images and the depth maps of the corresponding groups in the image combinations of the video frames at the time moment of the user interaction based on the position information of the virtual viewpoint and the parameter data corresponding to the texture images and the depth maps of the corresponding groups in the image combinations of the video frames at the time moment of the user interaction, to obtain a reconstructed image corresponding to a position of the virtual viewpoint at the time moment of the user interaction.

In implementations, multiple methods may be used to combine and render texture images and the depth maps of the corresponding groups in the image combinations of the video frames at the time moment of the user interaction to obtain the reconstructed image corresponding to the position of the virtual viewpoint at the time moment of the user interaction.

In an example embodiment of the present disclosure, according to the depth maps of the corresponding groups in the image combinations of the video frames at the time moment of the user interaction, pixels in the texture maps of the corresponding groups in the image combinations of the video frames are directly copied to virtual texture images that are generated to obtain the reconstructed image corresponding to the position of the virtual viewpoint at the time moment of the user interaction.

In an example embodiment of the present disclosure, the forward projection may be performed first, and the depth information is used to project a corresponding group of texture images in the image combination of the video frame to the three-dimensional Euclidean space. That is, the depth maps of the corresponding group are respectively projected to the position of the virtual viewpoint at the user interaction moment according to the spatial geometric relationship, to form the virtual viewpoint position depth map. Then, the backward projection is performed to project the three-dimensional spatial points onto the imaging plane of the virtual camera, that is, copying from the pixel points in the texture images of the corresponding group to the generated virtual texture images corresponding to the position of the virtual viewpoint according to the projected depth map, to form the virtual texture images corresponding to the corresponding group. Next, the virtual texture images corresponding to the corresponding group are fused to obtain the reconstructed image of the position of the virtual viewpoint at the user interaction moment. With the above method for reconstructing the image, the sampling accuracy of the reconstructed image may be improved.

Before the forward projection is performed, preprocessing may be performed first. In an example embodiment, according to the parameter data corresponding to the corresponding group in the image combination of the video frame, the depth value of forward projection and the homography matrix of the texture backward projection may be calculated first. In implementations, the Z transformation may be used to convert the depth level into the depth value.

During the forward projection of the depth map, the formula may be used to project the depth maps of the corresponding group to the depth maps of the position of the virtual viewpoint, and then the depth values of the corresponding position are copied. In addition, the depth maps of the corresponding group may have noise, and some sampled signals may be included in the projecting process, so the generated depth maps of the position of the virtual viewpoint may have small noise holes. Regarding such a problem, median filtering may be used to remove the noise.

In implementations, other postprocessing may also be performed on the depth maps of the position of the virtual viewpoint obtained after the forward projection according to needs, to further improve the quality of the generated reconstructed image. In an example embodiment of the present disclosure, before the backward projection is performed, the front and back view occlusion relationship of the depth maps of the position of the virtual viewpoint obtained by the forward projection is processed, so that the generated depth maps may more truly reflect the positional relationship of objects in the scenario viewed at the position of the virtual viewpoint.

For the backward projection, for example, the position of the corresponding group of texture images in the virtual texture images may be calculated according to the depth maps of the position of the virtual viewpoint obtained by the forward projection. Next, the texture values corresponding to the pixel positions are copied, where holes in the depth maps may be marked as 0 or as no texture value in the virtual texture images. For the area marked as the hole, the hole expansion may be performed to avoid synthetic illusion.

Next, the generated virtual texture images of the corresponding groups are fused to obtain the reconstructed image of the position of the virtual viewpoint at the user interaction moment. In implementations, the fusion may also be performed in various manners. The following two example embodiments are used for illustration.

In an example embodiment of the present disclosure, weighting processing is performed first, and then inpainting is performed. In an example embodiment, the weighting processing is performed on pixels in corresponding positions in the virtual texture images corresponding to the respective corresponding groups in the image combinations of video frames at the time of user interaction, to obtain the pixel values of corresponding positions in the reconstructed image of the position of the virtual viewpoint at the user interaction moment. Next, for the position where the pixel value is zero in the reconstructed image at the position of the virtual viewpoint at the user interaction moment, the pixels around the pixels in the reconstructed image are used to perform the inpainting, to obtain the reconstructed image of viewpoint position at the user interaction moment.

In an example embodiment of the present disclosure, inpainting is performed first, and then weighting processing is performed. Specifically, for the position where the pixel value is zero in the virtual texture images corresponding to the respective corresponding groups in the image combinations of the video frames at the time of user interaction, the around pixel values are used respectively to perform inpainting. Next, after the inpainting, the weighting processing is performed on the pixel values in corresponding positions in the virtual texture images corresponding to the respective corresponding groups, to obtain the reconstructed image of the position of the virtual viewpoint at the time of the user interaction.

The weighting processing in the above example embodiment may specifically use the weighted average method, or may use different weighting coefficients according to parameter data or the positional relationship between the image capturing device and the virtual viewpoint. In an example embodiment of the present disclosure, the weighting is performed according to the reciprocal of the distance between the position of the virtual viewpoint and the positions of the respective image capturing devices, i.e., the closer the image capturing device to the position of the virtual viewpoint is, the greater the weight is.

In implementations, the inpainting may be performed with a preset inpainting algorithm according to needs, and details thereof are not described herein again.

The above examples illustrate how to perform combination and rendering of texture images and depth maps of corresponding groups in image combinations of video frames based on a position of a virtual viewpoint and parameter data of the corresponding group in the image combinations of the video frames. Those skilled in the art may understand that, in implementations, other depth image based rendering (DIBR) algorithms can also be adopted as needed, which are not listed herein.

Figure 40:
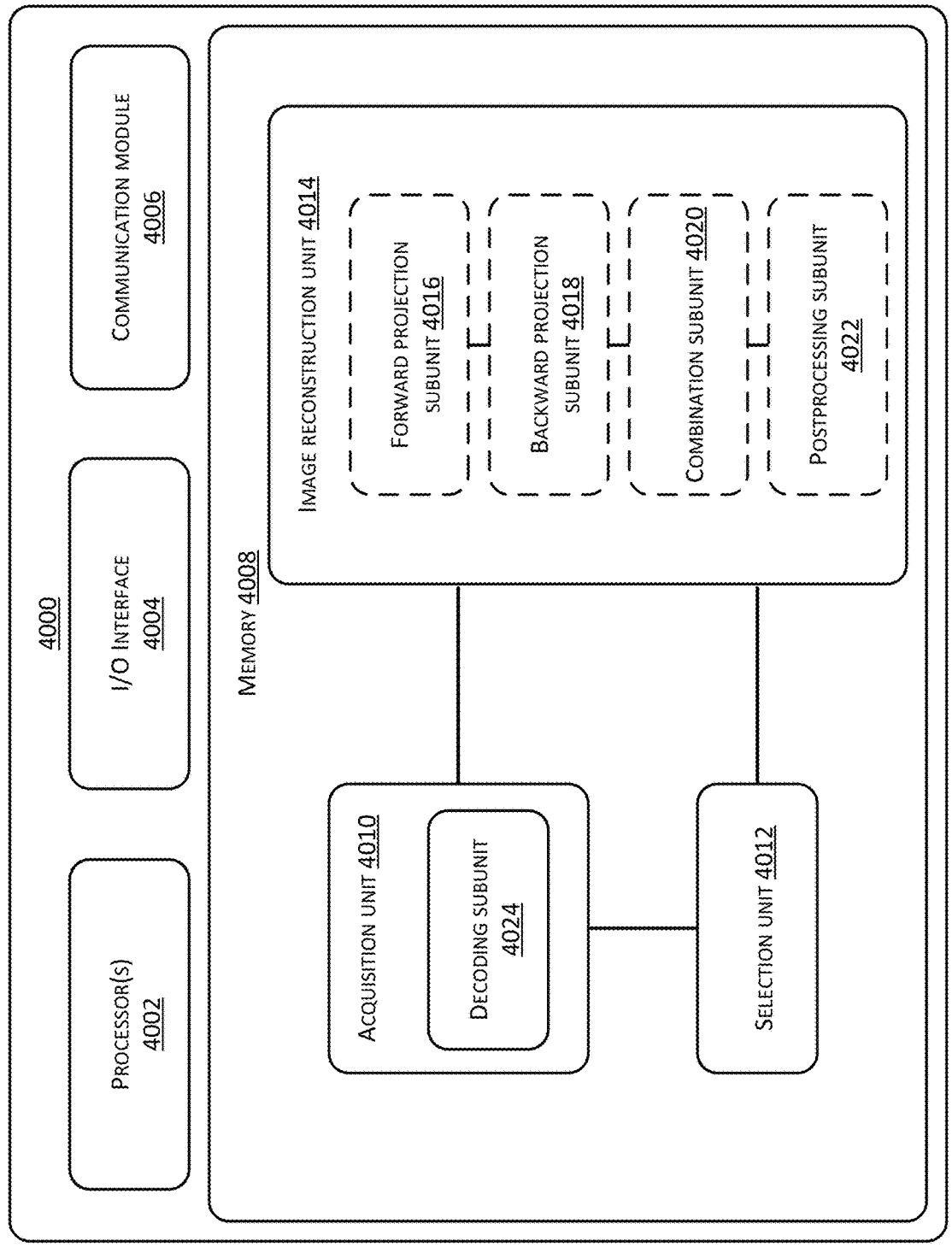
FIG. 40 is a structural schematic diagram of a video reconstruction system in an example embodiment of the present disclosure.

FIG. 40 shows a structural schematic diagram of a video reconstruction system 4000 in an example embodiment of the present disclosure. The example embodiments of the present disclosure also provide a video reconstruction system 4000. As shown in FIG. 40, the video reconstruction system 4000 may include one or more processors 4002, an input/output module 4004, a communication module 4006, and a memory 4008. The input/output module 4004 is configured to receive data/signal to be processed and to output the processed data/signal. The communication module 4006 is configured to allow the system 4000 to communicate with other devices (not shown) over a network (not shown). The memory 4008 stores thereon computer-executable modules executable by the one or more processors 4002. The computer-executable modules/units may include an acquisition unit 4010, a selection unit 4012, and an image reconstruction unit 4014, wherein:

the acquisition unit 4010, adapted to obtain an image combination of multi-angle free-perspective video frames, parameter data corresponding to the image combinations of the video frames, and position information of a virtual viewpoint based on a user interaction, wherein the image combinations of the video frames includes multiple groups of texture images and depth maps with multiple synchronized angles and having correspondence relationships;

the selection unit 4012, adapted to select texture images and depth maps of corresponding groups in the image combinations of the video frames at a time moment of the user interaction according to a preset rule and based on the position information of the virtual viewpoint and the parameter data corresponding to the image combinations of the video frames; and the image reconstruction unit 4014, adapted to combine and render the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain a reconstructed image corresponding to a position of the virtual viewpoint at the time moment of the user interaction.

Using the above video reconstruction system, texture images and depth maps of corresponding group(s) in image combination(s) of video frames at a time moment of a user interaction are selected according to a preset rule based on position information of a virtual viewpoint and parameter data corresponding to the image combination(s) of the video frames. Only the texture images and the depth maps of the corresponding group(s) at the time moment of the user interaction are combined and rendered based on a position of the virtual viewpoint and parameter data of the corresponding group(s) in the image combination(s) of the video frames at the time moment of the user interaction, without having to perform video image reconstruction based on texture images and depth maps of all the groups in the image combination(s) of the video frames at the time moment of the user interaction that are obtained after decoding. As such, an amount of data computations in a process of video reconstruction can be reduced.

In implementations, the selection unit 4012 may select texture images and depth maps of corresponding groups satisfying a preset position relationship with the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction, or select texture images and depth maps of corresponding groups satisfying a preset quantity relationship with the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction, or select texture images and depth maps of corresponding groups satisfying the preset position relationship and the preset quantity relationship with the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

In implementations, the selection unit 4012 may select texture images and depth maps of a predetermined number of corresponding groups that are closest to the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

In implementations, referring to FIG. 40, the image reconstruction unit 4014 may include: a forward projection subunit 4016, a backward projection subunit 4018, and a combination subunit 4020, wherein:

the forward projection subunit 4016, adapted to separately map the depth maps of the corresponding groups to the position of the virtual viewpoint at the time of the user interaction according to a spatial geometric relationship, to form virtual viewpoint position depth maps;

the backward projection subunit 4018, adapted to copy pixel points from the texture images of the corresponding groups to the generated texture images corresponding to the position of the virtual viewpoint according to the mapped depth maps to form corresponding virtual texture images of the corresponding groups; and the combination subunit 4020, adapted to combine the corresponding virtual texture images of the corresponding groups to obtain the reconstructed image of the position of the virtual viewpoint at the time moment of the user interaction.

In an example embodiment of the present disclosure, the combination subunit 4020 is adapted to perform weighting processing on pixels of corresponding positions in the virtual texture map corresponding to the corresponding groups to obtain pixel values of the corresponding positions in the reconstructed image of the position of the virtual viewpoint at the time moment of the user interaction; and is adapted to perform inpainting using pixels around a pixel in the reconstructed image for a position whose pixel value is zero in the reconstructed image of the position of the virtual viewpoint at the time of the user interaction, to obtain the reconstructed image of the virtual viewpoint position at the time moment of the user interaction.

In an example embodiment of the present disclosure, the combination subunit 4020 is adapted to separately use surrounding pixel values to perform inpainting for positions whose pixel values are zero in the virtual texture images corresponding to the corresponding groups; and adapted to perform weighting processing on pixel values at corresponding positions in the virtual texture images corresponding to the corresponding groups after the inpainting to obtain the reconstructed image of the position of the virtual viewpoint at the time moment of the user interaction.

In an example embodiment of the present disclosure, the forward projection subunit 4016 is adapted to separately perform forward projection on the depth maps of the corresponding groups in the image combinations of the video frames selected at the time moment of the user interaction to map thereof to a virtual position at the time moment of user interaction; the backward projection subunit 4018 is adapted to separately perform backward projection on the texture images of the corresponding groups in the image combinations of the video frames selected at the time moment of the user interaction; and the combination subunit 4020 is adapted to combine each virtual texture image that is generated after the backward projection.

In implementations, the combined texture image can be outputted as the reconstructed image corresponding to the position of the virtual viewpoint at the time moment of the user interaction.

In implementations, in addition to the texture image, the reconstructed image can also include a corresponding depth map, and multiple ways of obtaining the corresponding depth map can exist. For example, the corresponding depth map may be randomly selected from the depth maps that are obtained after the postprocessing as the depth map of the reconstructed image. For another example, the depth map that is closest to the position of the virtual viewpoint at the time moment of the user interaction may be selected from the depth maps that are obtained after the postprocessing as the depth map of the reconstructed image. If more than one depth map closest to the position of the virtual viewpoint exist, any one of them may be selected. As another example, the depth maps obtained after the post-processing can be combined to obtain a reconstructed depth map.

In implementations, the image reconstruction unit 4014 may further include a postprocessing subunit 4022, which is adapted to separately postprocess the depth maps after the forward mapping. For example, the postprocessing subunit may perform at least one of foreground edge protection processing or pixel-level filtering processing on the depth maps after the forward mapping.

In implementations, the acquisition unit 4010 may include a decoding subunit 4024, which is adapted to decode multi-angle free-perspective video compressed data that is obtained to obtain the image combinations of the multi-angle free-perspective video frames, and the parameter data corresponding to the image combinations of the video frames.

The example embodiments of the present disclosure further provide a video reconstruction device capable of implementing the foregoing video reconstruction method. The video reconstruction device may include a memory and a processor. The memory stores computer instructions that can run on the processor. When the processor runs the computer instructions, the steps of the video reconstruction method according to any one of the foregoing embodiments may be performed.

In implementations, the video reconstruction device may include a terminal device. After the terminal device completes video reconstruction by using the foregoing embodiments, the terminal device may output a presentation through a display interface for a user to view. The terminal device may be a handheld terminal such as a mobile phone, a tablet computer, a set-top box, and the like.

In implementations, an edge node may also be used to perform the foregoing video reconstruction. After the edge node completes video reconstruction, the edge node may send an output to a key device that communicates with the edge node for a user to view. The edge node may be a node that performs short-range communication with a display device displaying a reconstructed image and maintains a high-bandwidth and low-latency connection, such as performing a connection through a WIFI, 5G network, or the like. In implementations, the edge node may be any one of a base station, a router, a home gateway, or a vehicle-mounted device, etc. With reference to FIG. 3, the edge node may be a device located in a CDN.

In implementation, in a network, a specific terminal device or edge node device may be selected according to respective processing capabilities of terminal devices and edge nodes, or according to a user selection, or according to a configuration of an operator, to perform the process of video reconstruction in the example embodiments of the present disclosure. Details may be referenced to the specific methods described in the example embodiments of the present disclosure, and are not repeated herein.

The example embodiments of the present disclosure further provide a computer readable storage medium having computer instructions stored thereon. When the computer instructions are run, the steps of the video reconstruction method according to any one of the foregoing example embodiments of the present disclosure may be performed. For details of the video reconstruction method performed by the instructions stored on the computer readable storage medium, reference may be made to various video reconstruction methods of the foregoing example embodiments, and details are not repeated herein.

The computer-readable storage medium may be various suitable media, such as an optical disc, a mechanical hard disk, and a solid-state hard disk. The computer-readable storage medium may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable storage medium does not include transitory media, such as modulated data signals and carrier waves.

Although the present disclosure has been disclosed as above, the present disclosure is not limited thereto. Any person skilled in the art may make various changes and modifications without departing from the spirit and scope of the present disclosure. Therefore, the protection scope of the present disclosure shall be subject to the scope defined by the claims.

EXAMPLE CLAUSES

Clause 1. A video construction method comprising: obtaining an image combination of multi-angle free-perspective video frames, parameter data corresponding to the image combinations of the video frames, and position information of a virtual viewpoint based on a user interaction, wherein the image combinations of the video frames includes multiple groups of texture images and depth maps with multiple synchronized angles and having correspondence relationships; selecting texture images and depth maps of corresponding groups in the image combinations of the video frames at a time moment of the user interaction according to a preset rule and based on the position information of the virtual viewpoint and the parameter data corresponding to the image combinations of the video frames; and combining and rendering the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain a reconstructed image corresponding to a position of the virtual viewpoint at the time moment of the user interaction.

Clause 2. The video construction method according to clause 1, wherein selecting the texture images and the depth maps of the corresponding groups in the image combinations of the video frames at the time moment of the user interaction according to the preset rule and based on the position information of the virtual viewpoint and the parameter data corresponding to the image combinations of the video frames comprises: selecting texture images and depth maps of corresponding groups satisfying a preset position relationship and/or a quantity relationship with the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

Clause 3. The video construction method according to clause 2, wherein selecting the texture images and the depth maps of the corresponding groups satisfying the preset position relationship and/or the quantity relationship with the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction comprises: selecting texture images and depth maps of a predetermined number of corresponding groups that are closest to the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

Clause 4. The video construction method according to clause 3, wherein selecting the texture images and the depth maps of the predetermined number of corresponding groups that are closest to the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction comprises: selecting texture maps and depth maps corresponding to 2 to N capturing devices that are closest to the position of the virtual viewpoint, based on the position information of the virtual viewpoint and the parameter data corresponding to the texture images and the depth maps of the corresponding groups in the image combinations of the video frames at the time moment of the user interaction, wherein N is the number of all capturing devices that capture the image combinations of the video frames.

Clause 5. The video construction method according to clause 1, wherein combining and rendering the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain the reconstructed image corresponding the position of the virtual viewpoint at the time moment of the user interaction comprises: separately performing forward projection on the depth maps of the corresponding groups in the image combinations of the video frames selected at the time moment of the user interaction to map thereof to a virtual position at the time moment of user interaction; separately performing postprocessing on the forward-projected depth maps; separately performing backward projection on the texture images of the corresponding groups in the image combinations of the video frames selected at the time moment of the user interaction; and combining each virtual texture image that is generated after the backward projection.

Clause 6. The video construction method according to clause 5, wherein: after combining each virtual texture image that is generated after the backward projection, the method further comprises: performing inpainting on the combined texture image to obtain the reconstructed image corresponding to the position of the virtual viewpoint at the time moment of the user interaction.

Clause 7. The video construction method according to clause 5, wherein separately performing the postprocessing on the forward-projected depth maps comprises at least one of the following: separately performing foreground edge protection processing on the forward-projected depth maps; or separately performing pixel level filtering on the forward-projected depth maps.

Clause 8. The video construction method according to clause 5, wherein combining each virtual texture image that is generated after the backward projection comprises: combining each virtual texture image that is generated after the backward projection using global weights determined by distances between the position of the virtual viewpoint and positions of capturing devices that capture the corresponding texture maps in the image combination, based on the position information of the virtual viewpoint and the parameter data corresponding to the texture maps and the depth maps of the corresponding groups in the image combinations of the video frames at the time moment of the user interaction.

Clause 9. The video construction method according to clause 1, wherein combining and rendering the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain the reconstructed image corresponding the position of the virtual viewpoint at the time moment of the user interaction comprises: separately mapping the depth maps of the corresponding groups to the position of the virtual viewpoint at the time of the user interaction according to a spatial geometric relationship, to form virtual viewpoint position depth maps, and copying pixel points from the texture images of the corresponding groups to the generated texture images corresponding to the position of the virtual viewpoint according to the mapped depth maps to form corresponding virtual texture images of the corresponding groups; and combining the corresponding virtual texture images of the corresponding groups in the image combinations of the video frames at the time moment of the user interaction to obtain the reconstructed image of the position of the virtual viewpoint at the time moment of the user interaction.

Clause 10. The video construction method according to clause 9, wherein combining the corresponding virtual texture images of the corresponding groups in the image combinations of the video frames at the time moment of the user interaction to obtain the reconstructed image of the position of the virtual viewpoint at the time moment of the user interaction comprises: performing weighting processing on pixels of corresponding positions in the virtual texture map corresponding to the corresponding groups in the frame image combinations of the video frames at the time moment of the user interaction to obtain pixel values of the corresponding positions in the reconstructed image of the position of the virtual viewpoint at the time moment of the user interaction; and performing inpainting using pixels around a pixel in the reconstructed image for a position whose pixel value is zero in the reconstructed image of the position of the virtual viewpoint at the time of the user interaction, to obtain the reconstructed image of the virtual viewpoint position at the time moment of the user interaction.

Clause 11. The video construction method according to clause 9, wherein combining the corresponding virtual texture images of the corresponding groups in the image combinations of the video frames at the time moment of the user interaction to obtain the reconstructed image of the position of the virtual viewpoint at the time moment of the user interaction comprises: separately using surrounding pixel values to perform inpainting for positions whose pixel values are zero in the virtual texture images corresponding to the corresponding groups in the image combinations of the video frames at the time moment of the user interaction; and performing weighting processing on pixel values at corresponding positions in the virtual texture images corresponding to the corresponding groups after the inpainting to obtain the reconstructed image of the position of the virtual viewpoint at the time moment of the user interaction.

Clause 12. The video construction method according to clause 1, wherein obtaining the image combination of the multi-angle free perspective video frames and the parameter data corresponding to the image combinations of the video frames comprises: decoding compressed data of multi-angle free perspective video to obtain the image combination of the multi-angle free perspective video frames, and the parameter data corresponding to the image combinations of the video frames.

Clause 13. A video reconstruction system comprising: an acquisition unit, adapted to obtain an image combination of multi-angle free-perspective video frames, parameter data corresponding to the image combinations of the video frames, and position information of a virtual viewpoint based on a user interaction, wherein the image combinations of the video frames includes multiple groups of texture images and depth maps with multiple synchronized angles and having correspondence relationships; a selection unit, adapted to select texture images and depth maps of corresponding groups in the image combinations of the video frames at a time moment of the user interaction according to a preset rule and based on the position information of the virtual viewpoint and the parameter data corresponding to the image combinations of the video frames; and an image reconstruction unit, adapted to combine and render the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain a reconstructed image corresponding to a position of the virtual viewpoint at the time moment of the user interaction.

Clause 14. A video reconstruction device, comprising a memory and a processor, the memory having computer instructions stored thereon capable of running on the processor, wherein: when the computer instructions are executed by the processor, steps of the video reconstruction method according to any one of clauses 1 to 12 are performed.

Clause 15. The video reconstruction device according to clause 14, wherein the video reconstruction device comprises at least one of: a terminal device or an edge node.

Clause 16. A computer-readable storage medium having computer instructions stored thereon, wherein: when the computer instructions are executed, steps of the video reconstruction method according to any one of clauses 1 to 12 are performed.

What is claimed is:

1. A method comprising:
   obtaining image combinations of video frames, parameter data corresponding to the image combinations of the video frames, and position information of a virtual viewpoint based on a user interaction, wherein the image combinations of the video frames includes multiple groups of texture images and depth maps with multiple synchronized angles and having correspondence relationships, and the video frames comprise multi-angle free perspective video frames;
   selecting texture images and depth maps of corresponding groups in the image combinations of the video frames at a time moment of the user interaction according to a preset rule and based on the position information of the virtual viewpoint and the parameter data corresponding to the image combinations of the video frames; and
   combining and rendering the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain a reconstructed image corresponding to a position of the virtual viewpoint at the time moment of the user interaction, wherein combining and rendering the texture images and the depth maps of the corresponding groups in the image combinations of the video frames comprises:
   separately mapping the depth maps of the corresponding groups to the position of the virtual viewpoint at the time of the user interaction according to a spatial geometric relationship, to form virtual viewpoint position depth maps, and copying pixel points from the texture images of the corresponding groups to texture images corresponding to the position of the virtual viewpoint according to the mapped depth maps to form corresponding virtual texture images of the corresponding groups; and
   combining the corresponding virtual texture images of the corresponding groups in the image combinations of the video frames at the time moment of the user interaction to obtain the reconstructed image of the position of the virtual viewpoint at the time moment of the user interaction.

2. The method according to claim 1, wherein selecting the texture images and the depth maps of the corresponding groups comprises:
   selecting texture images and depth maps of corresponding groups satisfying a preset position relationship and/or a quantity relationship with the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

3. The method according to claim 2, wherein selecting the texture images and the depth maps of the corresponding groups satisfying the preset position relationship and/or the quantity relationship with the position of the virtual viewpoint comprises:
   selecting texture images and depth maps of a predetermined number of corresponding groups that are closest to the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

4. The method according to claim 3, wherein selecting the texture images and the depth maps of the predetermined number of corresponding groups that are closest to the position of the virtual viewpoint comprises:
   selecting texture maps and depth maps corresponding to 2 to N capturing devices that are closest to the position of the virtual viewpoint, based on the position information of the virtual viewpoint and the parameter data corresponding to the texture images and the depth maps of the corresponding groups in the image combinations of the video frames at the time moment of the user interaction, wherein N is the number of all capturing devices that capture the image combinations of the video frames.

5. The method according to claim 1, wherein rendering the texture images and the depth maps of the corresponding groups comprises:
separately performing forward projection on the depth maps of the corresponding groups in the image combinations of the video frames selected at the time moment of the user interaction to map thereof to a virtual position at the time moment of user interaction;
separately performing postprocessing on the forward-projected depth maps;
separately performing backward projection on the texture images of the corresponding groups in the image combinations of the video frames selected at the time moment of the user interaction; and
combining each virtual texture image that is generated after the backward projection.

6. The method according to claim 5, wherein: after combining each virtual texture image that is generated after the backward projection, the method further comprises:
performing inpainting on the combined texture image to obtain the reconstructed image corresponding to the position of the virtual viewpoint at the time moment of the user interaction.

7. The method according to claim 5, wherein separately performing the postprocessing on the forward-projected depth maps comprises at least one of:
separately performing foreground edge protection processing on the forward-projected depth maps; or
separately performing pixel level filtering on the forward-projected depth maps.

8. The method according to claim 5, wherein combining each virtual texture image that is generated after the backward projection comprises:
combining each virtual texture image that is generated after the backward projection using global weights determined by distances between the position of the virtual viewpoint and positions of capturing devices that capture the corresponding texture maps in the image combination, based on the position information of the virtual viewpoint and the parameter data corresponding to the texture maps and the depth maps of the corresponding groups in the image combinations of the video frames at the time moment of the user interaction.

9. The method according to claim 1, wherein combining the corresponding virtual texture images of the corresponding groups comprises:
performing weighting processing on pixels of corresponding positions in the virtual texture map corresponding to the corresponding groups in the frame image combinations of the video frames at the time moment of the user interaction to obtain pixel values of the corresponding positions in the reconstructed image of the position of the virtual viewpoint at the time moment of the user interaction; and
performing inpainting using pixels around a pixel in the reconstructed image for a position whose pixel value is zero in the reconstructed image of the position of the virtual viewpoint at the time of the user interaction, to obtain the reconstructed image of the virtual viewpoint position at the time moment of the user interaction.

10. The method according to claim 1, wherein combining the corresponding virtual texture images of the corresponding groups comprises:
separately using surrounding pixel values to perform inpainting for positions whose pixel values are zero in the virtual texture images corresponding to the corresponding groups in the image combinations of the video frames at the time moment of the user interaction; and
performing weighting processing on pixel values at corresponding positions in the virtual texture images corresponding to the corresponding groups after the inpainting to obtain the reconstructed image of the position of the virtual viewpoint at the time moment of the user interaction.

11. The method according to claim 1, wherein obtaining the image combination of the multi-angle free perspective video frames and the parameter data corresponding to the image combinations of the video frames comprises:
decoding compressed data of multi-angle free perspective video to obtain the image combination of the multi-angle free perspective video frames, and the parameter data corresponding to the image combinations of the video frames.

12. One or more computer readable storage media storing executable instructions that, when executed by one or more processors, cause the one or more processors to perform acts comprising:
obtaining image combinations of video frames, parameter data corresponding to the image combinations of the video frames, and position information of a virtual viewpoint based on a user interaction, wherein the image combinations of the video frames includes multiple groups of texture images and depth maps with multiple synchronized angles and having correspondence relationships, and the video frames comprise multi-angle free perspective video frames;
selecting texture images and depth maps of corresponding groups in the image combinations of the video frames at a time moment of the user interaction according to a preset rule and based on the position information of the virtual viewpoint and the parameter data corresponding to the image combinations of the video frames; and
combining and rendering the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain a reconstructed image corresponding to a position of the virtual viewpoint at the time moment of the user interaction, wherein rendering the texture images and the depth maps of the corresponding groups comprises:
separately performing forward projection on the depth maps of the corresponding groups in the image combinations of the video frames selected at the time moment of the user interaction to map thereof to a virtual position at the time moment of user interaction; and
separately performing backward projection on the texture images of the corresponding groups in the image combinations of the video frames selected at the time moment of the user interaction.

13. The one or more computer readable storage media according to claim 12, wherein selecting the texture images and the depth maps of the corresponding groups comprises:
selecting texture images and depth maps of corresponding groups satisfying a preset position relationship and/or a quantity relationship with the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

14. The one or more computer readable storage media according to claim 13, wherein selecting the texture images and the depth maps of the corresponding groups satisfying the preset position relationship and/or the quantity relationship with the position of the virtual viewpoint comprises:
selecting texture images and depth maps of a predetermined number of corresponding groups that are closest to the position of the virtual viewpoint from the image combinations of the video frames at the time moment of the user interaction, based on the position information of the virtual viewpoint and the parameter data corresponding to the texture images and the depth maps of the corresponding groups in the image combinations of the video frames at the time moment of the user interaction.

15. The one or more computer readable storage media according to claim 14, wherein selecting the texture images and the depth maps of the predetermined number of corresponding groups that are closest to the position of the virtual viewpoint comprises:
selecting texture maps and depth maps corresponding to 2 to N capturing devices that are closest to the position of the virtual viewpoint, based on the position information of the virtual viewpoint and the parameter data corresponding to the texture images and the depth maps of the corresponding groups in the image combinations of the video frames at the time moment of the user interaction, wherein N is the number of all capturing devices that capture the image combinations of the video frames.

16. The one or more computer readable storage media according to claim 12, wherein rendering the texture images and the depth maps of the corresponding groups comprises:
separately performing postprocessing on the forward-projected depth maps; and
combining each virtual texture image that is generated after the backward projection.

17. The one or more computer readable storage media according to claim 16, wherein: after combining each virtual texture image that is generated after the backward projection, the acts further comprise:
performing inpainting on the combined texture image to obtain the reconstructed image corresponding to the position of the virtual viewpoint at the time moment of the user interaction.

18. The one or more computer readable storage media according to claim 16, wherein combining each virtual texture image that is generated after the backward projection comprises:
combining each virtual texture image that is generated after the backward projection using global weights determined by distances between the position of the virtual viewpoint and positions of capturing devices that capture the corresponding texture maps in the image combination, based on the position information of the virtual viewpoint and the parameter data corresponding to the texture maps and the depth maps of the corresponding groups in the image combinations of the video frames at the time moment of the user interaction.

19. A system comprising:
one or more processors;
memory;
an acquisition unit stored in the memory and executable by the one or more processors to obtain image combinations of video frames, parameter data corresponding to the image combinations of the video frames, and position information of a virtual viewpoint based on a user interaction, wherein the image combinations of the video frames includes multiple groups of texture images and depth maps with multiple synchronized angles and having correspondence relationships, and the video frames comprise multi-angle free-perspective video frames;
a selection unit stored in the memory and executable by the one or more processors to select texture images and depth maps of corresponding groups in the image combinations of the video frames at a time moment of the user interaction according to a preset rule and based on the position information of the virtual viewpoint and the parameter data corresponding to the image combinations of the video frames; and
an image reconstruction unit stored in the memory and executable by the one or more processors to combine and render the texture images and the depth maps of the corresponding groups in the image combinations of the video frames at the time moment of the user interaction, based on the position information of the virtual viewpoint and parameter data corresponding to the depth maps and the texture images of the corresponding groups that are selected in the image combinations of the video frames at the time moment of the user interaction, to obtain a reconstructed image corresponding to a position of the virtual viewpoint at the time moment of the user interaction, wherein rendering the texture images and the depth maps of the corresponding groups comprises:
separately performing forward projection on the depth maps of the corresponding groups in the image combinations of the video frames selected at the time moment of the user interaction to map thereof to a virtual position at the time moment of user interaction; and
separately performing backward projection on the texture images of the corresponding groups in the image combinations of the video frames selected at the time moment of the user interaction.

* * * * *